(12) United States Patent
Wang et al.

(10) Patent No.: US 11,615,329 B2
(45) Date of Patent: Mar. 28, 2023

(54) HYBRID QUANTUM-CLASSICAL COMPUTER FOR BAYESIAN INFERENCE WITH ENGINEERED LIKELIHOOD FUNCTIONS FOR ROBUST AMPLITUDE ESTIMATION

(71) Applicant: Zapata Computing, Inc., Boston, MA (US)

(72) Inventors: Guoming Wang, North York (CA); Enshan Dax Koh, Cambridge, MA (US); Peter D. Johnson, Somerville, MA (US); Yudong Cao, Cambridge, MA (US); Pierre-Luc Dallaire-Demers, Toronto (CA)

(73) Assignee: Zapata Computing, Inc., Boston, MA (US)

( * ) Notice: Subject to any disclaimer, the term of this patent is extended or adjusted under 35 U.S.C. 154(b) by 311 days.

(21) Appl. No.: 16/900,947

(22) Filed: Jun. 14, 2020

(65) Prior Publication Data
US 2020/0394537 A1    Dec. 17, 2020

Related U.S. Application Data

(60) Provisional application No. 62/936,730, filed on Nov. 18, 2019, provisional application No. 62/861,757, filed on Jun. 14, 2019.

(51) Int. Cl.
*G06N 5/04* (2006.01)
*G06N 10/00* (2022.01)

(52) U.S. Cl.
CPC ............... *G06N 5/04* (2013.01); *G06N 10/00* (2019.01)

(58) Field of Classification Search
CPC ........... G06N 5/04; G06N 10/00; G06N 7/005
(Continued)

(56) References Cited

U.S. PATENT DOCUMENTS

| 7,353,148 B1 | 4/2008 | Meyers et al. |
| 10,044,638 B2 | 8/2018 | Dadashikelayeh |

(Continued)

FOREIGN PATENT DOCUMENTS

| CA | 3151055 C | 8/2022 |
| CN | 110188885 A | 8/2019 |

(Continued)

OTHER PUBLICATIONS

Barenco, A., et al., "Elementary Gates for Quantum Computation", Phys. Rev. A 52, pp. 1-31 (Nov. 1, 1995).

(Continued)

*Primary Examiner* — James C Kerveros
(74) *Attorney, Agent, or Firm* — BlueShift IP, LLC; Robert Plotkin

(57) ABSTRACT

A hybrid quantum-classical (HQC) computer takes advantage of the available quantum coherence to maximally enhance the power of sampling on noisy quantum devices, reducing measurement number and runtime compared to VQE. The HQC computer derives inspiration from quantum metrology, phase estimation, and the more recent "alpha-VQE" proposal, arriving at a general formulation that is robust to error and does not require ancilla qubits. The HQC computer uses the "engineered likelihood function" (ELF) to carry out Bayesian inference. The ELF formalism enhances the quantum advantage in sampling as the physical hardware transitions from the regime of noisy intermediate-scale quantum computers into that of quantum error corrected ones. This technique speeds up a central component of many quantum algorithms, with applications including chemistry, materials, finance, and beyond.

16 Claims, 39 Drawing Sheets

(58) Field of Classification Search
USPC ............................................................ 706/46
See application file for complete search history.

(56) References Cited

U.S. PATENT DOCUMENTS

| | | | |
|---|---|---|---|
| 10,469,087 | B1 | 11/2019 | Granade et al. |
| 10,755,191 | B2 | 8/2020 | Shim et al. |
| 10,832,155 | B2 | 11/2020 | Lechner et al. |
| 10,922,460 | B1 | 2/2021 | Lee et al. |
| 10,949,768 | B1 | 3/2021 | Zeng et al. |
| 11,106,993 | B1 | 8/2021 | Dallaire-demers et al. |
| 11,157,827 | B2 | 10/2021 | Sim |
| 2007/0239366 | A1 | 10/2007 | Hilton et al. |
| 2010/0306142 | A1 | 12/2010 | Amin |
| 2014/0187427 | A1 | 7/2014 | Macready et al. |
| 2015/0262072 | A1 | 9/2015 | Stoltz |
| 2016/0004972 | A1* | 1/2016 | Alboszta ............... G06N 7/005 706/52 |
| 2016/0042294 | A1 | 2/2016 | Macready et al. |
| 2016/0328253 | A1 | 11/2016 | Majumdar |
| 2017/0177751 | A1 | 6/2017 | Macready et al. |
| 2017/0177782 | A1 | 6/2017 | Hastings |
| 2017/0262765 | A1 | 9/2017 | Bourassa |
| 2017/0351967 | A1 | 12/2017 | Bourassa et al. |
| 2017/0357539 | A1 | 12/2017 | Dadashikelayeh et al. |
| 2018/0129965 | A1 | 5/2018 | Bocharov et al. |
| 2018/0232652 | A1 | 8/2018 | Curtis et al. |
| 2018/0246851 | A1 | 8/2018 | Zaribafiyan et al. |
| 2018/0322408 | A1 | 11/2018 | Chen |
| 2018/0330264 | A1 | 11/2018 | Lanting et al. |
| 2019/0007051 | A1 | 1/2019 | Sete et al. |
| 2019/0147359 | A1 | 5/2019 | Chen et al. |
| 2019/0164079 | A1 | 5/2019 | Gambetta et al. |
| 2019/0205783 | A1 | 7/2019 | Nam et al. |
| 2019/0236476 | A1 | 8/2019 | Pereverzev |
| 2019/0251466 | A1 | 8/2019 | Mezzacapo |
| 2020/0005186 | A1 | 1/2020 | Romero et al. |
| 2020/0097848 | A1 | 3/2020 | Woerner et al. |
| 2020/0117702 | A1 | 4/2020 | Babbush |
| 2020/0151073 | A1 | 5/2020 | Kelly |
| 2020/0161529 | A1 | 5/2020 | Chow et al. |
| 2020/0226487 | A1 | 7/2020 | Radin et al. |
| 2020/0274554 | A1 | 8/2020 | Aspuru-Guzik et al. |
| 2020/0334107 | A1 | 10/2020 | Katabarwa |
| 2020/0394549 | A1 | 12/2020 | Dallaire-Demers et al. |
| 2021/0034998 | A1 | 2/2021 | Cao et al. |
| 2021/0073668 | A1 | 3/2021 | Dallaire-Demers |
| 2021/0125096 | A1 | 4/2021 | Puri et al. |
| 2021/0133617 | A1 | 5/2021 | Sim |
| 2021/0182726 | A1 | 6/2021 | Harry Putra |
| 2021/0232963 | A1 | 7/2021 | Gimeno-Segovia et al. |
| 2021/0271731 | A1* | 9/2021 | Stobinska ............... G06N 10/00 |
| 2021/0272002 | A1 | 9/2021 | Dallaire-Demers et al. |
| 2021/0312313 | A1* | 10/2021 | Woerner ............... G06F 17/11 |
| 2022/0188679 | A1* | 6/2022 | Mazzola ............... G06F 17/18 |
| 2022/0284337 | A1 | 9/2022 | Radin et al. |
| 2022/0292385 | A1 | 9/2022 | Sauvage |
| 2022/0335325 | A1 | 10/2022 | Dallaire-Demers |

FOREIGN PATENT DOCUMENTS

| | | |
|---|---|---|
| CN | 114223003 A | 3/2022 |
| EP | 3983961 A1 | 4/2022 |
| EP | 4022530 A1 | 7/2022 |
| EP | 4026066 A1 | 7/2022 |
| EP | 4042338 A1 | 8/2022 |
| EP | 4052194 | 9/2022 |
| KR | 20120016381 A | 2/2012 |
| KR | 20160132943 A | 11/2016 |
| TW | 201723935 A | 7/2017 |
| TW | 201945962 A | 12/2019 |
| TW | I764348 B | 5/2022 |
| TW | I783297 B | 11/2022 |
| WO | 2015069625 A1 | 5/2015 |
| WO | 2017001404 A1 | 1/2017 |
| WO | 2017027185 A1 | 2/2017 |
| WO | 2018064535 A1 | 4/2018 |
| WO | 2019050555 A1 | 3/2019 |
| WO | 2019055843 A1 | 3/2019 |
| WO | 2019126644 A1 | 6/2019 |
| WO | 2019152020 A1 | 8/2019 |
| WO | 2019209628 A1 | 10/2019 |
| WO | 2019220122 A1 | 11/2019 |
| WO | 2020146794 A1 | 7/2020 |
| WO | 2020168158 A1 | 8/2020 |
| WO | 2020214910 A1 | 10/2020 |
| WO | 2020252425 A1 | 12/2020 |
| WO | 2021022217 A1 | 2/2021 |
| WO | 2021046495 A1 | 3/2021 |
| WO | 2021062331 A1 | 4/2021 |
| WO | 2021087206 A1 | 5/2021 |
| WO | 2021102344 A1 | 5/2021 |
| WO | 2022087143 A1 | 4/2022 |
| WO | 2022187503 A1 | 9/2022 |
| WO | 2022192525 A1 | 9/2022 |

OTHER PUBLICATIONS

Dallaire-Demers, P.L., and Killoran, N., "Quantum generative adversarial networks", arXiv:1804.08641v2, Phys. Rev. A, vol. 98, 012324, pp. 1-10 (Apr. 30, 2018).

Dallaire-Demers, P.L., et al., "Low-depth circuit ansatz for preparing correlated fermionic states on a quantum computer", arXiv preprint arXiv:1801.01053v1, pp. 1-15 (2018).

Ferrie, C., et al., "How to Best Sample a Periodic Probability Distribution, or on the Accuracy of Hamiltonian Finding Strategies", Quantum Information Processing, vol. 12, No. 1, 611-623, pp. 1-8 (Apr. 2012).

Grover, L.K., "A fast quantum mechanical algorithm for database search", STOC '96: Proceedings of the twenty-eighth annual ACM symposium on Theory of Computing, pp. 1-8 (Jul. 1996).

Kitaev, A.Y., "Quantum Measurements and the Abelian Stabilizer Problem", arXiv preprint quant-ph/9511026, pp. 1-22 (Nov. 1995).

Knill, E., et al., "Optimal Quantum Measurements of Expectation Values of Observables", Physical Review A, vol. 75, No. 1, pp. 1-22 (Jan. 2007).

Low, G.H., and Chuang, I.L., "Optimal Hamiltonian Simulation by Quantum Signal Processing," Physical Review Letters, vol. 118, No. 1, pp. 1-6 (Jan. 2017).

Motta, M., et al., "Low rank representations for quantum simulation of electronic structure", Computational Physics, Quantum Physics, arXiv:1808.02625v2, pp. 1-8 (Aug. 9, 2018).

Romero, J., and Aspuru-Guzik, A., "Variational quantum generators: Generative adversarial quantum machine learning for continuous distributions," Quantum Physics, arXiv:1901.00848 [quant-ph], pp. 1-15 (Jan. 3, 2019).

Romero, J., et al., "Quantum autoencoders for efficient compression of quantum data", Quantum Science and Technology, arXiv:1612.02806v2, vol. 2, No. 4, pp. 1-10 (Feb. 10, 2017).

Sergeevich, A., et al., "Characterization of a Qubit Hamiltonian Using Adaptive Measurements in a Fixed Basis", Phys. Rev. A 84, 052315, pp. 1-6 (Nov. 2011).

Wang, D., et al., "Accelerated Variational Quantum Eigensolver", Physical Review Letters, vol. 122, No. 14, pp. 1-11 (Apr. 12, 2019).

Wiebe, N., and Granade, C., "Efficient Bayesian Phase Estimation", Physical Review Letters, vol. 117, No. 1, pp. 1-12 (Jun. 2016).

Baker, J.M., et al., "Decomposing Quantum Generalized Toffoli with an Arbitrary Number of Ancilla", arXiv preprint arXiv:1904.01671, pp. 1-10 (2019).

Brassard, G., et al., "Quantum Amplitude Amplification and Estimation", book Quantum Computation and Information, Samuel J. Lomonaco, Jr. and Howard E. Brandt, Editors, AMS Contemporary Mathematics, Issue No. 305, pp. 1-22 (2002).

Fedorov, A., et al., "Implementation of a Toffoli Gate with Superconducting Circuits", Nature, 481(7380):170, pp. 1-5 (2012).

Hoyer, P., "Arbitrary Phases in Quantum Amplitude Amplification", Physical Review A, vol. 62, No. 5, 052304, pp. 1-6 (2000).

(56) References Cited

OTHER PUBLICATIONS

Krantz, P., et al., "A Quantum Engineer's Guide to Superconducting Qubits", Applied Physics Reviews, vol. 6, No. 2, 021318, pp. 1-59 (2019).

Long, G.L., et al., "Phase Matching in Quantum Searching", Physics Letters A, vol. 262, No. 1 (27-34) pp. 1-13 (1999).

Low, G.H., et al., "Methodology of Resonant Equiangular Composite Quantum Gates", Physical Review X, vol. 6, No. 4, 041067, pp. 1-13 (2016).

Verstraete, F., et al., "Quantum Circuits for Strongly Correlated Quantum Systems," Physical Review A, vol. 79, No. 3, 032316, pp. 1-5 (2009).

Figgat, C., et al., "Complete 3-Qubit Grover search on a programmable quantum computer", Nature Communications, vol. 8, Article No. 1918, pp. 1-9 (2017).

Mølmer, K., and Sørensen, A., "Multiparticle entanglement of hot trapped ions", Physical Review Letters, vol. 82, No. 9, 1835, pp. 1-4 (Mar. 1, 1999).

International Search Report and Written Opinion dated Sep. 21, 2020, in international patent application No. PCT/US2020/037655, 8 pages.

McClean, J. R., et al., "The theory of variational hybrid quantum-classical algorithms", New Journal of Physics, vol. 18, pp. 1-22 (Feb. 5, 2016). Available online as arXiv:1509.04279.

Romero, J., et al., "Strategies for quantum computing molecular energies using the unitary coupled cluster ansatz", Quantum Science and Technology, arXiv:1701.02691v2, vol. 4, No. 1, pp. 1-18 (Feb. 10, 2018).

Alcazar, J., et al., "Quantum algorithm for credit valuation adjustments", Quantum Physics, arXiv:2105.12087, pp. 1-23 (May 25, 2021).

Ambainis, A., "On physical problems that are slightly more difficult than QMA," In 2014 IEEE 29th Conference on Computational Complexity (CCC), pp. 1-12 (2014).

Aspuru-Guzik, A., et al., "Simulated Quantum Computation of Molecular Energies", Science, Quantum Physics, vol. 309, No. 5741, pp. 1-21 (Sep. 9, 2005).

Bach, V., et al., "Generalized Hartree-Fock Theory and the Hubbard Model", Journal of Statistical Physics, vol. 76 (1-2):3-89, pp. 1-68 (Nov. 25, 1993).

Barkoutsos, P.K., et al., "Quantum Algorithms for Electronic Structure Calculations: Particle-Hole Hamiltonian and Optimized Wave-Function Expansions," Phys Rev. A 98, 022322, pp. 1-14 (May 11, 2018).

Benedetti, M., et al., "A generative modeling approach for benchmarking and training shallow quantum circuits", arXiv preprint arXiv:1801.07686v4, pp. 1-16 (Jun. 2, 2019).

Bishop, L., et al., "Quantum Volume", Technical report, IBM T.J. Watson, pp. 1-5 (Mar. 4, 2017).

Bogoljubov, N.N., "A New Method in the Theory of Superconductivity", Soviet Physics JETP, vol. 34, No. 7, pp. 41-46 (Jul. 1958).

Bonet-Monroig, "Comparison of Error itigation Strategies in a Hydrogen Molecule Quantum Simulation", Master thesis. Leiden University, pp. 1-52 (May 29, 2018).

Bonet-Monroig, X., et al., "Nearly optimal measurement scheduling for partial tomography of quantum states", Quantum Physics, arXiv:1908.05628v2, pp. 1-9 (Sep. 6, 2019).

Bookatz, A. D., et al., "Error Suppression in Hamiltonian Based Quantum Computation Using Energy Penalties", arXiv:1407.1485v1, pp. 1-26 (Jul. 6, 2014).

Brandao, F.G., et al., "For fixed control parameters the quantum approximate optimization algorithm's objective function value concentrates for typical instances," arXiv preprint arXiv:1812.04170, pp. 1-16 (2018).

Bravo-Prieto, C., et al., "Variational Quantum Linear Solver," Quantum Physics, arXiv:1909.05820, pp. 1-21 (Sep. 12, 2019).

Bravyi, L. D., et al., "Fermionic Quantum Computation", Annals of Physics, vol. 298, No. 1, pp. 210-226 (2002).

Broughton, M., et al., "Tensorflow quantum: A software framework for quantum machine learning," arXiv preprint arXiv:2003.02989, pp. 1-56 (Aug. 26, 2021).

Cerezo, M., et al., "Cost function-dependent barren plateaus in shallow quantum neural networks," arXiv preprint arXiv2001.00550, pp. 1-39 (Mar. 20, 2021).

Cervera-Lierta, A., et al., "The meta-variational quantum eigensolver (meta-vqe): Learning energy profiles of parameterized hamiltonians for quantum simulation," arXiv:2009.13545, pp. 1-11 (May 28, 2021).

Chakraborty, S., et al., "The Power of Blockencoded Matrix Powers: Improved Regression Techniques Via Faster Hamiltonian Simulation," arXiv preprint arXiv:1804.01973, pp. 1-58 (Sep. 3, 2018).

Childs, A. M., et al., "Quantum algorithm for systems of linear equations with exponentially improved dependence on precision", arXiv:1511.02306v2, pp. 1-31 (2017).

Chiles, R.A., et al., "An electron pair operator approach to coupled cluster wave functions. application to He2, Be2, and Mg2 and comparison with CEPA methods", The Journal of Chemical Physics, vol. 74, No. 8, pp. 4544-4556 (1981).

Colless, J.I., et al., "Computation of Molecular Spectra on a Quantum Processor with an Error-Resilient Algorithm", Physical Review X, vol. 8, No. 1, pp. 011021-011027 (2018).

Cramer, M., et al., "Efficient Quantum State Tomography", Nature communications, 1(149), pp. 1-7 (Dec. 21, 2010).

Crawford, O., et al., "Efficient quantum measurement of Pauli operators in the presence of finite sampling error", Quantum Physics, arXiv:1908.06942v2, pp. 1-17 (Apr. 21, 2020).

Crooks, G.E., "Performance of the quantum approximate optimization algorithm on the maximum cut problem," arXiv preprint arXiv:1811.08419, pp. 1-6 (2018).

Dumitrescu, E., et al., "Tensor Network Benchmarking for Quantum Computing", Beyond CMOS Computing Workshop: The Interconnect Challenge, Session 1, Talk 4, pp. 1-25 (2017).

Eddins, A., et al., "Doubling the Size of Quantum Simulators by Entanglement Forging," Quantum Physics, arXiv:2104.10220, pp. 1-17 (Apr. 20, 2021).

Endo, S., et al., "Variational quantum algorithms for discovering Hamiltonian spectra", Physical Review A, arXiv preprint arXiv:1806.05707, pp. 1-9 (2018).

Examination Report dated Dec. 22, 2021, in Canadian patent application No. 3,133,917, 5 pages.

Farhi, E., et al., "A quantum approximate optimization algorithm", Quantum Physics, arXiv:1411.4028v1, pp. 1-16 (Nov. 14, 2014).

Finn, C., and Levine, S., "Meta-learning and universality: Deep representations and gradient descent can approximate any learning algorithm," arXiv:1710.11622, pp. 1-20 (Feb. 14, 2018).

Frerot, I., et al., "Detecting Many-Body Bell Non-Locality By Solving Ising Models", Phys. Rev. Lett. 126,140504, Available online at <https://arxiv.org/pdf/2004.07796, pp. 1-14 (Apr. 10, 2021).

Garcia-Saez, A., et al., "Addressing Hard Classical Problems with Adiabatically Assisted Variational Quantum Eigensolvers", Quantum Physics, arXiv preprint arXiv:1806.02287, pp. 1-7 (2018).

Gentini, L., et al., "Noise-Assisted Variational Hybrid Quantum-Classical Optimization", arXiv:1912.06744, pp. 1-8 (Dec. 13, 2019).

Gharibian, S., et al., "Oracle Complexity Classes and Local Measurements on Physical Hamiltonians," In 37th International Symposium on Theoretical Aspects of Computer Science (STAGS 2020). Schloss Dagstuhl-Leibniz-Zentrum für Informatik, 2020. arXiv:1909.05981, pp. 1-38 (Sep. 12, 2019).

Gharibian, S., et al., "The complexity of simulating local measurements on quantum systems," Quantum, 3:189, 2019. arXiv:1606.05626, pp. 1-38 (Apr. 7, 2020).

Gilyén, A., et al., "Quantum Singular Value Transformation and Beyond: Exponential Improvements for Quantum Matrix Arithmetics," In Proceedings of the 51st Annual ACM SIGACT Symposium on Theory of Computing, pp. 193-204, 2019. arXiv:1806 01838, Jun. 5, 2018, 67 pages.

Goemans, M.X., et al., "Improved Approximation Algorithms for Maximum Cut and Satisfiability Problems Using Semidefinite Programming", Journal of the ACM (JACM), vol. 42, No. 6, pp. 1115-1145 (Nov. 1995).

(56) References Cited

OTHER PUBLICATIONS

Gokhale, P., and Chong, F.T., "O(N3) Measurement Cost for Variational Quantum Eigensolver on Molecular Hamiltonians", arXiv:1908.11857v1, pp. 1-5 (Aug. 30, 2019).

Gokhale, P., et al., "Minimizing state preparations in variational quantum eigensolver by partitioning into commuting families", Quantum Physics, arXiv:1907.13623v1, pp. 1-23 (Jul. 31, 2019).

Gonthier, J., et al., "Identifying challenges towards practical quantum advantage through resource estimation: the measurement roadblock in the variational quantum eigensolver," Quantum Physics, arXiv:2012.04001, pp. 1-27 (Dec. 7, 2020).

Grant, E., et al., "An initialization strategy for addressing barren plateaus in parametrized quantum circuits," Quantum 3, 214, pp. 1-9 (Nov. 28, 2019).

Grimsley, H.R., et al., "An adaptive variational algorithm for exact molecular simulations on a quantum computer," Nature Communications 10, 3007, pp. 1-9 (2019).

Handy, N.C., et al., "Size-consistent Brueckner theory limited to double substitutions", Chemical Physics Letters, vol. 164, No. 2-3, pp. 185-192 (Dec. 8, 1989).

Harrow, A. W., et al., "Quantum algorithm for linear systems of equations", Phys. Rev. Lett., vol. 103, No. 15, 1-15 (2009).

Helgaker T. et al., "Molecular Electronic-Structure Theory", Book published by John Wiley & Sons, pp. 1-908 (2000).

Heya, K., et al., "Variational Quantum Gate Optimization", Quantum Physics, arXiv:1810.12745v1, pp. 1-10 (Oct. 30, 2018).

Huang, H., et al., "Near-term quantum algorithms for linear systems of equations," arXiv preprint arXiv:1909.07344, pp. 1-22 (Dec. 16, 2019).

Huggins, W. J., et al., "Efficient and noise resilient measurements for quantum chemistry on near-term quantum computers", Quantum Physics, arXiv:1907.13117v3, pp. 1-10 (Sep. 23, 2019).

International Search Report & Written Opinion dated Feb. 18, 2021, in international patent application No. PCT/US2020/058119, 7 pages.

International Search Report & Written Opinion dated Jul. 27, 2020, in international patent application No. PCT/US2020/028670, 7 pages.

Seeley, J.T., et al., "The Bravyi-Kitaev transformation for quantum computation of electronic structure," The Journal of chemical physics, 137(22):224109, 2012. arXiv:1208.5986, pp. 1-38 (Aug. 29, 2012).

Sim, S., et al., "Adaptive pruning-based optimization of parameterized quantum circuits," Quantum Science and Technology 10.1088/2058-9565/abe107 (2021) pp. 1-24, arXiv:2010.00629.

Skolik, A., et al., "Layerwise learning for quantum neural networks," arXiv:2006.14904, vol. 3, No. 5 pp. 1-11 (Jun. 26, 2020).

Somma, R. D., "Quantum eigenvalue estimation via time series analysis," New Journal of Physics, 21(12):123025, 2019. arXiv:1907.11748, pp. 1-10 (Sep. 4, 2020).

Somma, R. D., et al., "Spectral gap amplification," SIAM Journal on Computing, 42(2):593-610, 2013. arXiv:1110.2494, Mar. 30, 2012, 14 pages.

Steane, A., "Multiple Particle Interference and Quantum Error Correction", Proceedings of The Royal Society A, The royal Society, vol. 452, Issue. 1954, pp. 2551-2577 (Nov. 8, 1996).

Sunkin Sim et al., "Expressibility and Entangling Capability of Parameterized Quantum Circuits for Hybrid Quantum-Classical Algorithms", arXiv:1905.10876v1, May 25, 2019, 18 pages. Available online at <URL: https://arxiv.org/abs/1905.10876v1.pdf>.

Swarnadeep Majumder et al., "Real-time calibration with spectator qubits", npj Quantum Information, vol. 6, Retrieved from: <URL: https://www.nature.com/articles/s41534-020-0251-y>, Feb. 7, 2020, 9 pages.

Szabo, A. and Ostlund, N.S., "Modern quantum chemistry: introduction to advanced electronic structure theory," Courier Corporation, 2012. pp. 1-479 (2012).

T. Albash et al., "Adiabatic quantum computation," Rev. Mod. Phys. 90, 015002 (2018) 71 pages.

T. Hospedales et al., "Meta-Learning in Neural Networks: A Survey," arXiv e-prints, arXiv:2004.05439, Nov. 7, 2020, 20 pages.

Temme, K., et al., "Error Mitigation for Short-Depth Quantum Circuits", Physical review letters, vol. 119, No. 18, 180509, pp. 1-15 (2017).

Thomas E O'Brien et al., "Calculating energy derivatives for quantum chemistry on a quantum computer," NPJ Quantum Information, 5(1):1-12, 2019.

Torlai, G., et al., "Neural-Network Quantum State Tomography", Nature Physics, vol. 14, No. 5, Feb. 2018, pp. 1-6.

Tubman, N. M., et al., "Postponing the Orthogonality Catastrophe: Efficient State Preparation for Electronic Structure Simulations on Quantum Devices," Quantum Physics, arXiv:1809.05523, pp. 1-13, (Sep. 14, 2018).

Tyler Takeshita et al., "Increasing the Representation Accuracy of Quantum Simulations of Chemistry without Extra Quantum Resources," Phys. Rev. X 10 (Jan. 1, 2020), p. 011004. doi: 10.1103/PhysRevX.10.011004. url: https://link.aps.org/doi/10.1103/PhysRevX.10.011004.

Tzu-Ching Yen, et al., "Measuring all Compatible Operators in One Series of Single-Qubit Measurements Using Unitary Transformations," Journal of Chemical Theory and Computation, 16(4):2400-2409, 2020. arXiv:1907.09386.

Urbanek, M., et al., "Chemistry on Quantum Computers with Virtual Quantum Subspace Expansion," Journal of Chemical Theory and Computation 16.9, pp. 5425-5431. doi: 10.1021/acs.jctc.0c00447. (Feb. 28, 2020).

V. Bergholm et al., "Pennylane: Automatic differentiation of hybrid quantum-classical computations," arXiv preprint arXiv:1811.04968, Feb. 14, 2020, 15 pages.

Verdon, G., et al., "Learning to learn with quantum neural networks via classical neural networks," arXiv:1907.05415, pp. 1-12 (Jul. 11, 2019).

Verteletskyi, V., et al., "Measurement optimization in the variational quantum eigensolver using a minimum clique cover", Quantum Physics, arXiv:1907.03358v4, pp. 1-7 (Mar. 26, 2020).

Wang, G., et al., "Minimizing Estimation Runtime on Noisy Quantum Computers," PRX Quantum 2.1 pp. 010346-1-010346-49 (2021).

Watson, J.D., et al., "The complexity of translationally invariant problems beyond ground state energies", arXiv preprint arXiv:2012.12717, pp. 1-58 (Dec. 23, 2020).

Wecker, D., et al., "Solving strongly correlated electron models on a quantum computer", Physical Review A, vol. 92, No. 6, pp. 1-27 (2015).

Wecker, D., et al., "Progress towards practical quantum variational algorithms", Phys. Rev. A 92, 042303, pp. 1-11 (2015).

Wecker, D., et al., "Towards Practical Quantum Variational Algorithms", Physical Review A, vol. 92, No. 4, 042303, pp. 1-11 (2015).

Wiebe, N., et al., "Higher Order Decompositions of Ordered Operator Exponentials", Mathematical Physics, arXiv:0812.0562v3, pp. 1-16 (Dec. 4, 2008).

William M Kirby et al., "Classical simulation of noncontextual Pauli Hamiltonians," Physical Review A 102.3 (2020), p. 032418. arXiv:2002.05693.

William M Kirby et al., "Contextual Subspace Variational Quantum Eigensolver," Quantum 5 (2021), p. 456. https://quantum-journal.org/papers/q-2021-05-14-456/pdf/ arXiv:2011.10027.

William M Kirby et al., "Contextuality Test of the Nonclassicality of Variational Quantum Eigensolvers," Physical review letters 123.20 (2019), p. 200501. arXiv:1904.02260.

Willsch, M., et al., "Benchmarking the quantum approximate optimization algorithm," Quantum Information Processing 19, 197, pp. 1-24 (2020).

Wilson, M., et al., "Optimizing quantum heuristics with meta-learning," arXiv:1908.03185, pp. 1-13 (Aug. 8, 2019).

Wootton, J. R., "Benchmarking of quantum processors with random circuits", arXiv: Quantum Physics, arXiv:1806.02736v1, pp. 1-15 (Jun. 7, 2018).

Yigal Meir et al., "Landauer formula for the current through an interacting electron region," Physical review letters, 68(16):2512, 1992, 5 pages.

(56) References Cited

OTHER PUBLICATIONS

Yigit Subasi et al., "Quantum algorithms for systems of linear equations inspired by adiabatic quantum computing," Physical review letters, 122(6):060504, 2019. arXiv: 1805.10549, May 26, 2018, 9 pages.
Yimin Ge et al., "Faster Ground State Preparation and High-Precision Ground Energy Estimation with Fewer Qubits," Journal of Mathematical Physics, 60(2):022202, 2019. arXiv:1712.03193, Feb. 2, 2018, 25 pages.
Yosi Atia et al., "Fast-Forwarding of Hamiltonians and Exponentially Precise Measurements," Nature communications, 8(1) pp. 1-9, Nov. 17, 2017.
Yudong Cao et al., "Potential of Quantum Computing for Drug Discovery," IBM Journal of Research and Development, vol. 62, Issue 6, pp. 6:1-6:20, Nov./Dec. 2018.
Zhao, A., et al., "Measurement reduction in variational quantum algorithms", Quantum Physics, arXiv:1908.08067v2, pp. 1-21 (Dec. 16, 2019).
Zhenguo Li et al., "Meta-sgd: Learning to learn quickly for few-shot learning," arXiv preprint arXiv:1707.09835, Sep. 28, 2017, 11 pages.
Zhou, L., et al., "Quantum approximate optimization algorithm: Performance, mechanism, and implementation on near-term devices," Phys. Rev. X 10, 021067 pp. 1-23 (2020).
Zhukov, A. A., et al., "Quantum communication protocols as a benchmark for quantum computers", arXiv:1812.00587v1, pp. 1-25 (Dec. 3, 2018).
A. Barenco et al., "Elementary Gates for Quantum Computation," Physical review A, 52(5), Mar. 1995, 31 pages.
A.Y. Kitaev "Quantum Measurements and the Abelian Stabilizer Problem," arXiv preprint quant-ph/9511026, Nov. 1995, 22 pages.
Andersen, C.K., et al., "Entanglement Stabilization using Parity Detection and Real-Time Feedback in Superconducting Circuits", arXiv:1902.06946v2, pp. 1-12 (Feb. 20, 2019).
Baekkegaard, T., et al., "Realization of efficient quantum gates with a superconducting qubit-qutrit circuit", Scientific Reports, vol. 9, Article No. 13389, pp. 1-10 (Sep. 16, 2019).
Cao, Y., et al., "Implementation of a Toffoli gate using an array of coupled cavities in a single step", Scientific Reports, vol. 8, Article No. 5813, pp. 1-10 (Apr. 11, 2018).
E. Knill et al., "Optimal Quantum Measurements of Expectation Values of Observables," Physical Review A, 75(1), Jan. 2007, p. 012328.
International Search Report and Written Opinion dated Mar. 15, 2021, in International Patent Application No. PCT/US2020/061631, 7 pages.
L.K. Grover "A fast quantum mechanical algorithm for database search," arXiv preprint quant-ph/9605043, May 1996, 8 pages.
P.L. Dallaire-Demers et al., "Quantum Generative Adversarial Networks," Physical Review A, 98(1), Apr. 2018, p. 012324.
International Search Report & Written Opinion dated May 11, 2020, in International Patent Application No. PCT/US2020/013181, 11 pages.
International Search Report & Written Opinion dated Sep. 6, 2021, in international patent application PCT/US2021/033089, 8 pages.
International Search Report and Written Opinion dated Dec. 6, 2019 in PCT International Patent Application No. PCT/US2019/046895, 9 pages.
International Search Report and Written Opinion for the international application No. PCT/US2021/035381, dated Sep. 27, 2021, 6 pages.
Izmaylov, A. F., et al., "Unitary Partitioning Approach to the Measurement Problem in the Variational Quantum Eigensolver Method", Quantum Physics, arXiv:1907.09040v2, pp. 1-7 (Oct. 18, 2019).
Johnson, P.D., et al., "A Method for Improving Quantum Optimization Algorithms: The Marginals Optimization Procedure", ICE 5th Conference on Quantum Information, Spain, (May 28-31, 2019), Book of Abstracts p. 59.

Jones T., and Benjamin S. C., et al., "Quantum compilation and circuit optimisation via energy dissipation", arXiv:1811.03147, pp. 1-13 (Dec. 19, 2018).
Jordan, P., et al., "In The Collected Works of Eugene Paul Wigner: Part A: The Scientific Papers—Chapter: Über das Paulische Äquivalenzverbot", pp. 109-129. Springer (1993).
Kandala, A., et al., "Hardware-efficient variational quantum eigensolver for small molecules and quantum magnets", Nature 549, pp. 1-24 (Oct. 13, 2017).
Kandala, A., et al., "Hardware-efficient Variational Quantum Eigensolver for Small Molecules and Quantum Magnets", Nature, vol. 549, pp. 1-24 (2017).
Kingma, D.P., and Ba, J.L., "Adam: A method for stochastic optimization," arXiv preprint arXiv:1412.6980, pp. 1-15 (2014).
Kivlichan, I. D., et al., "Quantum Simulation of Electronic Structure with Linear Depth and Connectivity", Phys. Rev. Lett. 120, arXiv:1711.04789v2, pp. 1-6 (Mar. 13, 2018).
Kottmann, J.S., et al., "Reducing qubit requirements while maintaining numerical precision for the variational quantum eigensolver: A basis-set-free approach," The Journal of Physical Chemistry Letters 12.1, arXiv:2008.02819, pp. 663-673 (2021).
Kühn, M., et al., "Accuracy and Resource Estimations for Quantum Chemistry on a Near-Term Quantum Computer," Journal of Chemical Theory and Computation 15.9, pp. 1-26. arXiv:1812.06814 (Aug. 14, 2019).
Lemke, C., et al., "Metalearning: a survey of trends and technologies," Artificial Intelligence Review 44, 117 pp. 1-17 (2015).
Lieb, E.H., and Wu,F.Y., "The one-dimensional Hubbard model: a reminiscence," Physica A: Statistical Mechanics and its Applications 321, 1, arXiv:0207529, pp. 1-33 (2002).
Lin, L, and Tong, Y., "Heisenberg-limited ground state energy estimation for early fault-tolerant quantum computers," arXiv preprint arXiv:2102.11340, pp. 1-24 (Feb. 22, 2021).
Lin, L, and Tong, Y., "Near-optimal ground state preparation," Quantum, 4:372,arXiv:2002.12508, pp. 1-22, (Dec. 6, 2020).
Liu, J., and Wang, L., "Differentiable learning of quantum circuit Born machines", Phys. Rev. A 98, 062324, pp. 1-9 (2018).
Liu, Y., "The Complexity of the Consistency and N-Representability Problems for Quantum States", Quantum Physics, arXiv preprint arXiv:0712.3041, pp. 1-89 (2007).
Liu, Y., et al., "Quantum computational complexity of the N-representability problem: QMA complete", Physical review letters, vol. 98, No. 11, pp. 1-6 (2007).
Manrique, D.Z., et al., "Momentum-Space Unitary Coupled Cluster and Translational Quantum Subspace Expansion for Periodic Systems on Quantum Computers," arXiv: 2008.08694 [quant-ph], pp. 1-31 (2021).
Mari, A., et al., "Estimating the gradient and higher-order derivatives on quantum hardware," Phys. Rev. A 103, 012405, pp. 1-17 (Feb. 26, 2021).
McArdle, S., et al., "Digital quantum simulation of molecular vibrations," Chemical science, 10(22):5725-5735, 2019. arXiv:1811.04069, pp. 1-14 (Jan. 23, 2020).
McClean, J.R., et al., "Decoding quantum errors with subspace expansions," Nat. Comm. 11, p. 636. doi: 10.1038/s41467-020-14341—pp. 1-9 (2020).
McClean, J.R., et al., "Hybrid Quantum-Classical Hierarchy for Mitigation of Decoherence and Determination of Excited States", Physical Review A, vol. 95, No. 4, pp. 1-10 (2017).
McClean, J.R., et al., "OpenFermion: the electronic structure package for quantum computers", Quantum Science and Technology 5.3, p. 034014, pp. 1-22 (2020).
Michielsen, K., et al., "Benchmarking gate-based quantum computers", Quantum Physics, arXiv:1706.04341, vol. 220 pp. 1-33 (Jun. 14, 2017).
Mostafa H., and Wang X., et al., "Parameter Efficient Training of Deep Convolutional Neural Networks by Dynamic Sparse Reparameterization", arXiv:1902.05967v3, pp. 1-18 (May 13, 2019).
Nakanishi, K.M., et al., "Subspace-search variational quantum eigensolver for excited states," Phys. Rev. Research 1, p. 033062. doi:10.1103/PhysRevResearch.1.033062-1-7 (Oct. 3, 2019).

(56) References Cited

OTHER PUBLICATIONS

Nelder, J. A., and Mead, R., "A simplex method for function minimization", The Computer Journal, vol. 7, Issue. 4, pp. 308-313 (Jan. 1965).
Nichol, A., et al., "On first-order metal-earning algorithms," arXiv:1803.02999, pp. 1-15 (Oct. 22, 2018).
Non-Final Office Action dated Jun. 10, 2021, in U.S. Appl. No. 17/084,990 of Sukin Sim, filed Oct. 30, 2020, 20 pages.
Notice of Allowance dated Aug. 12, 2021, in U.S. Appl. No. 17/084,990 of Sukin Sim, filed Oct. 30, 2020, 5 pages.
Notice of Allowance dated Aug. 27, 2021, in U.S. Appl. No. 17/084,990 of Sukin Sim, filed Oct. 30, 2020, 5 pages.
O'Gorman, B., et al., Generalized swap networks for near-term quantum computing, arXiv:1905.05118 [quant-ph]., pp. 1-16 (May 13, 2019).
Peruzzo, A., et al., "A variational eigenvalue solver on a photonic quantum processor", Nature Communications, vol. 5, Article No. 4213, pp. 1-7 (2014).
Peruzzo, A., et al., "A variational eigenvalue solver on a quantum processor", Quantum Physics, arXiv:1304.3061v1, pp. 1-10 (Apr. 10, 2013).
Powell, M. J. D., "A Direct Search Optimization Method That Models the Objective and Constraint Functions by Linear Interpolation", In: Gomez S., Hennart JP. (eds) Advances in Optimization and Numerical Analysis. Mathematics and Its Applications, vol. 275. Springer, Dordrecht, pp. 51-52 (1994).
Purvis, G.D., et al., "A full coupled-cluster singles and doubles model: The inclusion of disconnected triples", The Journal of Chemical Physics, vol. 76, No. 4, pp. 1910-1918 (Feb. 15, 1982).
R. L. Fox et al., "Rates of change of eigenvalues and eigenvectors," AIAA Journal 6.12 (1968), pp. 2426-2429.
Reiher, M., et al., "Elucidating Reaction Mechanisms on Quantum Computers", PNAS, vol. 114, No. 29, pp. 1-28 (2016).
Rice, J.E., et al., "Quantum computation of dominant products in lithium-sulfur batteries," The Journal of Chemical Physics, 154(13):134115, 2021. arxiv2001.01120, pp. 1-7 (Jan. 4, 2020).
Robbins, K., and Love, P.J., "Benchmarking VQE with the LMG model," arXiv: 2105.06761 [quant-ph], pp. 1-15 (Aug. 2, 2021).
Robert M. Parrish et al., "Psi4 1.1: An Open-Source Electronic Structure Program Emphasizing Automation, Advanced Libraries, and Interoperability," J. Chem. Theory Comput. 13.7 (2017), pp. 3185-3197. doi: 10.1021/acs.jctc.7b00174. url: http://dx.doi.org/10.1021/acs.jctc.7b00174.
Rubin, N. C., et al., "Application of Fermionic Marginal Constraints to Hybrid Quantum Algorithms", New Journal of Physics, vol. 20, No. 5, 053020, pp. 1-21 (2018).
Rubin, N.C., "A Hybrid Classical/Quantum Approach for Large-Scale Studies of Quantum Systems with Density Matrix Embedding Theory", Quantum Physics, arXiv:1610.06910 [quant-ph], pp. 1-10, (2016).
Rusu, A. A., et al., "Meta-learning with latent embedding optimization," arXiv:1807.05960, pp. 1-17 (Mar. 26, 2019).
Sarma, S.D., et al., "Majorana Zero Modes and Topological Quantum Computation", arXiv: 1501.02813v2, pp. 1-16, May 14, 2015 (retrieved on Nov. 17, 2019). Retrieved from <https://arxiv.org/abs/1501.02813>.
Schlittgen, B., et al., "Low-Energy Effective Theories of Quantum Spin and Quantum Link Models", PHYSICAL REVIEW D, vol. 63. No 8, pp. 1-29 (Mar. 19, 2001).
Amaro, D., et al., "Filtering variational quantum algorithms for combinatorial optimization," arXiv preprint arXiv:2106.10055, pp. 1-14 (Feb. 10, 2022).
Babbush, R., et al., "Encoding Electronic Spectra in Quantum Circuits with Linear T Complexity," Physical Review X, vol. 8, No. 4, 041015, pp. 1-39 (Sep. 19, 2018).
Bonet-Monroig, X., et al., "Performance comparison of optimization methods on variational quantum algorithms," arXiv preprint arXiv:2111.13454, pp. 1-12 (Dec. 14, 2021).

Childs, A. M. et al., "Hamiltonian simulation using linear combinations of unitary operations", Quantum Information and Computation, vol. 12, pp. 901-924 (2012).
Decision of Grant dated Jan. 20, 2022, in Taiwan patent application No. 109137856, 5 pages.
First Office Action dated Oct. 8, 2021, in Taiwan patent application No. 109137856, 5 pages.
He, M., et al., "Quantum Gaussian filter for exploring ground-state properties," arXiv preprint arXiv:2112.06026, pp. 1-7 (Dec. 11, 2021).
Higgott, O., et al., "Variational Quantum Computation of Excited States," Quantum, vol. 3, pp. 1-11 (Jun. 28, 2019).
International Search Report and Written Opinion dated Feb. 4, 2022, in International Patent Application No. PCT/US2021/055867, 6 pages.
Kassal, I., et al., "Polynomial-time quantum algorithm for the simulation of chemical dynamics," Proceedings of the National Academy of Sciences, vol. 105, No. 48, pp. 1-6 (2008).
Kitaev, A.Y., et al., "Classical and quantum computation," Graduate Studies in Mathematics, vol. 47, 2002, 24 pages. Editorial Committee: Steven G. Krantz, David Saltman, David Sattinger and Ronald Stern, American Mathematical Society; Providence, Rhode Island, United States of America.
Kottmann, J.S., et al., "Reducing Qubit Requirements while Maintaining Numerical Precision for the Variational Quantum Eigensolver: A Basis-Set-Free Approach," The Journal of Physical Chemistry Letters, vol. 12, No. 1, pp. 1-13 (Dec. 31, 2020).
Kyriienko, O., "Quantum inverse iteration algorithm for programmable quantum simulators," arXiv preprint arXiv:1901.09988, pp. 1-16 (Sep. 30, 2019).
McArdle, S., et al., "Variational ansatz-based quantum simulation of imaginary time evolution," Nature Partner Journals: Quantum Information, vol. 5, No. 1, pp. 1-6 (2019).
McClean, J.R., et al., "Barren plateaus in quantum neural network training landscapes," Nature communications, arXiv:1803.11173, pp. 1-6 (2018).
McCean, J.R., et al., "The theory of variational hybrid quantum-classical algorithms," New Journal of Physics, vol. 18, No. 2, arXiv:1509.04279, pp. 1-20 (Sep. 14, 2015).
Motta, M., et al., "Determining eigenstates and thermal states on a quantum computer using quantum imaginary time evolution," Nature Physics, vol. 16, No. 2, pp. 1-18 (Feb. 16, 2020).
Parrish, R.M., et al., "Quantum Computation of Electronic Transitions Using a Variational Quantum Eigensolver," Physical Review Letters, vol. 122, No. 23, pp. 1-13 (Apr. 10, 2019).
Poulin, D., and Wocjan, P., "Preparing ground states of quantum many-body systems on a quantum computer," Physical review letters, vol. 102, No. 13, 130503, pp. 1-7 (Sep. 16, 2008).
Yoder, T.J., et al., "Fixed-point quantum search with an optimal number of queries," Physical review letters, vol. 113, No. 21, pp. 210501-210505 (Nov. 21, 2014).
Balu, R., and Borle, A., "Bayesian Networks based Hybrid Quantum-Classical Machine Learning Approach to Elucidate Gene Regulatory Pathways", arXiv:1901.10557v1, pp. 1-9 (Jan. 23, 2019).
Maslov, D., "Basic Circuit Compilation Techniques for an Ion-Trap Quantum Machine", https://arxiv.org/pdf/1603.07678v4, pp. 1-18 (Feb. 21, 2017).
International Search Report & Written Opinion dated Dec. 11, 2020, in international patent application No. PCT/US2020/049605, 14 pages.
International Search Report & Written Opinion dated Jan. 5, 2021, in international patent application No. PCT/US2020/052958, 7 pages.
International Search Report & Written Opinion dated Nov. 6, 2020, in international patent application No. PCT/US2020/044615, 8 pages.
Kaushal, V., et al., "Shuttling-based trapped-ion quantum information processing", AVS Quantum Science, vol. 2, No. 1, pp. 1-25 (2020).
Pino, J.M., et al., "Demonstration of the QCCD trapped-ion quantum computer architecture", arXiv:2003.01293, pp. 1-11 (Sep. 26, 2020).

(56) References Cited

OTHER PUBLICATIONS

Sepiol, M.A., "A High-Fidelity Microwave Driven Two-Qubit Quantum Logic Gate in 43Ca+", pp. 1-197 (2016).
Esslinger, T., "Fermi-Hubbard physics with atoms in an optical lattice", arXiv:1007.0012v1, pp. 1-29 (Jun. 30, 2010).
Second Office Action dated Apr. 6, 2022, in Taiwan patent application No. 109139876, 3 pages (English translation included).
Notice of Allowance dated May 18, 2022, in Canadian patent application No. 3,151,055, 1 page.
"Quantum Computing: Progress and Prospects" National Academies of Sciences, Engineering, and Medicine, pp. 1-273 (2019).
Benedetti, M., et al., "Parameterized quantum circuits as machine learning models," arXiv:1906.07682v2, pp. 1-18 (Oct. 10, 2019). Available online at <https://arxiv.org/abs/1906.07682v2>.
Colless, J.I., et al., "Robust determination of molecular spectra on a quantum processor," arxiv.org. Cornell University Library, 201 Olin Library Cornell University Ithaca, NY 14853, XP081278642, DOI: 10.1103/physrevx.8.011021, pp. 1-12 (Jul. 20, 2017).
Dyakonov, M., "The case against Quantum Computing", IEEE Spectrum, pp. 1-5 (Nov. 15, 2018).
Endo, S., et al., "Hybrid quantum-classical algorithms and quantum error mitigation," arXiv.2011.01382v1, pp. 1-39 (Nov. 2, 2020) Available online at [https://arxiv.org/abs/2011.01382].
Extended European Search Report dated May 19, 2022, in European patent application No. 19850377.3, 10 pages.
Hempel, C. et al., "Quantum chemistry calculations on a trapped-ion quantum simulator," arxiv.org. Cornell University Library, 201 Olin Library Cornell University Ithaca, NY 14853, XP080859698, pp. 1-21 (Mar. 27, 2018).
Horgan, J., "Will Quantum Computing Ever Live Up to Its Hype?", QUANTUM COMPUTING, Scientific American, pp. 6 (Apr. 20, 2021).
Huang, C., et al., "Classical Simulation of Quantum Supremacy Circuits," arXiv:2005.06787v1., pp. 1-28 (May 14, 2020) Available online at [https://arxiv.org/abs/2005.06787].
International Search Report & Written Opinion dated Jun. 15, 2022, in international patent application No. PCT/US2022/018727, 9 pages.
International Search Report & Written Opinion dated Jun. 28, 2022, in international patent application No. PCT/US2022/019724, 9 pages.
Moll, N., et al., "Quantum optimization using variational algorithms on near-term quantum devices," Quantum Science and Technology, vol. 3, pp. 18 (Jun. 19, 2018) [retrieved on Nov. 25, 2019], Retrieved from <https://iopscience.iop.org/article/10.1088/2058-9565/aab822/pdf>.
Non-Final Office Action dated May 11, 2022, in U.S. Appl. No. 16/543,165 of Peter D. Johnson, filed Aug. 16, 2019, 26 pages.
Preskill, J., "Quantum Computing in the NISQ era and beyond", pp. 1-20 (Jul. 31, 2018).
Sauvage, F., et al., "FLIP: A flexible initializer for arbitrarily-sized parametrized quantum circuits," https://arxiv.org/abs/2103.08572v2, 15 pages, (May 5, 2021).
Xia, R., and Kais, S., "Hybrid Quantum-Classical Neural Network for Calculating Ground State Energies of Molecules," Entropy, vol. 22, No. 8, pp. 1-12 (Jul. 29, 2020) Available online at [https://doi.org/10.3390/e22080828].
Johnson, P. D., et al., "QVECTOR: an algorithm for device-tailored quantum error correction," pp. 1-16, XP055553548, (Nov. 7, 2017) Retrieved from the Internet at <URL:https://arxiv.org/pdf/1711.02249 pdf.
Extended European Search Report dated Jun. 22, 2022, in European patent application No. 20791186.8, 8 pages.
S. Ghamami et al., "Efficient Monte Cado Counterparty Credit Risk Pricing and Measurement," Journal of Credit Risk, vol. 10, No. 3, Sep. 2014, pp. 87-133, DOI: 10.21314/JCR.2014.179.
Schuld, M., et al., "Circuit-centric quantum classifiers," arXiv preprint arXiv:1804.00633v1, pp. 1-17 (Apr. 2, 2018).
Irene Rodriguez-Lujan et al., "Quadratic Programming Feature Selection," The Journal of Machine Learning Research, vol. 11, 2010, pp. 1491-1516.
Sergey Bravyi, "Lagrangian Representation for Fermionic Linear Optics," Quantum Inf. and Comp., vol. 5, No. 3 (2005) pp. 216-238, arXiv:quant-ph/0404180.
Cao, Y., et al., "Quantum Chemistry in the Age of Quantum Computing", Quantum Physics, arXiv:1812.09976v2, pp. 1-194 (Dec. 28, 2018).
Morten Kjaergaard et al., "Superconducting Qubits: Current State of Play," Annual Reviews of Condensed Matter Physics 11, 369-395 (2020) arXiv:1905.13641.
Michael A Nielsen et al., "Quantum Computation as Geometry," Science 311, 1133 (2006) arXiv:quant-ph/0603161.
Johnson, P. D., et al., "QVECTOR: an algorithm for device-tailored quantum error correction", arXiv preprint arXiv:1711.02249v1, pp. 1-16 (Nov. 7, 2017).
Pierre-Luc Dallaire-Demers et al., "An application benchmark for fermionic quantum simulations," Mar. 2020, arXiv:2003.01862.
Dallaire-Demers, P., et al., "Quantum Generative Adversarial Networks," Quantum Physics, pp. 1-10 (Apr. 30, 2018).
Dallaire-Demers, P., et al., "Low-depth circuit ansatz for preparing correlated fermionic states on a quantum computer," Quantum Physics, arXiv:1801.01053, pp. 1-15 (Jan. 3, 2018).
Romero, J. et al., "Quantum autoencoders for efficient compression of quantum data," Quantum Science and Technology, vol. 2 (4):045001, pp. 1-10 (2017).
Bedürftig et al., "Spectrum of boundary states in the open Hubbard chain," Journal of Physics A: Mathematical and General, 30(12), p. 4139, 1997.
Nielsen, M. A., and Chuang, I. L., "Quantum Computation and Quantum Information", Cambridge University Press, pp. 704 (2000).
Fabian H. L. Essler et al., "The one-dimensional Hubbard model," book, Cambridge University Press, 2005.
Schuch, N., et al., "Computational Complexity of interacting electrons and fundamental limitations of Density Functional Theory", Nature Physics, | DOI: 10.1038/NPHYS1370, pp. 732-735, Aug. 23, 2009.
Michael Potthoff, "In Strongly Correlated Systems, Chapter 1: Self-energy—functional theory," arXiv:1108.2183, 38 pages, Springer, Berlin, Heidelberg, 2012.
Manby et al., "A simple, exact density-functional-theory embedding scheme," Journal of Chemical Theory and Computation, 8(8), 2012 pp. 2564-2568.
Bao, N. et al., "Universal Quantum Computation by Scattering in the Fermi—Hubbard model," New Journal of Physics, 17(9), 9 pages, 2015.
Lee et al., "Analytical Gradients for Projection-Based Wavefunction-in-DFT Embedding," arXiv preprint arXiv:1903.05830, 15 pages, 2019.
Arute et al., "Quantum supremacy using a programmable superconducting processor," Nature, 574(7779), pp. 505-510, 2019.
Guoming Wang, et al., "Bayesian Inference with Engineered Likelihood Functions for Robust Amplitude Estimation" arXiv:2006.09350, Jun. 2020, 62 pages.
First Office Action dated May 14, 2021, in Taiwan patent application No. 109139876, 9 pages (English translation included).
Notice of Allowance dated Jun. 28, 2021, for U.S. Appl. No. 17/033,727 of Pierre-Luc Dallaire-Demers, filed Sep. 26, 2020, 32 pages.
Decision to Grant dated Jul. 19, 2022, in Taiwan patent application No. 109139876, 5 pages.
Final Office Action dated Aug. 25, 2022, in U.S. Appl. No. 16/543,165 of Peter D. Johnson, filed Aug. 16, 2019, 73 pages.
Examination Report dated Aug. 24, 2022, in Canadian patent application No. 3,155,085, 4 pages.
Frank Jensen, "Introduction to computational chemistry," John Wiley & Sons, Great Britain, 2017, 620 pages.
Second Examination Report dated Aug. 2, 2022, in Canadian patent application No. 3,133,917, 3 pages.
Anirban Narayan Chowdhury et al., "Improved implementation of reflection operators", researchgate.net, Mar. 6, 2018, 12 pages.

(56) References Cited

OTHER PUBLICATIONS

Available online at https://www.researchgate.net/publication/323627065_Improved_implementation_of_reflection_operators.
Official Action dated Sep. 29, 2022, in Canadian patent application No. 3,157,270, 5 pages.
Extended European Search Report dated Sep. 20, 2022, in European patent application No. 20738886.9, 10 pages.
M Mohseni et al., "Quantum Process Tomography: Resource Analysis of Different Strategies," arxiv.org, Cornell University Library, 201 Olin Library Cornell University Ithaca, NY 14853, Feb. 13, 2007, XP080275525, DOI: 10.1103/PHYSREVA.77.032322, 10 pages.
A. Shabani et al., "Efficient measurement of quantum dynamics via compressive sensing," arxiv.org, Cornell University Library, 201 Olin Library Cornell University Ithaca, NY 14853, Oct. 28, 2009, XP080374481, DOI: 10.1103/PHYSREVLETT.106.100401, 9 pages.
First Examination Report dated Oct. 28, 2022, in Australian patent application No. 2020292425, 3 pages.
Extended European Search Report dated Nov. 15, 2022, in European patent application No. 20868114.8, 10 pages.
Non-Final Office Action dated Dec. 6, 2022, in U.S. Appl. No. 16/543,165 of Peter D. Johnson, filed Aug. 16, 2019, 23 pages.
Non-Final Office Action dated Dec. 8, 2022 for U.S. Appl. No. 16/740,177, of Maxwell D. Radin, filed Jan. 10, 2020, 85 pages.

\* cited by examiner

Algorithm 1: Gradient ascent for Fisher information maximization in the ancilla-free case

Input: The prior mean $\mu$ of $\theta$, the number $L$ of circuit layers, the fidelity $f$ of the process for generating the ELF, the step size schedule $\delta : \mathbb{Z}^{>0} \to \mathbb{R}^+$, the error tolerance $\epsilon$ for termination.

Output: A set of parameters $\vec{x} = (x_1, x_2, \ldots, x_{2L}) \in \mathbb{R}^{2L}$ that are a local maximum point of the function $\mathcal{I}(\mu; f, \vec{x})$.

Choose random initial point $\vec{x}^{(t)} = (x_1^{(t)}, x_2^{(t)}, \ldots, x_{2L}^{(t)}) \in (-\pi, \pi]^{2L}$;

$t \leftarrow 0$;

while *True* do for $j \leftarrow 1$ to $2L$ do

Let $\vec{x}_{-j}^{(t)} = (x_1^{(t)}, \ldots, x_{j-1}^{(t)}, x_{j+1}^{(t)}, \ldots, x_{2L}^{(t)})$;

Compute $C_j^{(t)} := C_j(\mu; \vec{x}_{-j}^{(t)})$, $S_j^{(t)} := S_j(\mu; \vec{x}_{-j}^{(t)})$, $B_j^{(t)} := B_j(\mu; \vec{x}_{-j}^{(t)})$, $C_j'^{(t)} := C_j'(\mu; \vec{x}_{-j}^{(t)})$,
$S_j'^{(t)} := S_j'(\mu; \vec{x}_{-j}^{(t)})$, $B_j'^{(t)} := B_j'(\mu; \vec{x}_{-j}^{(t)})$ by using the procedures in Lemma 1;

Compute $\Delta(\mu; \vec{x})$, $\Delta'(\mu; \vec{x})$ and their partial derivatives with respect to $x_j$ at $\vec{x} = \vec{x}^{(t)}$ as follows:

$$\Delta^{(t)} := \Delta(\mu; \vec{x}^{(t)}) = C_j^{(t)} \cos(2x_j) + S_j^{(t)} \sin(2x_j) + B_j^{(t)}, \quad (56)$$

$$\Delta'^{(t)} := \Delta'(\mu; \vec{x}^{(t)}) = C_j'^{(t)} \cos(2x_j) + S_j'^{(t)} \sin(2x_j) + B_j'^{(t)}, \quad (57)$$

$$\chi_j^{(t)} := \frac{\partial \Delta(\mu; \vec{x})}{\partial x_j}\bigg|_{\vec{x}=\vec{x}^{(t)}} = 2\left(-C_j^{(t)} \sin(2x_j) + S_j^{(t)} \cos(2x_j)\right); \quad (58)$$

$$\chi_j'^{(t)} := \frac{\partial \Delta'(\mu; \vec{x})}{\partial x_j}\bigg|_{\vec{x}=\vec{x}^{(t)}} = 2\left(-C_j'^{(t)} \sin(2x_j) + S_j'^{(t)} \cos(2x_j)\right); \quad (59)$$

FROM FIG. 9A

Compute the partial derivative of $\mathcal{I}(\mu; f, \vec{x})$ with respect to $x_j$ at $\vec{x} = \vec{x}^{(t)}$ as follows:

$$\gamma_j^{(t)} := \frac{\partial \mathcal{I}(\mu; f, \vec{x})}{\partial x_j}\bigg|_{\vec{x}=\vec{x}^{(t)}} = \frac{2f^2 \left[(1 - f^2(\Delta^{(t)})^2)\Delta'^{(t)}\chi_j^{(t)} + f^2\Delta^{(t)}\chi_j^{(t)}(\Delta'^{(t)})^2\right]}{\left[1 - f^2(\Delta^{(t)})^2\right]^2} \quad (60)$$

end

Set $\vec{x}^{(t+1)} = \vec{x}^{(t)} + \delta(t)\nabla\mathcal{I}(\mu; f, \vec{x})|_{\vec{x}=\vec{x}^{(t)}}$, where $\nabla\mathcal{I}(\mu; f, \vec{x})|_{\vec{x}=\vec{x}^{(t)}} = (\gamma_1^{(t)}, \gamma_2^{(t)}, \ldots, \gamma_{2L}^{(t)})$;

if $|\mathcal{I}(\mu; f, \vec{x}^{(t+1)}) - \mathcal{I}(\mu; f, \vec{x}^{(t)})| < \epsilon$ then
  | break;
end $t \leftarrow t + 1$;

end

Return $\vec{x}^{(t+1)} = (x_1^{(t+1)}, x_2^{(t+1)}, \ldots, x_{2L}^{(t+1)})$ as the optimal parameters.

FIG. 9B

Algorithm 2: Coordinate ascent for Fisher information maximization in the ancilla-free case

Input: The prior mean $\mu$ of $\theta$, the number $L$ of circuit layers, the fidelity $f$ of the process for generating the ELF, the error tolerance $\epsilon$ for termination.

Output: A set of parameters $\vec{x} = (x_1, x_2, \ldots, x_{2L}) \in (-\pi, \pi]^{2L}$ that are a local maximum point of the function $\mathcal{I}(\mu, f, \vec{x})$.

Choose random initial point $\vec{x}^{(0)} = (x_1^{(0)}, x_2^{(0)}, \ldots, x_{2L}^{(0)}) \in (-\pi, \pi]^{2L}$;
$t \leftarrow 1$;
while *True* do
    for $j \leftarrow 1$ to $2L$ do
        Let $\vec{x}_{-j}^{(t)} = (x_1^{(t)}, \ldots, x_{j-1}^{(t)}, x_{j+1}^{(t-1)}, \ldots, x_{2L}^{(t-1)})$;
        Compute $C_j^{(t)} := C_j(\mu, \vec{x}_{-j}^{(t)})$, $S_j^{(t)} := S_j(\mu, \vec{x}_{-j}^{(t)})$, $B_j^{(t)} := B_j(\mu, \vec{x}_{-j}^{(t)})$, $C_j'^{(t)} := C_j'(\mu, \vec{x}_{-j}^{(t)})$,
        $S_j'^{(t)} := S_j'(\mu, \vec{x}_{-j}^{(t)})$, $B_j'^{(t)} := B_j'(\mu, \vec{x}_{-j}^{(t)})$ by using the procedures in Lemma 1;
        Solve the single-variable optimization problem $$\arg\max_z \frac{f^2 \left(C_j'^{(t)} \cos(2z) + S_j'^{(t)} \sin(2z) + B_j'^{(t)}\right)^2}{1 - f^2 \left(C_j^{(t)} \cos(2z) + S_j^{(t)} \sin(2z) + B_j^{(t)}\right)^2}$$

by standard gradient-based methods and set $x_j^{(t)}$ to be its solution;
    end
    if $|\mathcal{I}(\mu, f, \vec{x}^{(t)}) - \mathcal{I}(\mu, f, \vec{x}^{(t-1)})| < \epsilon$ then
        break;
    end
    $t \leftarrow t + 1$;
end
Return $\vec{x}^{(t)} = (x_1^{(t)}, x_2^{(t)}, \ldots, x_{2L}^{(t)})$ as the optimal parameters.

FIG. 10

Algorithm 3: Gradient ascent for slope maximization in the ancilla-free case

Input: The prior mean $\mu$ of $\theta$, the number $L$ of circuit layers, the step size schedule $\delta : \mathbb{Z}^{\geq 0} \to \mathbb{R}^+$, the error tolerance $\epsilon$ for termination.

Output: A set of parameters $\vec{x} = (x_1, x_2, \ldots, x_{2L}) \in \mathbb{R}^{2L}$ that are a local maximum point of the function $|\Delta'(\mu; \vec{x})|$.

Choose random initial point $\vec{x}^{(0)} = (x_1^{(0)}, x_2^{(0)}, \ldots, x_{2L}^{(0)}) \in (-\pi, \pi]^{2L}$;
$t \leftarrow 0$;
while *True* do
    for $j \leftarrow 1$ to $2L$ do
        Let $\vec{x}_{-j}^{(t)} = (x_1^{(t)}, \ldots, x_{j-1}^{(t)}, x_{j+1}^{(t)}, \ldots, x_{2L}^{(t)})$;
        Compute $C_j^{(t)} := C_j'(\mu; \vec{x}_{-j}^{(t)})$, $S_j^{(t)} := S_j'(\mu; \vec{x}_{-j}^{(t)})$ and $B_j^{(t)} := B_j'(\mu; \vec{x}_{-j}^{(t)})$ by using the procedures in Lemma 1;
        Compute $\Delta'(\mu; \vec{x})$ at $\vec{x} = \vec{x}^{(t)}$ as follows:

$$\Delta'^{(t)} := \Delta'(\mu; \vec{x}^{(t)}) = C_j^{(t)} \cos\left(2x_j^{(t)}\right) + S_j^{(t)} \sin\left(2x_j^{(t)}\right) + B_j^{(t)}; \quad (61)$$

Compute the partial derivative of $\Delta'(\mu; \vec{x})$ with respect to $x_j$ as follows:

$$\gamma_j^{(t)} := \frac{\partial \Delta'(\mu; \vec{x})}{\partial x_j}\bigg|_{\vec{x}=\vec{x}^{(t)}} = 2\left(-C_j^{(t)} \sin\left(2x_j^{(t)}\right) + S_j^{(t)} \cos\left(2x_j^{(t)}\right)\right); \quad (62)$$

end

FROM FIG. 9B

Set $\vec{x}^{(t+1)} = \vec{x}^{(t)} + \delta(t_i)\nabla^{(t)}$, where $\nabla^{(t)} := (2\Delta'^{(t)}\gamma_1^{(t)}, 2\Delta'^{(t)}\gamma_2^{(t)}, \ldots, 2\Delta'^{(t)}\gamma_{2L}^{(t)})$ is the gradient of $(\Delta'(\mu; \vec{x}))^2$ at $\vec{x} = \vec{x}^{(t)}$;

if $|\Delta'(\mu; \vec{x}^{(t+1)}) - \Delta'(\mu; \vec{x}^{(t)})| < \epsilon$ then
    | break;
    end
    $t \leftarrow t + 1$;
end
Return $\vec{x}^{(t+1)} = (x_1^{(t+1)}, x_2^{(t+1)}, \ldots, x_{2L}^{(t+1)})$ as the optimal parameters.

FIG. 11B

Algorithm 4: Coordinate ascent for slope maximization in the ancilla-free case

Input: The prior mean $\mu$ of $\theta$, the number $L$ of circuit layers, the error tolerance $\epsilon$ for termination.
Output: A set of parameters $\vec{x} = (x_1, x_2, \ldots, x_{2L}) \in (-\pi, \pi]^{2L}$ that are a local maximum point of the function $|\Delta'(\mu; \vec{x})|$.

Choose random initial point $\vec{x}^{(0)} = (x_1^{(0)}, x_2^{(0)}, \ldots, x_{2L}^{(0)}) \in (-\pi, \pi]^{2L}$;
$t \leftarrow 1$;
while *True* do
    for $j \leftarrow 1$ to $2L$ do
        Let $\vec{x}_{-j}^{(t)} = (x_1^{(t)}, \ldots, x_{j-1}^{(t)}, x_{j+1}^{(t-1)}, \ldots, x_{2L}^{(t-1)})$;
        Compute $C_j^{(t)} := C_j(\mu; \vec{x}_{-j}^{(t)})$, $S_j^{(t)} := S_j(\mu; \vec{x}_{-j}^{(t)})$, $B_j^{(t)} := B_j(\mu; \vec{x}_{-j}^{(t)})$ by using the procedures in Lemma 1;
        Set $x_j^{(t)} = \text{Arg}\left(\text{sgn}\left(B_j^{(t)}\right)\left(C_j^{(t)} + iS_j^{(t)}\right)\right)/2$, where $\text{sgn}(z) = 1$ if $z \geq 0$ and $-1$ otherwise;
    end
    if $|\Delta'(\mu; \vec{x}^{(t)}) - \Delta'(\mu; \vec{x}^{(t-1)})| < \epsilon$ then
        break;
    end
    $t \leftarrow t + 1$;
end
Return $\vec{x}^{(t)} = (x_1^{(t)}, x_2^{(t)}, \ldots, x_{2L}^{(t)})$ as the optimal parameters.

FIG. 12

Algorithm 5: Gradient ascent for Fisher information maximization in the ancilla-based case

Input: The prior mean $\mu$ of $\theta$, the number $L$ of circuit layers, the fidelity $f$ of the process for generating the ELF, the step size schedule $\delta : \mathbb{Z}^{\geq 0} \to \mathbb{R}^+$, the error tolerance $\epsilon$ for termination.

Output: A set of parameters $\vec{x} = (x_1, x_2, \ldots, x_{2L}) \in \mathbb{R}^{2L}$ that are a local maximum point of the function $\mathcal{I}(\mu; f, \vec{x})$.

Choose random initial point $\vec{x}^{(0)} = (x_1^{(0)}, x_2^{(0)}, \ldots, x_{2L}^{(0)}) \in (-\pi, \pi]^{2L}$;
$t \leftarrow 0$;
while *True* do
  for $j \leftarrow 1$ to $2L$ do
    Let $\vec{x}_{-j}^{(t)} = (x_1^{(t)}, \ldots, x_{j-1}^{(t)}, x_{j+1}^{(t)}, \ldots, x_{2L}^{(t)})$;
    Compute $C_j^{(t)} := C_j(\mu; \vec{x}_{-j}^{(t)})$, $S_j^{(t)} := S_j(\mu; \vec{x}_{-j}^{(t)})$, $C_j'^{(t)} := C_j'(\mu; \vec{x}_{-j}^{(t)})$ and $S_j'^{(t)} := S_j'(\mu; \vec{x}_{-j}^{(t)})$ by using the procedures in Lemma 2;
    Compute $\Lambda(\mu; \vec{x})$, $\Lambda'(\mu; \vec{x})$ and their partial derivatives with respect to $x_j$ at $\vec{x} = \vec{x}^{(t)}$ as follows:

$$\Lambda^{(t)} := \Lambda(\mu; \vec{x}^{(t)}) = C_j^{(t)} \cos(x_j) + S_j^{(t)} \sin(x_j), \quad (198)$$

$$\Lambda'^{(t)} := \Lambda'(\mu; \vec{x}^{(t)}) = C_j'^{(t)} \cos(x_j) + S_j'^{(t)} \sin(x_j), \quad (199)$$

$$Y_j^{(t)} := \left.\frac{\partial \Lambda(\mu; \vec{x})}{\partial x_j}\right|_{\vec{x}=\vec{x}^{(t)}} = -C_j^{(t)} \sin(x_j) + S_j^{(t)} \cos(x_j), \quad (200)$$

$$Y_j'^{(t)} := \left.\frac{\partial \Lambda'(\mu; \vec{x})}{\partial x_j}\right|_{\vec{x}=\vec{x}^{(t)}} = -C_j'^{(t)} \sin(x_j) + S_j'^{(t)} \cos(x_j); \quad (201)$$

FROM FIG.29A

Compute the partial derivative of $\mathcal{I}(\mu; f, \vec{x})$ with respect to $x_j$ at $\vec{x} = \vec{x}^{(t)}$ as follows:

$$\gamma_j^{(t)} := \frac{\partial \mathcal{I}(\mu; f, \vec{x})}{\partial x_j}\bigg|_{\vec{x}=\vec{x}^{(t)}} = \frac{2f^2\left[(1-f^2(\Lambda^{(t)})^2)\Lambda'^{(t)}\chi_j^{(t)} + f^2\Lambda^{(t)}\chi_j^{(t)}(\Lambda'^{(t)})^2\right]}{[1-f^2(\Lambda^{(t)})^2]^2} \quad (202)$$

end

Set $\vec{x}^{(t+1)} = \vec{x}^{(t)} + \delta(t)\nabla \mathcal{I}(\mu; f, \vec{x})|_{\vec{x}=\vec{x}^{(t)}}$, where $\nabla \mathcal{I}(\mu; f, \vec{x})|_{\vec{x}=\vec{x}^{(t)}} = (\gamma_1^{(t)}, \gamma_2^{(t)}, \ldots, \gamma_{2L}^{(t)})$;

if $|\mathcal{I}(\mu; f, \vec{x}^{(t+1)}) - \mathcal{I}(\mu; f, \vec{x}^{(t)})| < \epsilon$ then
  | break;
end
$t \leftarrow t + 1$;

end

Return $\vec{x}^{(t+1)} = (x_1^{(t+1)}, x_2^{(t+1)}, \ldots, x_{2L}^{(t+1)})$ as the optimal parameters.

FIG. 29B

__Algorithm 6:__ Coordinate ascent for Fisher information maximization in the ancilla-based case

Input: The prior mean $\mu$ of $\theta$, the number $L$ of circuit layers, the fidelity $f$ of the process for generating the ELF, the error tolerance $\epsilon$ for termination.

Output: A set of parameters $\vec{x} = (x_1, x_2, \ldots, x_{2L}) \in (-\pi, \pi]^{2L}$ that are a local maximum point of the function $\mathcal{I}(\mu; f, \vec{x})$.

Choose random initial point $\vec{x}^{(0)} = (x_1^{(0)}, x_2^{(0)}, \ldots, x_{2L}^{(0)}) \in (-\pi, \pi]^{2L}$;
$t \leftarrow 1$;
while *True* do
    for $j \leftarrow 1$ to $2L$ do
        Let $\vec{x}_{-j}^{(t)} = (x_1^{(t)}, \ldots, x_{j-1}^{(t)}, x_{j+1}^{(t-1)}, \ldots, x_{2L}^{(t-1)})$;
        Compute $C_j^{(t)} := C_j(\mu; \vec{x}_{-j}^{(t)}), S_j^{(t)} := S_j(\mu; \vec{x}_{-j}^{(t)}), C_j'^{(t)} := C_j'(\mu; \vec{x}_{-j}^{(t)})$ and $S_j'^{(t)} := S_j'(\mu; \vec{x}_{-j}^{(t)})$ by using the procedures in Lemma 2;
        Solve the single-variable optimization problem
$$\arg\max_z \frac{f^2 \left(C_j'^{(t)} \cos(z) + S_j'^{(t)} \sin(z)\right)^2}{1 - f^2 \left(C_j^{(t)} \cos(z) + S_j^{(t)} \sin(z)\right)^2}$$
by standard gradient-based methods and set $x_j^{(t)}$ to be its solution;

end

```
        if |ℒ(μ, f, x⃗^(t)) − ℒ(μ, f, x⃗^(t−1))| < ε then
          | break;
        end
        t ← t + 1;
    end
    Return x⃗^(t) = (x_1^(t), x_2^(t), ..., x_{2L}^(t)) as the optimal parameters.
```

FIG. 30B

Algorithm 7: Gradient ascent for slope maximization in the ancilla-based case

Input: The prior mean $\mu$ of $\theta$, the number $L$ of circuit layers, the step size schedule $\delta : \mathbb{Z}^{\geq 0} \to \mathbb{R}^+$, the error tolerance $\epsilon$ for termination.

Output: A set of parameters $\vec{x} = (x_1, x_2, \ldots, x_{2L}) \in \mathbb{R}^{2L}$ that are a local maximum point of the function $|\Lambda'(\mu; \vec{x})|$.

Choose random initial point $\vec{x}^{(0)} = (x_1^{(0)}, x_2^{(0)}, \ldots, x_{2L}^{(0)}) \in (-\pi, \pi]^{2L}$;
$t \leftarrow 0$;
while *True* do
    for $j \leftarrow 1$ to $2L$ do
        Let $\vec{x}_{-j}^{(t)} = (x_1^{(t)}, \ldots, x_{j-1}^{(t)}, x_{j+1}^{(t)}, \ldots, x_{2L}^{(t)})$;
        Compute $C_j^{(t)} := C_j'(\mu; \vec{x}_{-j}^{(t)})$ and $S_j^{(t)} := S_j'(\mu; \vec{x}_{-j}^{(t)})$ by using the procedures in Lemma 2;
        Compute $\Lambda'(\mu; \vec{x})$ at $\vec{x} = \vec{x}^{(t)}$ as follows:

$$\Lambda'^{(t)} := \Lambda'(\mu; \vec{x}^{(t)}) = C_j^{(t)} \cos\left(x_j^{(t)}\right) + S_j^{(t)} \sin\left(x_j^{(t)}\right) ; \quad (203)$$

Compute the partial derivative of $\Lambda'(\mu; \vec{x})$ with respect to $x_j$ as follows:

$$\gamma_j^{(t)} := \left.\frac{\partial \Lambda'(\mu; \vec{x})}{\partial x_j}\right|_{\vec{x} = \vec{x}^{(t)}} = -C_j^{(t)} \sin\left(x_j^{(t)}\right) + S_j^{(t)} \cos\left(x_j^{(t)}\right) ; \quad (204)$$

end

FROM FIG. 31A

Set $\vec{x}^{(t+1)} = \vec{x}^{(t)} + \delta(t)\nabla^{(t)}$, where $\nabla^{(t)} := (2\Lambda'^{(t)}z_1^{(t)}, 2\Lambda'^{(t)}z_2^{(t)}, \ldots, 2\Lambda'^{(t)}z_{2L}^{(t)})$ is the gradient of $(\Lambda'(\mu_i; \vec{x}))^2$ at $\vec{x} = \vec{x}^{(t)}$;
if $|\Lambda'(\mu_i; \vec{x}^{(t+1)}) - \Lambda'(\mu_i; \vec{x}^{(t)})| < \epsilon$ then
  | break;
  end
  $t \leftarrow t + 1$;
end
Return $\vec{x}^{(t+1)} = (x_1^{(t+1)}, x_2^{(t+1)}, \ldots, x_{2L}^{(t+1)})$ as the optimal parameters.

FIG. 31B

Algorithm 8: Coordinate ascent for slope optimization in the ancilla-based case

Input: The prior mean $\mu$ of $\theta$, the number $L$ of circuit layers, the error tolerance $\epsilon$ for termination.
Output: A set of parameters $\vec{x} = (x_1, x_2, \ldots, x_{2L}) \in (-\pi, \pi]^{2L}$ that are a local maximum point of the function $|\Lambda'(\mu; \vec{x})|$.

Choose random initial point $\vec{x}^{(0)} = (x_1^{(0)}, x_2^{(0)}, \ldots, x_{2L}^{(0)}) \in (-\pi, \pi]^{2L}$;
$t \leftarrow 1$;
while *True* do
    for $j \leftarrow 1$ to $2L$ do
        Let $\vec{x}_{-j}^{(t)} = (x_1^{(t)}, \ldots, x_{j-1}^{(t)}, x_{j+1}^{(t-1)}, \ldots, x_{2L}^{(t-1)})$;
        Compute $C_j^{(t)} := C_j'(\mu; \vec{x}_{-j}^{(t)})$ and $S_j^{(t)} := S_j'(\mu; \vec{x}_{-j}^{(t)})$ by using the procedures in Lemma 2;
        Set $x_j^{(t)} = \text{Arg}\left(C_j^{(t)} + iS_j^{(t)}\right)$;
    end
    if $||\Lambda'(\mu; \vec{x}^{(t)})| - |\Lambda'(\mu; \vec{x}^{(t-1)})|| < \epsilon$ then
        break;
    end
    $t \leftarrow t + 1$;
end
Return $\vec{x}^{(t)} = (x_1^{(t)}, x_2^{(t)}, \ldots, x_{2L}^{(t)})$ as the optimal parameters.

FIG. 32

HYBRID QUANTUM-CLASSICAL COMPUTER FOR BAYESIAN INFERENCE WITH ENGINEERED LIKELIHOOD FUNCTIONS FOR ROBUST AMPLITUDE ESTIMATION

BACKGROUND

Quantum computers promise to solve industry-critical problems which are otherwise unsolvable or only very inefficiently addressable using classical computers. Key application areas include chemistry and materials, bioscience and bioinformatics, logistics, and finance. Interest in quantum computing has recently surged, in part due to a wave of advances in the performance of ready-to-use quantum computers. However, near-term quantum devices are still extremely limited in resources, preventing the deployment of quantum computers on problems of practical interest.

A recent flurry of methods which cater to the limitations of near-term quantum devices have drawn significant attention. These methods include the variational quantum eigensolver (VQE), quantum approximate optimization algorithm (QAOA) and variants, variational quantum linear systems solver, other quantum algorithms leveraging the variational principles, and quantum machine learning algorithms. In spite of such algorithmic innovations, many of these approaches have appeared to be impractical for commercially-relevant problems owing to their high cost in terms of number of measurements and runtime. Yet, methods offering a quadratic speedup in runtime, such as phase estimation, demand quantum resources that are far beyond the reach of near-term devices for moderately large problem instances.

SUMMARY

The number of measurements demanded by hybrid quantum-classical algorithms such as the variational quantum eigensolver (VQE) is prohibitively high for many problems of practical value. Quantum algorithms which reduce this cost (e.g. quantum amplitude and phase estimation) require error rates that are too low for near-term implementation. Embodiments of the present invention include hybrid quantum-classical (HQC) computers, and methods performed by HQC computers, which take advantage of the available quantum coherence to maximally enhance the power of sampling on noisy quantum devices, reducing measurement number and runtime compared to VQE. Such embodiments derive inspiration from quantum metrology, phase estimation, and the more recent "alpha-VQE" proposal, arriving at a general formulation that is robust to error and does not require ancilla qubits. The central object of this method is what we call the "engineered likelihood function" (ELF), used for carrying out Bayesian inference. Embodiments of the present invention use the ELF formalism to enhance the quantum advantage in sampling as the physical hardware transitions from the regime of noisy intermediate-scale quantum computers into that of quantum error corrected ones. This technique speeds up a central component of many quantum algorithms, with applications including chemistry, materials, finance, and beyond.

Other features and advantages of various aspects and embodiments of the present invention will become apparent from the following description and from the claims.

BRIEF DESCRIPTION OF THE FIGURES

FIGS. 9A-9B, 10, 11A-11B, and 12 illustrate various algorithms performed by embodiments of the present invention;

FIGS. 29A-29B, 30A-30B, 31A-31B and 32 show algorithms implemented according to embodiments of the present invention.

DETAILED DESCRIPTION

Figure 4:
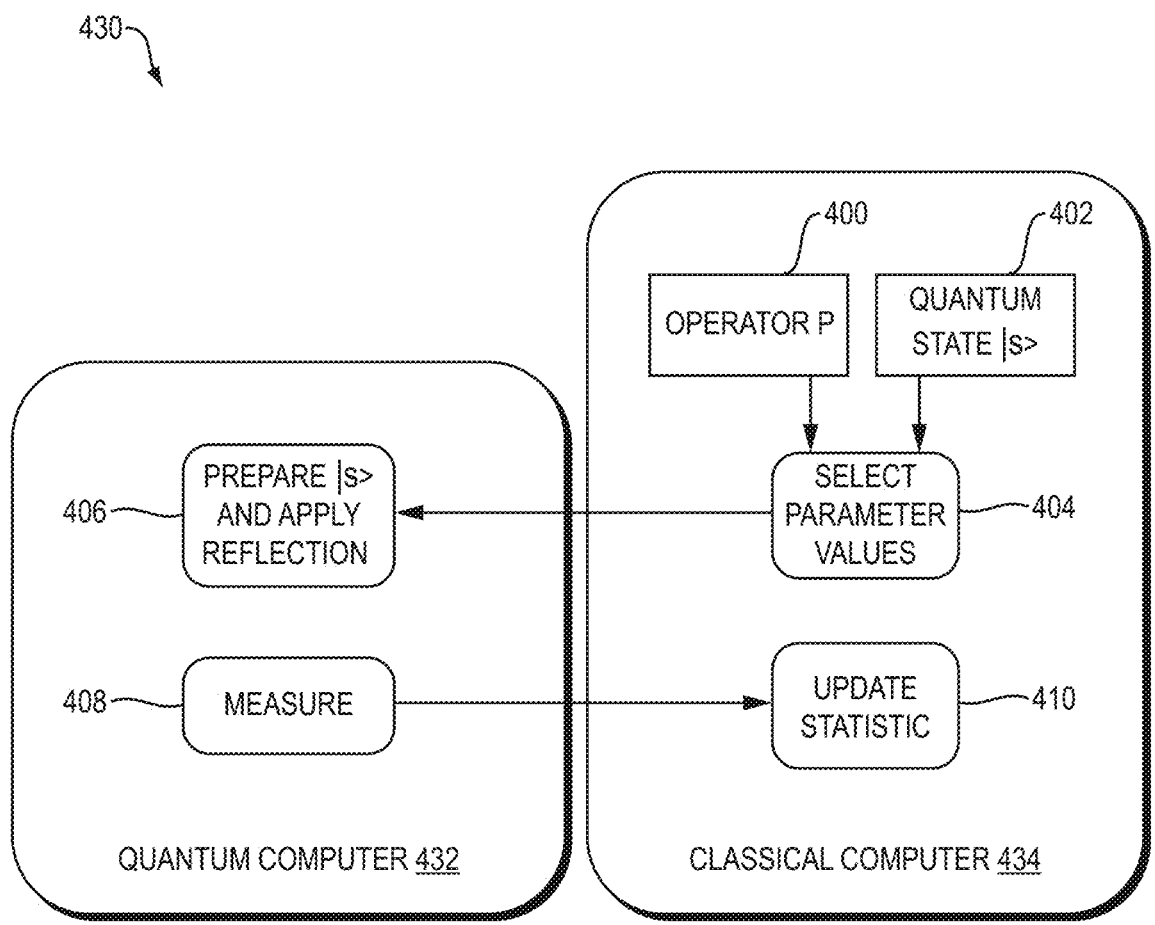
FIG. 4 is a diagram of a hybrid quantum-classical (HQC) computer for performing quantum amplitude estimation according to one embodiment of the present invention.

Embodiments of the present invention are directed to a hybrid quantum-classical (HQC) computer which performs quantum amplitude estimation. Referring to FIG. 4, a flow diagram is shown of a HQC 430, including both a quantum computer 432 and a classical computer 434, which performs a method of quantum amplitude estimation according to one embodiment of the present invention. In the block 404, which is performed with the classical computer 434, a plurality of quantum-circuit-parameter values is selected to optimize an accuracy-improvement rate of a statistic estimating an expectation value $\langle s|P|s \rangle$ of an observable P 400 with respect to a quantum state $|\rangle$ 402.

In embodiments, the statistic is a sample mean calculated from a plurality of values sampled from a random variable. In the present discussion, these sampled values are obtained by measuring qubits of the quantum computer 432. However, the statistic may alternatively be a skewness, kurtosis, quantile, or another type of statistic without departing from the scope hereof. The statistic is an estimator of the expectation value $\langle s|P|z \rangle$, and may be either biases or unbiased. The plurality of values may be modeled according to a probability distribution, in which case the statistic may represent a parameter of the probability distribution. For example, the statistic may represent a mean of a Gaussian distribution, as described in more detail below in Section 3.2.

The quantum-circuit parameter values are real numbers that control how quantum gates operate on qubits. In the present discussion, each quantum circuit can be represented as a sequence of quantum gates in which each quantum gate of the sequence is controlled by one of the quantum-circuit parameter values. For example, each of the quantum-circuit parameters value may represent an angle by which the state of one or more qubits is rotated in a corresponding Hilbert space.

The accuracy-improvement rate is a function that expresses by how much a corresponding accuracy of the statistic improves with each iteration of the present method embodiments. The accuracy-improvement rate is a function of the quantum-circuit parameters, and may additionally be a function of the statistic (e.g., the mean). The accuracy is any quantitative measure of an error of the statistic. For example, the accuracy may be a mean squared error, standard deviation, variance, mean absolute error, or another moment of the error. Alternatively, the accuracy may be an information metric, such as Fisher information or information entropy. Examples that use variance for the accuracy are described in more detail below (e.g., see Eqn. 36). In these examples, the accuracy-information rate may be the variance reduction factor introduced in Eqn. 38. Alternatively, the accuracy-information rate may be Fisher information (e.g., see Eqn. 42). However, the accuracy-improvement rate may be another function quantifying improvements in the accuracy without departing from the scope hereof.

In some embodiments, the plurality of quantum-circuit-parameter values is selected using one of coordinate ascent and gradient descent. Both of these techniques are described in more detail in Section 4.1.1.

In the block 406, which is performed with the quantum computer 432, a sequence of alternating first and second generalized reflection operators is applied to one or more qubits of the quantum computer 432 to transform the one or more qubits from the quantum state $|s\rangle$ into a reflected quantum state. Each of the first and second generalized reflection operators are controlled according to a corresponding one of the plurality of quantum-circuit-parameter values. The operators U(x) and V(y) described in Section 3.1 are examples of the first and second generalized reflection operators, respectively. The operator $Q(\vec{x})$ introduced in Eqn. 19 is one example of a sequence of alternative first and second generalized reflection operators, where the vector $\vec{z}$ represents the plurality of quantum-circuit-parameter values. The sequence of first and second generalized reflection operators and the observable P may define a bias of an engineered likelihood function, as described below with respect to Eqn. 26.

In the block 408, which is also performed with the quantum computer 432, the plurality of qubits in the reflected quantum state are measured with respect to the observable P to obtain a set of measurement outcomes. In the block 410, which is performed on the classical computer 434, the statistic is updated with the set of measurement outcomes to obtain an estimate of $\langle s|P|s \rangle$ with higher accuracy.

The method may further include outputting the statistic after said updating. Alternatively, the method may iterate over the blocks 404, 406, 408, and 410. In some embodiments, the method further includes updating, on the classical computer 434 and with the set of measurement outcomes, an accuracy estimate of the statistic. The accuracy estimate is the calculated value of the accuracy described above (e.g., variance). In these embodiments, the method iterates over the blocks 404, 406, 408, and 410 until the accuracy estimate falls below a threshold.

In some embodiments, the statistic is updated in the block 410 by updating a prior distribution with the plurality of measurements to obtain a posterior distribution, and calculating an updated statistic from the posterior distribution.

In some embodiments, the plurality of quantum-circuit-parameter values is selected based on the statistic and an accuracy estimate of the statistic. The plurality of quantum-circuit-parameter values may further be selected based on a fidelity representing errors occurring during said applying and measuring.

1.1. Introduction

The combination of phase estimation and the Bayesian perspective gives rise to Bayesian phase estimation techniques that are more suitable for noisy quantum devices capable of realizing limited depth quantum circuits than the early proposals. Adopting the notation from above, the circuit parameters $\vec{\theta} = (m, \beta)$ and the goal is to estimate the phase $\Pi$ in an eigenvalue $e^{i \arccos \Pi}$ of the operator U. An important note is that the likelihood function here, $$p(d \mid m, \beta, \Pi) = \frac{1}{2}(1 + (-1)^d[\cos(\beta)\mathcal{T}_m(\Pi) + \sin(\beta)\mathcal{U}_m(\Pi)]), \quad (1)$$

where $\mathcal{T}_m$ and $\mathcal{U}_m$ are Chebyshev polynomials of first and second kind respectively, is shared in many settings beyond Bayesian phase estimation. This commonality makes the Bayesian inference machinery used for tasks such as Hamiltonian characterization relevant to phase estimation. In the exponential advantage of Bayesian inference with a Gaussian prior over other non-adaptive sampling methods is established by showing that the expected posterior variance σ decays exponentially in the number of inference steps. Such exponential convergence is at a cost of O(1/σ) amount of quantum coherence required at each inference step. Such scaling is also confirmed in the context of Bayesian phase estimation.

Equipped with the techniques of Bayesian phase estimation as well as the perspective of overlap estimation as an amplitude estimation problem, one may devise a Bayesian inference method for operator measurement that smoothly interpolates between the standard sampling regime and phase estimation regime. This is proposed as "α-VQE", where the asymptotic scaling for performing an operator measurement is $O(1/\epsilon^{\alpha})$ with the extremal values of α=2 corresponding to the standard sampling regime (typically realized in VQE) and α=1 corresponding to the quantum-enhanced regime where the scaling reaches the Heisenberg limit (typically realized with phase estimation). By varying the parameters for the Bayesian inference one can also achieve α values between 1 and 2. The lower the α value, the deeper the quantum circuit needed for Bayesian phase estimation. This accomplishes the trade-off between quantum coherence and asymptotic speedup for the measurement process.

It is also worth noting that phase estimation is not the only paradigm that can reach the Heisenberg limit for amplitude estimation. In previous works, the authors consider the task of estimating the parameter θ of a quantum state $\rho_\theta$. A parallel strategy is proposed where m copies of the parametrized circuit for generating $\rho_\theta$, together with an entangled initial state and measurements in an entangled basis, are used to create states with the parameter θ amplified to mθ. Such amplification can also give rise to likelihood functions that are similar to that in Equation 1. In previous work it is shown that with randomized quantum operations and Bayesian inference one can extract information in fewer iteration than classical sampling even in the presence of noise. In quantum amplitude estimation circuits with varying numbers m of iterations and numbers N of measurements are considered. A particularly chosen set of pairs (m, N) gives rise to a likelihood function that can be used for inferring the amplitude to be estimated. Heisenberg limit is demonstrated for one particular likelihood function construction given by the authors. Both works highlight the power of parametrized likelihood functions, making it tempting to investigate their performance under imperfect hardware conditions.

1.2. Main results Embodiments of the present invention include systems and methods for estimating the expectation Π=⟨A|O|A⟩ where the state |A⟩ can be prepared by a quantum circuit A such that |A⟩=A|0⟩. Embodiments of the present invention may use a family of quantum circuits, such that, as the circuit deepens with more repetitions of A, it allows for likelihood functions that are polynomial in Π of ever higher degree. As described in the next section with a concrete example, a direct consequence of this increase in polynomial degree is an increase in the power of inference, which can be quantified by Fisher information gain at each inference step. After establishing this "enhanced sampling" technique, embodiments of the present invention may introduce parameters into the quantum circuit and render the resulting likelihood function tunable. Embodiments of the present invention may optimize the parameters for maximal information gain during each step of inference. The following lines of insight emerge from our efforts:

1. The role of noise and error in amplitude estimation: Previous works have revealed the impact of noise on the likelihood function and the output estimation of the Hamiltonian spectrum. The disclosure herein investigates the same for schemes of amplitude estimation used by embodiments of the present invention. The description herein demonstrates that while noise and error does increase the runtime needed for producing an output that is within a specific statistical error tolerance, they do not necessarily introduce systematic bias in the output of the estimation algorithm. Systematic bias in the estimate can be suppressed by using active noise-tailoring techniques and calibrating the effect of noise.

Simulation using realistic error parameters for near-term devices has revealed that the enhanced sampling scheme can outperform VQE in terms of sampling efficiency. Experimental results have also revealed a perspective on tolerating error in quantum algorithm implementation where higher fidelity does not necessarily lead to better algorithmic performance. In certain embodiments of the present invention, there is an optimal circuit fidelity of roughly 0.6 at which the enhanced scheme yields the maximum amount of quantum speedup.

1. The role of likelihood function tunability: Parametrized likelihood functions may be used in phase estimation or amplitude estimation routines. To our knowledge, all of the current methods focus on likelihood functions of the Chebyshev form (Equation 1). For these Chebyshev likelihood functions (CLF), in the presence of noise there are specific values of the parameter Π(the "dead spots") for which the CLFs are significantly less effective for inference than other values of Π. Embodiments of the present invention may remove those dead spots by engineering the form of the likelihood function with generalized reflection operators whose angle parameters are made tunable.

2. Runtime model for estimation as error rates decrease: Previous works have demonstrated smooth transitions in the asymptotic cost scaling from the $O(1/\varepsilon^2)$ of VQE to $O(1/\varepsilon)$ of phase estimation. Embodiments of the present invention advance this line of thinking by developing a model for estimating the runtime $t_\varepsilon$ to target accuracy E using devices with degree of noise λ (c.f Section 6):

$$t_\varepsilon \sim O\left(\frac{\lambda}{\varepsilon^2} + \frac{1}{\sqrt{2}\varepsilon} + \sqrt{\left(\frac{\lambda}{\varepsilon^2}\right)^2 + \left(\frac{2\sqrt{2}}{\varepsilon}\right)^2}\right). \tag{2}$$

3. The model interpolates between the $O(1/\varepsilon)$ scaling and $O(1/\varepsilon^2)$ scaling as a function of A. Such bounds also allow embodiments of the present invention to be analyzed for quantum speedup as a function of hardware specifications such as the number of qubits and two-qubit fidelity, and therefore estimate runtimes using realistic parameters for current and future hardware.

Subsequent sections of the present disclosed are organized as follows. Section 2 presents a concrete example of a scheme implemented according to one embodiment of the present invention. Subsequent sections then expand on the general formulation of this scheme according to various embodiments of the present invention. Section 3 describes in detail the general quantum circuit construction for realizing ELFs, and analyzes the structure of ELF in both noisy and noiseless settings. In addition to the quantum circuit scheme, embodiments of the present invention also involve 1) tuning the circuit parameter to maximize information gain, and 2) Bayesian inference for updating the current belief about the distribution of the true value of Π. Section 4 presents heuristic algorithms for both. Numerical results are presented in Section 5, comparing embodiments of the present invention with existing methods based on CLFs. Section 6 discloses a runtime model and derives the expression in (2). Section 7 discloses implications of the disclosed results from a broad perspective of quantum computing.

TABLE 1

Comparison of our scheme with relevant proposals that appear in the literature. Here the list of features include whether the quantum circuit used in the scheme requires ancilla qubits in addition to qubits holding the state for overlap estimation, whether the scheme uses Bayesian inference, whether any noise resilience is considered, whether the initial state is required to be an eigenstate, and whether the likelihood function is fully tunable like ELF proposed here or restricted to Chebyshev likelihood functions.

| Scheme | Bayesian inference | Noise consideration | Fully tunable LFs | Requires ancilla | Requires eigenstate |
|---|---|---|---|---|---|
| Knill et al. | No | No | No | Yes | No |
| Svore et al. | No | No | No | Yes | Yes |
| Wiebe and Grenade | Yes | Yes | No | Yes | Yes |
| Wang et al. | Yes | Yes | No | Yes | Yes |
| O'Brien et al. | Yes | Yes | No | Yes | No |
| Zintchenko and Wiebe | No | Yes | No | No | No |
| Suzuki et al. | No | No | No | No | No |
| This work (Section 1) | Yes | Yes | Yes | No | No |
| This work (Appendix A) | Yes | Yes | Yes | Yes | No |

2. A First Example

There are two main strategies for estimating the expectation value $\langle A|P|A \rangle$ of some operator P with respect to a quantum state $|A\rangle$. The method of quantum amplitude estimation provides a provable quantum speedup with respect to certain computational models. However, to achieve precision E in the estimate, the circuit depth needed in this method scales as $O(1/\varepsilon)$, making it impractical for near term quantum computers. The variational quantum eigensolver uses standard sampling to carry out amplitude estimation. Standard sampling allows for low-depth quantum circuits, making it more amenable to implementation on near term quantum computers. However, in practice, the inefficiency of this method makes VQE impractical for many problems of interest. This section introduces a method of enhanced sampling for amplitude estimation, which may be used by embodiments of the present invention. This technique seeks to maximize the statistical power of noisy quantum devices. This method is described as starting from a simple analysis of standard sampling as used in VQE.

The energy estimation subroutine of VQE estimates amplitudes with respect to Pauli strings. For a Hamiltonian decomposed into a linear combination of Pauli strings $H=\Sigma_j \mu_j P_j$ and "ansatz state" $|A\rangle$, the energy expectation value is estimated as a linear combination of Pauli expectation value estimates $$\hat{E} = \sum_j \mu_j \hat{\Pi}_j, \quad (3)$$

where $\hat{\Pi}_j$ is the (amplitude) estimate of $\langle A|P_j|A \rangle$. VQE uses the standard sampling method to build up Pauli expectation value estimates with respect to the ansatz state, which can be summarized as the following:

Standard Sampling:

1. Prepare $|A\rangle$ and measure operator P receiving outcome d=0, 1.
2. Repeat M times, receiving k outcomes labeled 0 and M−k outcomes labeled 1.
3. Estimate $\Pi = \langle A|P|A \rangle$ as $$\hat{\Pi} = \frac{k-(M-k)}{M}.$$

The performance of this estimation strategy may be quantified using the mean squared error of the estimator as a function of time t=TM, where T is the time cost of each measurement. Because the estimator is unbiased, the mean squared error is simply the variance in the estimator, $$MSE(\hat{\Pi}) = \frac{1-\Pi^2}{M}. \quad (4)$$

For a specific mean squared error $MSE(\hat{\Pi})=\varepsilon^2$, the runtime of the algorithm needed to ensure mean squared error $\varepsilon^2$ is $$t_\varepsilon = T\frac{1-\Pi^2}{\varepsilon^2}. \quad (5)$$

The total runtime of energy estimation in VQE is the sum of the runtimes of the individual Pauli expectation value estimation runtimes. For problems of interest, this runtime may be far too costly, even when certain parallelization techniques are used. The source of this cost is the insensitivity of the standard sampling estimation process to small deviations in the expected information gain about $\Pi$ contained in the standard-sampling measurement outcome data is low.

Generally, we can measure the information gain of an estimation process of M repetitions of standard sampling with the Fisher information $$I_M(\Pi) = \mathbb{E}_D\left[\left(\frac{\partial}{\partial \Pi} \log \mathbb{P}(D \mid \Pi)\right)^2\right] \quad (6)$$

$$= -\mathbb{E}_D\left[\frac{\partial^2}{\partial \Pi^2} \log \mathbb{P}(D \mid \Pi)\right]$$

$$= \sum_D \frac{1}{\mathbb{P}(D|\Pi)}\left(\frac{\partial}{\partial \Pi} \mathbb{P}(D \mid \Pi)\right)^2,$$

where $D=\{d_1, d_2, \ldots, d_M\}$ is the set of outcomes from M repetitions of the standard sampling. The Fisher information identifies the likelihood function $\mathbb{P}(D|\Pi)$ as being responsible for information gain. A lower bound the mean squared error of an (unbiased) estimator may be obtained with the Cramer-Rao bound $$MSE(\hat{\Pi}) \geq \frac{1}{I_M(\Pi)}. \quad (7)$$

Using the fact that the Fisher information is additive in the number of samples, we have $I_M(\Pi)=MI_1(\Pi)$ where $I_1(\Pi)=1/(1-\Pi^2)$ is the Fisher information of a single sample drawn from likelihood function $\mathbb{P}(d|\Pi)=(1+(-1)^d\Pi)/2$.

Using the Cramer-Rao bound, a lower bound may be found for the runtime of the estimation process as $$t_\varepsilon \geq \frac{T}{I_1(\Pi)\varepsilon^2}, \quad (8)$$

which shows that in order to reduce the runtime of an estimation algorithm, embodiments of the present invention may increase the Fisher information.

Figure 5A:
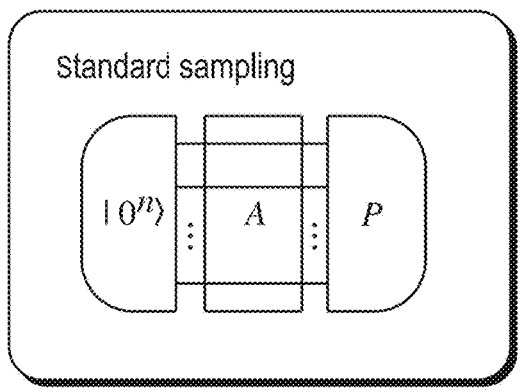
FIGS. 5A-5C illustrate quantum circuits of standard sampling and of some embodiments of the present invention, along with their corresponding likelihood functions.
Figure 5B:
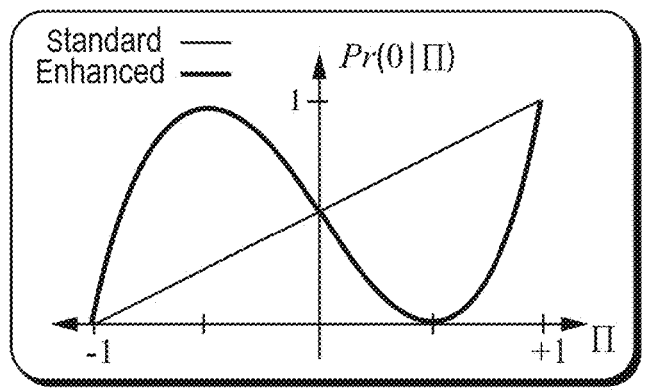
Figure 5C:
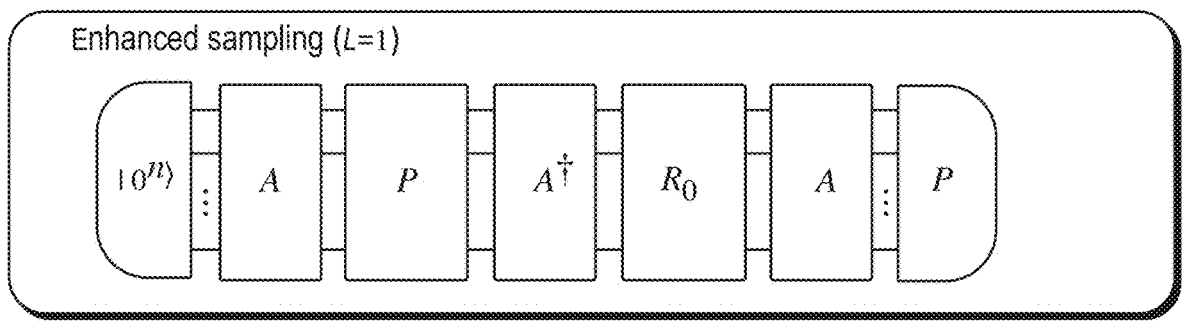

One purpose of enhanced sampling is to reduce the runtime of overlap estimation by engineering likelihood functions which increase the rate of information gain. Consider the simplest case of enhanced sampling, which is illustrated in FIGS. 5A-5C. To generate data, embodiments of the present invention may prepare the ansatz state $|A\rangle$, apply the operation P, apply a phase flip about the ansatz state, and then measure P. The phase flip about the ansatz state may be achieved by applying the inverse of the ansatz circuit $A^{-1}$, applying a phase flip about the initial state $R_0 = 2|0^N\rangle\langle 0^N| - I$, and then re-applying the ansatz circuit A. In this case, the likelihood function becomes $$\mathbb{P}(d|\Pi) = \frac{1+(-1)^d \cos(3\arccos(\Pi))}{2} \quad (9)$$
$$= \frac{1+(-1)^d(4\Pi^3 - 3\Pi)}{2}.$$

The bias is a degree-3 Chebyshev polynomial in $\Pi$. The disclosure herein will refer to such likelihood functions as Chebyshev likelihood functions (CLFs).

In order to compare the Chebyshev likelihood function of enhanced sampling to that of standard sampling, consider the case of $\Pi=0$. Here, $\mathbb{P}(0|\Pi=0) = \mathbb{P}(1|\Pi=0)$ and so the Fisher information is proportional to the square of the slope of the likelihood function $$I_1(\Pi=0) = \left(\frac{\partial \mathbb{P}(d=0|\Pi)}{\partial \Pi}\right)^2. \quad (10)$$

As seen in FIG. 5B, the slope of the Chebyshev likelihood function at $\Pi=0$ is steeper than that of the standard sampling likelihood function. The single sample Fisher information in each case evaluates to Standard: $I_1(\Pi=0)=1$ Enhanced: $I_1(\Pi=0)=9$, (11)

demonstrating how a simple variant of the quantum circuit may enhance information gain. In this example, using the simplest case of enhanced sampling may reduce the number of measurements needed to achieve a target error by at least a factor of nine. As will be discussed later, embodiments of the present invention may further increase the Fisher information by applying L layers of $PA^\dagger R_0 A$ before measuring P. In fact, the Fisher information $$I_1(\Pi) = \frac{(2L+1)^2}{1-\Pi^2} = O(L^2)$$

grows quadratically in L.

Not yet described is an estimation scheme that converts enhanced sampling measurement data into an estimation. One intricacy that enhanced sampling introduces is the option to vary L as embodiments of the present invention are collecting measurement data. In this case, given a set of measurement outcomes from circuits with varying L, the sample mean of the 0 and 1 counts loses its meaning. Instead of using the sample mean, to process the measurement outcomes into information about $\Pi$ embodiments of the present invention may use Bayesian inference. Section 2 describes certain embodiments which use Bayesian inference for estimation.

At this point, one may be tempted to point out that the comparison between standard sampling and enhanced sampling is unfair because only one query to A is used in the standard sampling case while the enhanced sampling scheme uses three queries of A. It seems that if one considers a likelihood function that arises from three standard sampling steps, one could also yield a cubic polynomial form in the likelihood function. Indeed, suppose one performs three independent standard sampling steps yielding results $x_1$, $x_2$, $x_3 \in \{0, 1\}$, and produces a binary outcome $z \in \{0, 1\}$ classically by sampling from a distribution $\mathbb{P}(z|x_1, x_2, x_3)$. Then the likelihood function takes the form of $$\mathbb{P}(z|\Pi) = \sum_{x_1,x_2,x_3} \mathbb{P}(z|x_1,x_2,x_3)\mathbb{P}(x_1,x_2,x_3|\Pi) \quad (12)$$
$$= \sum_{i=0}^{3} \alpha_i \binom{3}{i}\left(\frac{1+\Pi}{2}\right)^i \left(\frac{1-\Pi}{2}\right)^{3-i},$$

where each $\alpha_i \in [0, 1]$ is a parameter that can be tuned classically through changing the distribution $\mathbb{P}(z|x_1, x_2, x_3)$. More specifically, $\alpha_i = \sum_{x_1,x_2,x_3:h(x_1,x_2,x_3)=i} \mathbb{P}(z|x_1, x_2, x_3)$ where $h(x_1 x_2 x_3)$ is the Hamming weight of the bit string $x_1 x_2 x_3$. Suppose it is desired that $\mathbb{P}(z=0|\Pi)$ to be equal to $\mathbb{P}(d=0|\Pi)$ in Equation 9. This implies that $\alpha_0=1$, $\alpha_1=2$, $\alpha_2=3$ and $\alpha_3=0$, which is clearly beyond the classical tunability of the likelihood function in Equation 12. This is an evidence which suggests that the likelihood function arising from the quantum scheme in Equation 9 is beyond classical means.

As the number of circuit layers L is increased, the time per sample T grows linearly in L. This linear growth in circuit layer number, along with the quadratic growth in Fisher information leads to a lower bound on the expected runtime, $$t_\varepsilon \in \Omega\left(\frac{1}{L\varepsilon^2}\right), \quad (13)$$

assuming a fixed-L estimation strategy with an unbiased estimator. In practice, the operations implemented on the quantum computer are subject to error. Fortunately, embodiments of the present invention may use Bayesian inference, which can incorporate such errors into the estimation process. As long as the influence of errors on the form of the likelihood function is accurately modeled, the principal effect of such errors is only to slow the rate of information gain. Error in the quantum circuit accumulates as the number of circuit layers L is increased. Consequently, beyond a certain number of circuit layers, diminishing returns will be received with respect to gains in Fisher information (or the reduction in runtime). The estimation algorithm may then seek to balance these competing factors in order to optimize the overall performance.

Figure 6B:
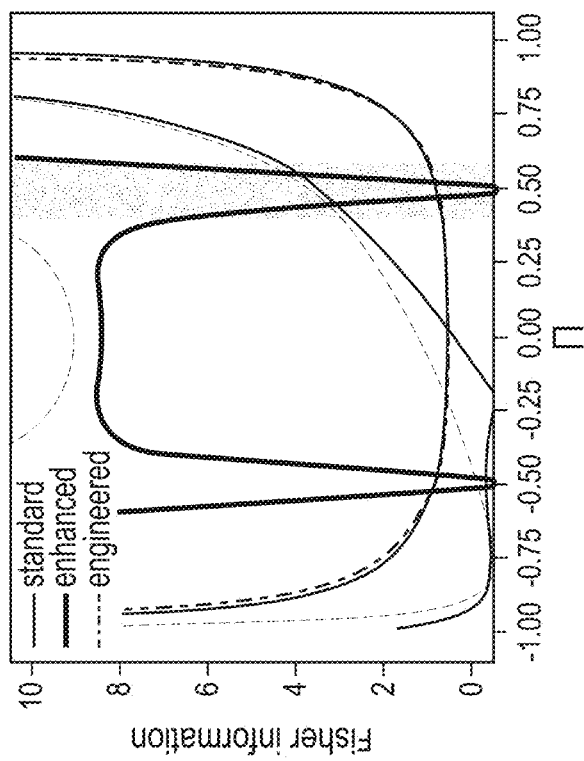
FIGS. 6A-6B illustrate plots showing the dependence of the Fisher information on various likelihood functions.
Figure 6A:
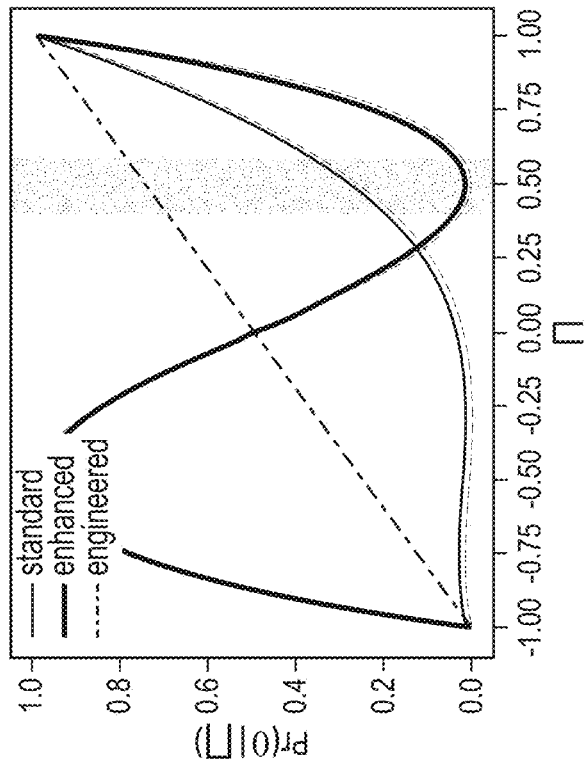

The introduction of error poses another issue for estimation. Without error, the Fisher information gain per sample in the enhanced sampling case with L=1 is greater than or equal to 9 for all Π. As shown in FIGS. 6A-6B, with the introduction of even a small degree of error, the values of Π where the likelihood function is flat incur a dramatic drop in Fisher information. Such regions are referred to herein as estimation dead spots. This observation motivates the concept of engineering likelihood functions (ELF) to increase their statistical power. By promoting the P and $R_0$ operations to generalized reflections $U(x_1)=\exp(-ix_1 P)$ and $R_0(y_2)=\exp(-ix_2 R_0)$ embodiments of the present invention may use rotation angles such that the information gain is boosted around such dead spots. Even for deeper enhanced sampling circuits, engineering likelihood functions allows embodiments of the present invention to mitigate the effect of estimation dead spots.

3. Engineered Likelihood Functions

This section describes a methodology of engineering likelihood functions for amplitude estimation which may be used by embodiments of the present invention. First, quantum circuits for drawing samples that correspond to engineered likelihood functions are described, and then techniques for tuning the circuit parameters and carry out Bayesian inference with the resultant likelihood functions are described.

3.1. Quantum Circuits for Engineered Likelihood Functions

Techniques will now be described for designing, implementing, and executing a procedure on a computer (e.g., a quantum computer or a hybrid quantum-classical computer) for estimating the expectation value $$\Pi = \cos(\theta) = \langle A|P|A\rangle, \quad (18)$$

where $|A\rangle = A|0^n\rangle$ in which A is an n-qubit unitary operator, P is an n-qubit Hermitian operator with eigenvalues ±1, and θ=arccos (Π) is introduced to facilitate Bayesian inference later on. In constructing the estimation algorithms disclosed herein, it may be assumed that embodiments of the present invention are able to perform the following primitive operations. First, embodiments of the present invention may prepare the computational basis state $|0^n\rangle$ and apply a quantum circuit A to it, obtaining $|A\rangle = A|0\rangle^{\otimes n}$. Second, embodiments of the present invention implement the unitary operator $U(x)=\exp(-ixP)$ for any angle $x \in \mathbb{R}$. Finally, embodiments of the present invention perform the measurement of P, which is modeled as a projection-valued measure $$\left\{\frac{I+P}{2}, \frac{I-P}{2}\right\}$$

with respective outcome labels {0, 1}. Embodiments of the present invention may also make use of the unitary operator $V(y)=AR_0(y)A^\dagger$, where $R_0(y)=\exp(-iy(2|0^n\rangle\langle 0^n|-I))$ and $y \in \mathbb{R}$. Following the convention, U(x) and V(y) will be referred to herein as the generalized reflections about the +1 eigenspace of P and the state $|A\rangle$, respectively, where x and y are the angles of these generalized reflections, respectively.

Figure 7:
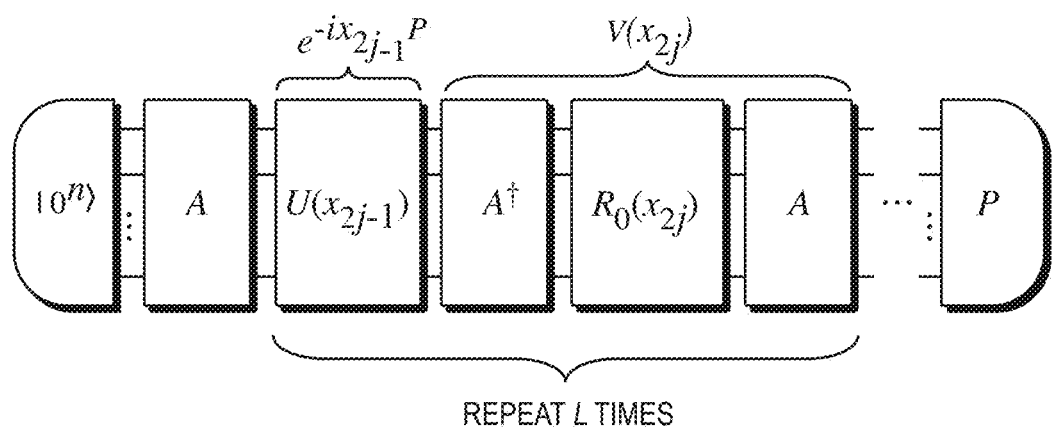
FIG. 7 illustrates operations used for generating samples that correspond to an engineered likelihood function according to one embodiment of the present invention.

Embodiments of the present invention may use the ancilla-free[1] quantum circuit in FIG. 7 to generate the engineered likelihood function (ELF), which is the probability distribution of the outcome $d \in \{0, 1\}$ given the unknown quantity θ to be estimated. The circuit may, for example, include a sequence of generalize reflections. Specifically, after preparing the ansatz state $|A\rangle = A|0\rangle^{\otimes n}$, embodiments of the present invention may apply 2L generalized reflections $U(x_1), V(x_2), \ldots, U(x_{2L-1}), V(x_{2L})$ to it, varying the rotation angle $x_j$ in each operation. For convenience, $V(x_{2j})U(x_{2j-1})$ will be referred to herein as the j-th layer of the circuit, for j=1, 2, . . . , L. The output state of this circuit is $$Q(\vec{x})|A\rangle = V(x_{2L})U(x_{2L-1}) \ldots V(x_2)U(x_1)|A\rangle, \quad (19)$$

where $\vec{x}=(x_1, x_2, \ldots, x_{2L-1}, x_{2L}) \in \mathbb{R}^{2L}$ is the vector of tunable parameters. Finally, embodiments of the present invention may perform the projective measurement $$\left\{\frac{I+P}{2}, \frac{I-P}{2}\right\}$$

on this state, receiving an outcome $d \in \{0, 1\}$.

We call this scheme "ancilla-free" (AF) since it does not involve any ancilla qubits. In Appendix A, we consider a different scheme named the "ancilla-based" (AB) scheme which involves one ancilla qubit.

As in Grover's algorithm, the generalized reflections $U(x_{2j-1})$ and $V(x_{2j})$ ensure that the quantum state remains in two-dimensional subspace $S:=\text{span}\{|A\rangle, P|A\rangle\}^2$ for any j. Let $|A^\#\rangle$ be the state (unique, up to a phase) in S that is orthogonal to $|A\rangle$, i.e.

$$|A^\perp\rangle = \frac{P|A\rangle - \langle A|P|A\rangle|A\rangle}{\sqrt{1-\langle A|P|A\rangle^2}}. \quad (20)$$

To help the analysis, we will view this two-dimensional subspace as a qubit, writing $|A\rangle$ and $|A^\#\rangle$ as $|\bar{0}\rangle$ and $|\bar{1}\rangle$ respectively.

[2]To ensure that S is two-dimensional, assume that Π≠±1, i.e. θ≠0 or π.

Let $\bar{X}, \bar{Y}, \bar{Z}$ and $\bar{I}$ be the Pauli operators and identity operator on this virtual qubit respectively. Then, focusing on the subspace $S=\text{span}\{|\bar{0}\rangle, |\bar{1}\rangle\}$, we can rewrite P as $$P(\theta)=\cos(\theta)\bar{Z}+\sin(\theta)\bar{X}, \quad (21)$$

and rewrite the generalized reflections $U(x_{2j-1})$ and $V(x_{2j})$ as $$U(\theta;x_{2j-1})=\cos(x_{2j-1})\bar{I}-i\sin(x_{2j-1})(\cos(\theta)\bar{Z}+\sin(\theta)\bar{X}) \quad (22)$$

and $$V(x_{2j})=\cos(x_{2j})\bar{I}-i\sin(x_{2j})\bar{Z}, \quad (23)$$

where $x_{2j-1}, x_{2j} \in \mathbb{R}$ are tunable parameters. Then the unitary operator Q implemented by the L-layer circuit becomes $$Q(\theta;\vec{x})=V(x_{2L})U(\theta;x_{2L-1}) \ldots V(x_2)U(\theta;x_1). \quad (24)$$

Note that in this picture, $|A\rangle = |\bar{0}\rangle$ is fixed, while $P=P(\theta)$, $U(x)=U(\theta; x)$ and $Q(\vec{x})=Q(\theta; \vec{x})$ depend on the unknown quantity θ. It turns out to be more convenient to design and analyze the estimation algorithms in this "logical" picture than in the original "physical" picture. Therefore, this picture will be used for the remainder of this disclosure.

The engineered likelihood function (i.e. the probability distribution of measurement outcome $d \in \{0, 1\}$) depends on the output state $\rho(\theta; \vec{x})$ of the circuit and the observable $P(\theta)$.

Precisely, it is $$\mathbb{P}(d|\theta;\vec{x}) = \frac{1+(-1)^d \Delta(\theta;\vec{x})}{2}, \quad (25)$$

where $$\Delta(\theta;\vec{x}) = \langle\bar{0}|Q(\theta;\vec{x})^\dagger P(\theta)Q(\theta;\vec{x})|\bar{0}\rangle \quad (26)$$

is the bias of the likelihood function (from now on, we will use $\mathbb{P}'(d|\theta;\vec{x})$ and $\Delta'(\theta;\vec{x})$ to denote the derivatives of $\mathbb{P}(d|\theta;\vec{x})$ and $\Delta(\theta;\vec{x})$ with respect to $\theta$, respectively). In particular, if $$\vec{x} = \left(\frac{\pi}{2}, \frac{\pi}{2}, \ldots, \frac{\pi}{2}, \frac{\pi}{2}\right),$$

then we have $\Delta(\theta;\vec{x}) = \cos((2L+1)\theta)$. Namely, the bias of the likelihood function for this $\vec{x}$ is the Chebyshev polynomial of degree $2L+1$ (of the first kind) of $\Pi$. For this reason, the likelihood function for this $\vec{x}$ will be referred to herein as the Chebyshev likelihood function (CLF). Section 5 will explore the performance gap between CLFs and general ELFs.

In reality, quantum devices are subject to noise. To make the estimation process robust against errors, embodiments of the present invention may incorporate the following noise model into the likelihood function.

In practice, the establishment of the noise model may leverage a procedure for calibrating the likelihood function for the specific device being used. With respect to Bayesian inference, the parameters of this model are known as nuisance parameters; the target parameter does not depend directly on them, but they determine how the data relates to the target parameter and, hence, may be incorporated into the inference process. The remainder of this disclosure will assume that the noise model has been calibrated to sufficient precision so as to render the effect of model error negligible.

Assume that the noisy version of each circuit layer $V(x_{2j})U(\theta;x_{2j-1})$ implements a mixture of the target operation and the completely depolarizing channel[3] acting on the same input state, i.e.

$$\mathcal{U}_j(\rho) = pV(x_{2j})U(\theta;x_{2j-1})\rho U(\theta;x_{2j-1})^\dagger V(x_{2j})^\dagger + (1-p)\frac{I}{2^n}, \quad (27)$$

where p is the fidelity of this layer. Under composition of such imperfect operations, the output state of the L-layer circuit becomes $$\rho_L = p^L Q(\theta;\vec{x})|A\rangle\langle A|Q(\theta;\vec{x})^\dagger + (1-p^L)\frac{I}{2^n}. \quad (28)$$

This imperfect circuit is preceded by an imperfect preparation of $|A\rangle$ and followed by an imperfect measurement of P. In the context of randomized benchmarking, such errors are referred to as state preparation and measurement (SPAM) errors. Embodiments of the present invention may also model SPAM error with a depolarizing model, taking the noisy preparation of $|A\rangle$ to be $$p_{SP}|A\rangle\langle A| + (1-p_{SP})\frac{I}{2^n}$$

and taking the noisy measurement of P to be the POVM $$\left\{p_M\frac{I+P}{2} + (1-p_M)\frac{I}{2}, p_M\frac{I-P}{2} + (1-p_M)\frac{I}{2}\right\}.$$

Combining the SPAM error parameters into $\bar{p} = p_{SP}p_M$, arrives at a model for the noisy likelihood function $$\mathbb{P}(d|\theta;f,\vec{x}) = \tfrac{1}{2}[1+(-1)^d f\Delta(\theta;\vec{x})], \quad (29)$$

where $f = \bar{p}p^L$ is the fidelity of the whole process for generating the ELF, and $\Delta(\theta,\vec{x})$ is the bias of the ideal likelihood function as defined in Eq. (26) (from now on, this disclosure will use $\mathbb{P}'(d|\theta;f,\check{e}cx)$ to denote the derivative of $\mathbb{P}(d|\theta;f,\vec{x})$ with respect to $\theta$). Note that the overall effect of noise on the ELF is that it rescales the bias by a factor of $f$. This implies that the less errored the generation process is, the steeper the resultant ELF is (which means it is more useful for Bayesian inference), as one would expect.

[3] The depolarizing model assumes that the gates comprising each layer are sufficiently random to prevent systematic build-up of coherent error. There exist techniques such as randomized compiling which make this depolarizing model more accurate.

Before moving on to the discussion of Bayesian inference with ELFs, it is worth mentioning the following property of engineered likelihood functions, as it will play a role in Section 4. The concepts of trigono-multilinear and trigono-multiquadratic functions are known. Basically, a multivariable function $f:\mathbb{R}^k \to \mathbb{C}$ is trigono-multilinear if for any $j \in \{1, 2, \ldots, k\}$, $f(x_1, x_2, \ldots, x_k)$ may be written as $$f(x_1, x_2, \ldots, x_k) = C_j(\vec{x}_{-j})\cos(x_j) + S_j(\vec{x}_{-j})\sin(x_j), \quad (30)$$

for some (complex-valued) functions $C_j$ and $S_j$ of $\vec{x}_{-j} := (x_1, \ldots, x_{j-1}, x_{j+1}, x_k)$, and we call $C_j$ and $S_j$ the cosine-sine-decomposition (CSD) coefficient functions of $f$ with respect to $x_j$. Similarly, a multivariable function $f:\mathbb{R}^k \to \mathbb{C}$ is trigono-multiquadratic if for any $j \in \{1, 2, \ldots, k\}$, $f(x_1, x_2, \ldots, x_k)$ may be written as $$f(x_1, x_2, \ldots, x_k) = C_j(\vec{x}_{-j})\cos(2x_j) + S_j(\vec{x}_{-j})\sin(2x_j) + B_j(\vec{x}_{-j}), \quad (31)$$

for some (complex-valued) functions $C_j$, $S_j$ and $B_j$ of $\vec{x}_{-j} := (x_1, \ldots, x_{j-1}, x_{j+1}, x_k)$, and we call $C_j$, $S_j$ and $B_j$ the cosine-sine-bias-decomposition (CSBD) coefficient functions of $f$ with respect to $x_j$. The concepts of trigono-multilinearity and trigono-multiquadraticity can be also naturally generalized to linear operators. Namely, a linear operator is trigono-multilinear (or trigono-multiquadratic) in a set of variables if each entry of this operator (written in an arbitrary basis) is trigono-multilinear (or trigono-multiquadratic) in the same variables. Now Eqs. (22), (23) and (24) imply that $Q(\theta;\vec{x})$ is a trigono-multilinear operator of $\vec{x}$. Then it follows from Eq. (26) that $\Delta(\theta;\vec{x})$ is a trigono-multiquadratic function of $\vec{x}$. Furthermore, it is disclosed that the CSBD coefficient functions of $\Delta(\theta; \vec{x})$ with respect to any $x_j$ may be evaluated in $O(L)$ time, and this greatly facilitates the construction of the algorithms in Section 4.1 for tuning the circuit angles $\vec{x}=(x_1, x_2, \ldots, x_{2L-1}, x_{2L})$.

3.2. Bayesian Inference with Engineered Likelihood Functions

With the model of (noisy) engineered likelihood functions in place, embodiments of the present invention will be described for tuning the circuit parameters $\vec{x}$ and performing Bayesian inference with the resultant likelihood functions for amplitude estimation.

Figure 8:
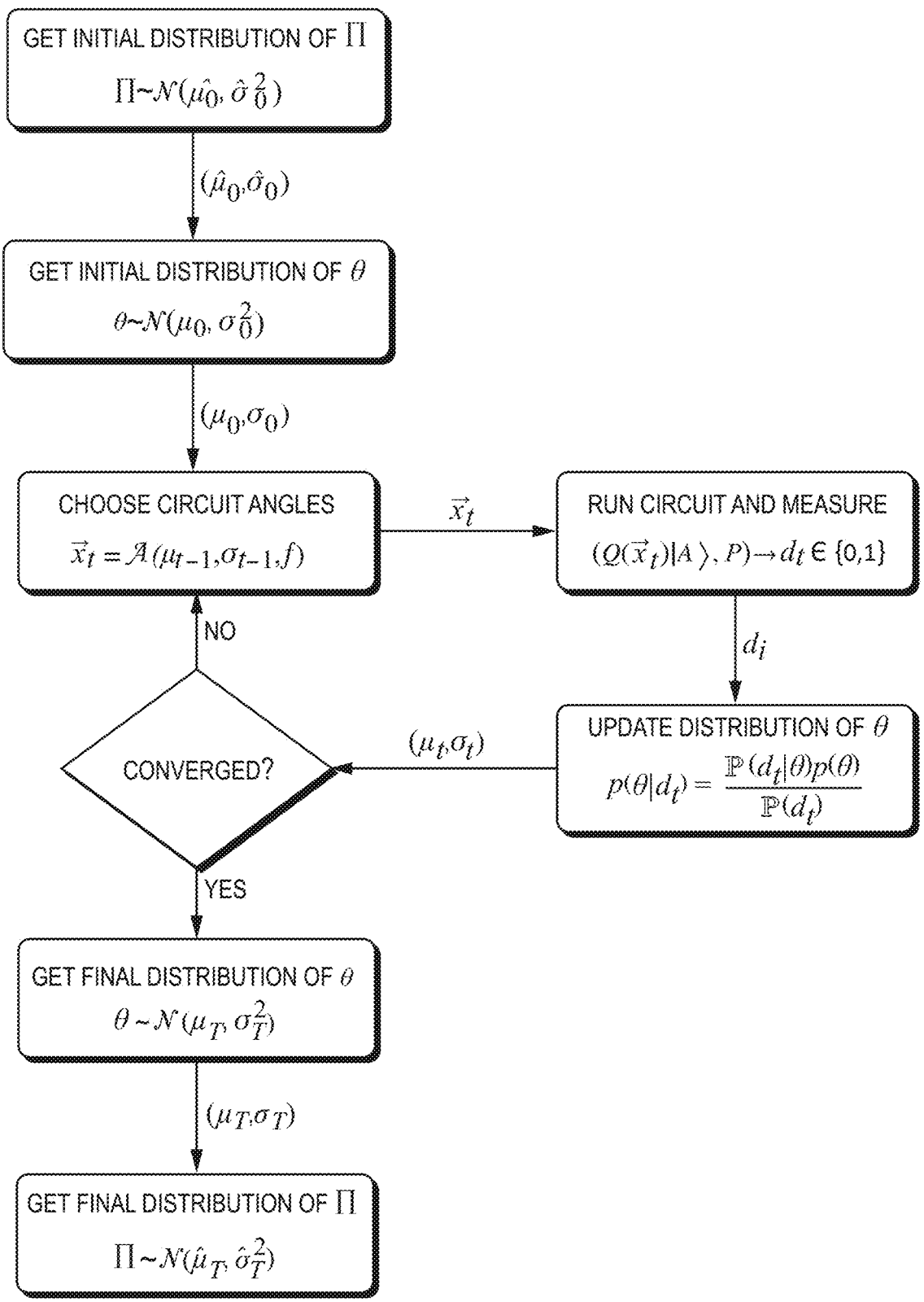
FIG. 8 illustrates an algorithm implemented by embodiments of the present invention.

Let us begin with a high-level overview of embodiments of algorithm for estimating $\Pi=\cos(\theta)=\langle A|P|A\rangle$. For convenience, such embodiments may work with $\theta=\arccos(\Pi)$ rather than with $\Pi$. Embodiments of the present invention may use a Gaussian distribution to represent knowledge of $\theta$ and make this distribution gradually converge to the true value of 0 as the inference process proceeds. Embodiments of the present invention may start with an initial distribution of $\Pi$(which can be generated by standard sampling or domain knowledge) and convert it to the initial distribution of $\theta$. Then embodiments of the present invention may iterate the following procedure until a convergence criterion is satisfied. At each round, embodiments of the present invention may find the circuit parameters $\vec{x}$ that maximize the information gain from the measurement outcome d in certain sense (based on current knowledge of $\theta$). Then the quantum circuit in FIG. 7 is executed with the optimized parameters $\vec{x}$ and a measurement outcome $d\in\{0, 1\}$ is received. Finally, embodiments of the present invention may update the distribution of $\theta$ by using Bayes rule, conditioned on d. Once this loop is finished, embodiments of the present invention may convert the final distribution of $\theta$ to the final distribution of $\Pi$, and set the mean of this distribution as the final estimate of $\Pi$. See FIG. 8 for a conceptual diagram of this algorithm.

The following describes each component of the above algorithm in more detail. Throughout the inference process, embodiments of the present invention use a Gaussian distribution to keep track of a belief of the value of $\theta$. Namely, at each round, $\theta$ has prior distribution $$p(\theta) = p(\theta; \mu, \sigma) := \frac{1}{\sqrt{2\pi}\,\sigma} e^{-\frac{(\theta-\mu)^2}{2\sigma^2}} \tag{32}$$

for some prior mean $\mu\in\mathbb{R}$ and prior variance $\sigma^2\in\mathbb{R}^+$. After receiving the measurement outcome d, embodiments of the present invention may compute the posterior distribution of $\theta$ by using Bayes rule $$p(\theta \mid d; f, \vec{x}) = \frac{\mathbb{P}(d|\theta;f,\vec{x})p(\theta)}{\mathbb{P}(d;f,\vec{x})}, \tag{33}$$

where the normalization factor, or model evidence, is defined as $\mathbb{P}(d; f, \vec{x})=\int d\theta\, \mathbb{P}(d|\theta; f, \vec{x})p(\theta)$ (recall that $f$ is the fidelity of the process for generating the ELF). Although the true posterior distribution will not be a Gaussian, embodiments of the present invention may approximate it as such. Following previous methodology, embodiments of the present invention may replace the true posterior with a Gaussian distribution of the same mean and variance[4], and set it as the prior of $\theta$ for the next round. Embodiments of the present invention may repeat this measurement-and-Bayesian-update procedure until the distribution of $\theta$ is sufficiently concentrated around a single value.

[4]Although embodiments of the present invention may compute the mean and variance of the posterior distribution $p(\theta|d; f, \vec{x})$ directly by definition, this approach is time-consuming, as it involves numerical integration. Instead, embodiments of the present invention may accelerate this process by taking advantage of certain property of engineered likelihood functions. See Section 4.2 for more details.

Since the algorithm mainly works with $\theta$ and we are eventually interested in FT embodiments of the present invention may make conversions between the estimators of $\theta$ and $\Pi$. This is done as follows. Suppose that at round t the prior distribution of $\theta$ is $\mathcal{N}(\mu_t, \sigma_t^2)$ and the prior distribution of $\Pi$ is $\mathcal{N}(\hat{\mu}_t, \hat{\sigma}_t^2)$ (note that $\mu_t$, $\sigma_t$, $\hat{\mu}_t$ and $\hat{\sigma}$ are random variables as they depend on the history of random measurement outcomes up to time t). The estimators of $\theta$ and $\Pi$ at this round are $\mu_t$ and $\hat{\mu}_t$, respectively. Given the distribution $\mathcal{N}(\mu_t, \sigma_t^2)$ of $\theta$, embodiments of the present invention may compute the mean $\hat{\mu}_t$ and variance $\hat{\sigma}_t^2$ of $\cos(\theta)$, and set $\mathcal{N}(\hat{\mu}_t, \hat{\sigma}_t^2)$ on as the distribution of $\Pi$. This step may be done analytically, as if $X\sim \mathcal{N}(\mu, \sigma^2)$, then $$\mathbb{E}[\cos(X)] = e^{-\frac{\sigma^2}{2}} \cos(\mu), \tag{34}$$

$$\mathrm{Var}[\cos(X)] = \frac{1}{2}\left(1-e^{-\sigma^2}\right)*\left(1-e^{-\sigma^2}\cos(2\mu)\right). \tag{35}$$

Conversely, given the distribution $\mathcal{N}(\hat{\mu}_t, \hat{\sigma}_t^2)$ of $\Pi$, embodiments of the present invention may compute the mean $\mu_t$ and variance $\sigma_t^2$ of $\arccos(\Pi)$ (clipping $\Pi$ to $[-1, 1]$), and set $\mathcal{N}(\mu_t, \sigma_t^2)$ as the distribution of $\theta$. This step may be done numerically. Even though the cos x or arccos y function of a Gaussian variable is not truly Gaussian, embodiments of the present invention may approximate it as such and find that this has negligible impact on the performance of the algorithm.

Method for tuning the circuit angles $\vec{x}$ may be implemented by embodiments of the present invention as follows. Ideally, they may be chosen carefully so that the mean squared error (MSE) of the estimator $\mu_t$ of $\theta$ decreases as fast as possible as t grows. In practice, however, it is hard to compute this quantity directly, and embodiments of the present invention may resort to a proxy of its value. The MSE of an estimator is a sum of the variance of the estimator and the squared bias of the estimator. The squared bias of $\mu_t$ may be smaller than its variance, i.e. $|\mathbb{E}[\mu_t]-\theta^*|^2<\mathrm{Var}(\mu_t)$, where $\theta^*$ is the true value of $\theta$. The variance $\sigma_t^2$ of $\theta$ is often close to the variance of $\mu_t$, i.e. $\sigma_t^2\approx\mathrm{Var}(\mu_t)$ with high probability. Combining these facts, we know that $\mathrm{MSE}(\mu_t)\leq 2\sigma_t^2$ with high probability. So embodiments of the present invention may find the parameters $\vec{x}$ that minimize the variance $\sigma_t^2$ of $\theta$ instead.

Specifically, suppose $\theta$ has prior distribution $\mathbb{E}(\mu, \sigma^2)$.

Upon receiving the measurement outcome $d \in \{0, 1\}$, the expected posterior variance of $\theta$ is $$\mathbb{E}_d[\text{Var}(\theta \mid d; f, \vec{x})] = \sigma^2 \left(1 - \sigma^2 \frac{f^2(\partial_\mu b(\mu, \sigma; \vec{x}))^2}{1 - f^2(b(\mu, \sigma; \vec{x}))^2}\right), \quad (36)$$

where $$b(\mu, \sigma; \vec{x}) = \int_{-\infty}^{\infty} d\theta \; p(\theta; \mu, \sigma) \Delta(\theta; \vec{x}) \quad (37)$$

in which $\Delta(\theta; \vec{x})$ is the bias of the ideal likelihood function as defined in Eq. (26), and $f$ is the fidelity of the process for generating the likelihood function. A quantity for engineering likelihood functions is now introduced and referred to herein as the variance reduction factor, $$\mathcal{V}(\mu, \sigma; f, \vec{x}) := \frac{f^2(\partial_\mu b(\mu, \sigma; \vec{x}))^2}{1 - f^2(b(\mu, \sigma; \vec{x}))^2}. \quad (38)$$

Then we have $$\mathbb{E}_d[\text{Var}(\theta \mid d; f, \vec{x})] = \sigma^2 [1 - \sigma^2 \mathcal{V}(\mu, \sigma; f, \vec{x})]. \quad (39)$$

The larger $\mathcal{V}$ is, the faster the variance of $\theta$ decreases on average. Furthermore, to quantify the growth rate (per time step) of the inverse variance of $\theta$, the following quantity may be used $$R(\mu, \sigma; f, \vec{x}) := \frac{1}{T(L)} \left( \frac{1}{\mathbb{E}_d[\text{Var}(\theta \mid d; f, \vec{x})]} - \frac{1}{\sigma^2} \right) \quad (40)$$

$$= \frac{1}{T(L)} \frac{\mathcal{V}(\mu, \sigma; f, \vec{x})}{1 - \sigma^2 \mathcal{V}(\mu, \sigma; f, \vec{x})}, \quad (41)$$

where $T(L)$ is the time cost of an inference round. Note that R is a monotonic function of $\mathcal{V}$ for $\mathcal{V} \in (0, 1)$. Therefore, when the number L of circuit layers is fixed, embodiments of the present invention may maximize R (with respect to $\vec{x}$) by maximizing $\mathcal{V}$. In addition, when $\sigma$ is small, R is approximately proportional to $\mathcal{V}$, i.e. $R \approx \mathcal{V}/T(L)$. The remainder of this disclosure will assume that the ansatz circuit contributes most significantly to the duration of the overall circuit. We take T(L) to be proportional to the number of times the ansatz is invoked in the circuit, setting $T(L)=2L+1$, where time is in units of ansatz duration.

Now techniques will be disclosed for finding the parameters $\vec{x} = (x_1, x_2, \ldots, x_{2L}) \in \mathbb{R}^{2L}$ that maximize the variance reduction factor $\mathcal{V}(\mu, \sigma; f, \vec{x})$ for given $\mu \in \mathbb{R}$, $\sigma \in \mathbb{R}^+$ and $f \in [0, 1]$. This optimization problem turns out to be difficult to solve in general. Fortunately, in practice, embodiments of the present invention may assume that the prior variance $\sigma^2$ of $\theta$ is small (e.g. at most 0.01), and in this case, $\mathbb{R}(\mu, \sigma; f,$ $\vec{x})$ may be approximated by the Fisher information of the likelihood function $\mathbb{P}(d|\theta; f, \vec{x})$ at $\theta = \mu$, i.e.

$$\mathcal{V}(\mu, \sigma; f, \vec{x}) \approx \mathcal{J}(\mu; f, \vec{x}), \text{ when } \sigma \text{ is small}, \quad (42)$$

where $$\mathcal{J}(\theta; f, \vec{x}) = \mathbb{E}_d[(\partial_\theta \log \mathbb{P}(d \mid \theta; f, \vec{x}))^2] \quad (43)$$

$$= \frac{f^2(\Delta'(\theta; \vec{x}))^2}{1 - f^2(\Delta(\theta; \vec{x}))^2} \quad (44)$$

is the Fisher information of the two-outcome likelihood function $\mathbb{P}(d|\theta; f, \vec{x})$ as defined in Eq. (29). Therefore, rather than directly optimizing the variance reduction factor $\mathcal{V}(\mu, \sigma; f, \vec{x})$, embodiments of the present invention may optimize the Fisher information $\mathcal{J}(\mu; f, \vec{x})$, which may be done efficiently by embodiments of the present invention using the algorithms in Section 4.1.1. Furthermore, when the fidelity $f$ of the process for generating the ELF is low, we have $\mathcal{J}(\theta; f, \vec{x}) \approx f^2(\Delta'(\theta; \vec{x}))^2$. It follows that $$\mathcal{V}(\mu, \sigma; f, \vec{x}) \approx f^2 (\Delta'(\mu; \vec{x}))^2, \text{when both } \sigma \text{ and } f \text{ are small.} \quad (45)$$

So in this case, embodiments of the present invention may optimize $|\Delta'(\mu; \vec{x})|$, which is proportional to the slope of the likelihood function $\mathbb{P}(d|\theta; f, \vec{x})$ at $\theta = \mu$, and this task may be accomplished efficiently by embodiments of the present invention using the algorithms in Section 4.1.2.

Finally, embodiments of the present invention may make a prediction on how fast the MSE of the estimator $\vec{\mu}_t$ of $\Pi$ as t grows. Suppose that the number L of circuit layers is fixed during the inference process. This gives $$\text{MSE}(\hat{\mu}_t) = \Theta\left(\frac{1}{t}\right) \text{ as } t \to \infty.$$

The growth rate of the inverse MSE of $\hat{\beta}_t$ may be predicted as follows. As $t \to \infty$, we have $\mu_t \to \theta^*$, $\sigma_t \to 0$, $\vec{\mu}_t \to \Pi^*$, and $\hat{\sigma}_t \to 0$ with high probability, where $\theta^*$ and $\Pi^*$ are the true values of $\theta$ and $\Pi$, respectively. When this event happens, we have that for large t, $$\frac{1}{\sigma_{t+1}^2} - \frac{1}{\sigma_t^2} \approx \mathcal{J}(\mu_t; f, \vec{x}_t). \quad (46)$$

Consequently, by Eq. (35), we know that for large t, $$\frac{1}{\hat{\sigma}_{t+1}^2} - \frac{1}{\hat{\sigma}_t^2} \approx \frac{\mathcal{J}(\mu_t; f, \vec{x}_t)}{\sin^2(\mu_t)}, \quad (47)$$

where $\mu_t \approx \arccos(\hat{\mu}_t)$. Since the bias of $\hat{\mu}_t$ is often much smaller than its standard deviation, and the latter can be approximated by $\hat{\sigma}_t$, we predict that for large t, $$MSE(\hat{\mu}_t) \approx \frac{1 - \hat{\mu}_t^2}{t \mathcal{J}(\arccos(\hat{\mu}_t); f, \vec{x}_t)}. \tag{48}$$

This means that the asymptotic growth rate (per time step) of the inverse MSE of $\hat{\mu}_t$ should be roughly $$\hat{R}_0(\Pi^*; f, \vec{x}) := \frac{\mathcal{J}(\arccos(\Pi^*); f, \vec{x})}{T(L)(1 - (\Pi^*)^2)}, \tag{49}$$

where $\vec{x}$ is optimized with respect to $\mu^* = \arccos(\Pi^*)$. This rate will be compared with the empirical growth rate of the inverse MSE of $\hat{\mu}_t$ in Section 5.

4. Efficient Heuristic Algorithms for Circuit Parameter Tuning and Bayesian Inference This section describes embodiments of heuristic algorithms for tuning the parameters $\vec{x}$ of the circuit in FIG. 7 and describes how embodiments of the present invention may efficiently carry out Bayesian inference with the resultant likelihood functions.

4.1. Efficient Maximization of Proxies of the Variance Reduction Factor

Algorithms, implemented according to embodiments of the present invention, for tuning the circuit angles $\vec{x}$ are based on maximizing two proxies of the variance reduction factor $\mathcal{V}$ the Fisher information and slope of the likelihood function $\mathbb{P}(d|\theta; f, \vec{x})$. All of these algorithms require efficient procedures for evaluating the CSBD coefficient functions of the bias $\Delta(\theta; \vec{x})$ and its derivative $\Delta'(\theta; \vec{x})$ with respect to $x_j$ for $j=1, 2, \ldots, 2L$. Recall that we have shown in Section 3.1 that the bias $\Delta(\theta; \vec{x})$ is trigono-multiquadratic in ěcx. Namely, for any $j \in \{1, 2, \ldots, 2L\}$, there exist functions $C_j(\theta; \vec{x}_{-j})$, $S_j(\theta; \vec{x}_{-j})$ and $B_j(\theta; \vec{x}_{-j})$ of $\vec{x}_{-j} := (x_1, \ldots, x_{j-1}, x_{j+1}, \ldots, x_{2L})$ such that $$\Delta(\theta; \vec{x}) = C_j(\theta; \vec{x}_{-j})\cos(2x_j) + S_j(\theta; \vec{x}_{-j})\sin(2x_j) + B_j(\theta; \vec{x}_{-j}). \tag{50}$$

It follows that $$\Delta'(\theta; \vec{x}) = C_j'(\theta; \vec{x}_{-j})\cos(2x_j) + S_j'(\theta; x_{-j})\sin(2x_j) + B_j'(\theta; \vec{x}_{-j}) \tag{51}$$

is also trigono-multiquadratic in $\vec{x}$, where $C_j'(\theta; \vec{x}_{-j}) = \partial_\theta C_j(\theta; \vec{x}_{-j})$, $S_j'(\theta; \vec{x}_{-j}) = \partial_\theta S_j(\theta; \vec{x}_{-j})$, $B_j'(\theta; \vec{x}_{-j}) = \partial_\theta B_j(\theta; \vec{x}_{-j})$ are the derivatives of $C_j(\theta; \vec{x}_{-j})$, $S_j(\theta; \vec{x}_{-j})$, $B_j(\theta; \vec{x}_{-j})$ with respect to $\theta$, respectively. It turns out that given $\theta$ and $\vec{x}_{-j}$, $C_j(\theta; \vec{x}_{-j})$, each of $S_j(\theta; \vec{x}_{-j})$, $B_j(\theta; \vec{x}_{-j})$, $C_j'(\theta; \vec{x}_{-j})$, $S_j'(\theta; \vec{x}_{-j})$ and $B_j'(\theta; \vec{x}_{-j})$ can be computed in $O(L)$ time.

Lemma 1. Given $\theta$ and $\vec{x}_{-j}$, each of $C_j(\theta; \vec{x}_{-j})$, $S_j(\theta; \vec{x}_{-j})$, $B_j(\theta; \vec{x}_{-j})$, $C_j'(\theta; \vec{x}_{-j})$, $S_j'(\theta; \vec{x}_{-j})$ and $B_j'(\theta; \vec{x}_{-j})$ can be computed in $O(L)$ time.

Proof. See Appendix C.

4.1.1. Maximizing the Fisher Information of the Likelihood Function

Embodiments of the present invention may execute one or more of two algorithms for maximizing the Fisher information of the likelihood function $\mathbb{P}(d|\theta; f, \vec{x})$ at a given point $\theta = \mu$ (i.e. the prior mean of $\theta$). Assume that a goal is to find $\vec{x} \in \mathbb{R}^{2L}$ that maximize $$\mathcal{J}(\mu; f, \vec{x}) = \frac{f^2(\Delta'(\mu; \vec{x}))^2}{1 - f^2 \Delta(\mu; \vec{x})^2}. \tag{52}$$

The first algorithm is based on gradient ascent. Namely, it starts with a random initial point, and keeps taking steps proportional to the gradient of $\mathcal{J}$ at the current point, until a convergence criterion is satisfied. Specifically, let $\vec{x}^{(t)}$ be the parameter vector at iteration t. Embodiments of the present invention may update it as follows:

$$\vec{x}^{(t+1)} = \vec{x}^{(t)} + \delta(t) \nabla \mathcal{J}(\mu; f, \vec{x})|_{\vec{x} = \vec{x}^{(t)}} \tag{53}$$

where $\delta: \mathbb{Z}^{\geq 0} \to \mathbb{R}^+$ is the step size schedule[5]. This requires the calculation of the partial derivative of $\mathcal{J}(\mu; f, \vec{x})$ with respect to each $x_j$, which can be done as follows. Embodiments of the present invention first use the procedures in Lemma 1 to compute $C_j := C_j(\mu; \vec{x}_{-j})$, $S_j := S_j(\mu; \vec{x}_{-j})$, $B_j := B_j(\mu; \vec{x}_{-j})$, $C_j' := C_j'(\mu; \vec{x}_{-j})$, $S_j' := S_j'(\mu; \vec{x}_{-j})$, and $B_j' := B_j'(\mu; \vec{x}_{-j})$ for each j. This obtains $$\Delta := \Delta(\mu; \vec{x}) = C_j \cos(2x_j) + S_j \sin(2x_j) + B_j, \tag{54}$$

$$\Delta' := \Delta'(\mu; \vec{x}) = C_j' \cos(2x_j) + S_j' \sin(2x_j) + B_j', \tag{55}$$

$$\chi_j := \frac{\partial \Delta(\mu; \vec{x})}{\partial x_j} = 2(-C_j \sin(2x_j) + S_j \cos(2x_j)), \tag{56}$$

$$\chi_j' := \frac{\partial \Delta'(\mu; \vec{x})}{\partial x_j} = 2(-C_j' \sin(2x_j) + S_j' \cos(2x_j)); \tag{57}$$

Knowing these quantities, embodiments of the present invention may compute the partial derivative of $\mathcal{J}(\mu; f, \vec{x})$ with respect to $x_j$ as follows:

$$\gamma_j := \frac{\partial \mathcal{J}(\mu; f, \vec{x})}{\partial x_j} = \frac{2f^2[(1 - f^2 \Delta^2)\Delta' \chi_j' + f^2 \Delta \chi_j (\Delta')^2]}{[1 - f^2 \Delta^2]^2}. \tag{58}$$

Embodiments of the present invention may repeat this procedure for $j = 1, 2, \ldots, 2L$. Then embodiments of the present invention may obtain $\nabla \mathcal{J}(\mu; f, \vec{x}) = (\gamma_1, \gamma_2, \ldots, \gamma_{2L})$. Each iteration of the algorithm takes $O(L^2)$ time. The number of iterations in the algorithm depends on the initial point, the termination criterion and the step size schedule $\delta$. See Algorithm 65 for more details.

[5] In the simplest case, $\delta(t) = \delta$ is constant. But in order to achieve better performance, we might want $\delta(t) \to 0$ as $t \to \infty$.

The second algorithm is based on coordinate ascent. Unlike gradient ascent, this algorithm does not require step sizes, and allows each variable to change dramatically in a single step. As a consequence, it may converge faster than the previous algorithm. Specifically, embodiments of the present invention which implement this algorithm may start with a random initial point, and successively maximize the objective function $\mathcal{J}(\mu; f, \vec{x})$ along coordinate directions, until a convergence criterion is satisfied. At the j-th step of each round, it solves the following single-variable optimization problem for a coordinate $x_j$:

$$\arg\max_z \frac{f^2(C'_j \cos(2z) + S'_j \sin(2z) + B'_j)^2}{1 - f^2(C_j \cos(2z) + S_j \sin(2z) + B_j)^2}, \quad (59)$$

where $C_j = C_j(\mu; \vec{x}_{-j})$, $S_j = S_j(\mu; \vec{x}_{-j})$, $B_j = B_j(\mu; \vec{x}_{-j})$, $C'_j = C'_j(\mu; \vec{x}_{-j})$, $S'_j = S'_j(\mu; \vec{x}_{-j})$, $B'_j = B'_j(\mu; \vec{x}_{-j})$ may be computed in $O(L)$ time by the procedures in Lemma 1. This single-variable optimization problem may be tackled by standard gradient-based methods, and we set $x_j$ to be its solution. Repeat this procedure for $j=1, 2, \ldots, 2L$. This algorithm produces a sequence $\vec{x}^{(0)}, \vec{x}^{(1)}, \vec{x}^{(2)}, \ldots$, such that $\mathcal{J}(\mu; f, \vec{x}^0) \leq \mathcal{J}(\mu; f, \vec{x}^1) \leq \mathcal{J}(\mu; f, \vec{x}^2) \leq \ldots$. Namely, the value of $\mathcal{J}(\mu; f, \vec{x}^t)$ increases monotonically as t grows. Each round of the algorithm takes $\theta(L^2)$ time. The number of rounds in the algorithm depends on the initial point and the termination criterion.

4.1.2. Maximizing the Slope of the Likelihood Function

Embodiments of the present invention may perform one or more of two algorithms for maximizing the slope of the likelihood function $\mathbb{P}(d|\theta; f, \vec{x})$ at a given point $\theta = \mu$ (i.e. the prior mean of $\theta$). Assume that a goal is to find $\vec{x} \in \mathbb{R}^{2L}$ that maximize $|\mathbb{P}'(\mu; f, \vec{x})| = f|\Delta'(\mu; f, \vec{x})|/2$.

Similar to Algorithms 65 and 65 for Fisher information maximization, the algorithms for slope maximization are also based on gradient ascent and coordinate ascent, respectively. They both call the procedures in Lemma 1 to evaluate $C'(\mu; \vec{x}_{-j})$, $S'(\mu; \vec{x}_{-j})$ and $B'(\mu; \vec{x}_{-j})$ for given $\mu$ and $\vec{x}_{-j}$. However, the gradient-ascent-based algorithm uses the above quantities to compute the partial derivative of $(\Delta'(\mu; \vec{x}))^2$ with respect to $x_j$, while the coordinate-ascent-based algorithm uses them to directly update the value of $x_j$. These algorithms are formally described in Algorithms 1 and 2, respectively.

4.2. Approximate Bayesian Inference with Engineered Likelihood Functions

With the algorithms for tuning the circuit parameters in place, we now describe how to efficiently carry out Bayesian inference with the resultant likelihood functions. Embodiments of the present invention may compute the posterior mean and variance of $\theta$ directly after receiving a measurement outcome d. But this approach is time-consuming, as it involves numerical integration. By taking advantage of certain property of the engineered likelihood functions, embodiments of the present invention may greatly accelerate this process.

Figure 13:
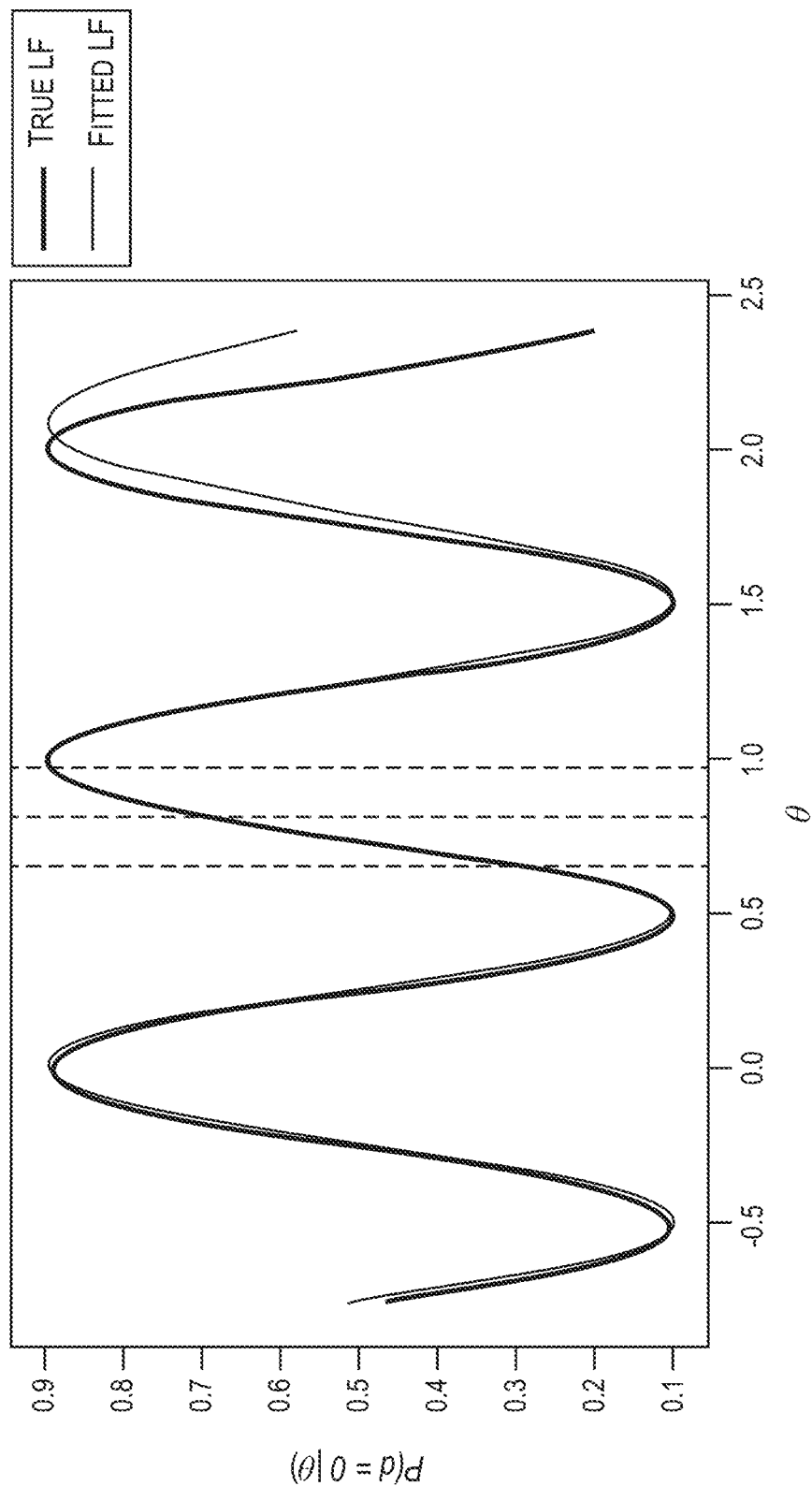
FIG. 13 is a plot of true and fitted likelihood functions according to various embodiments of the present invention.
Figure 14A:
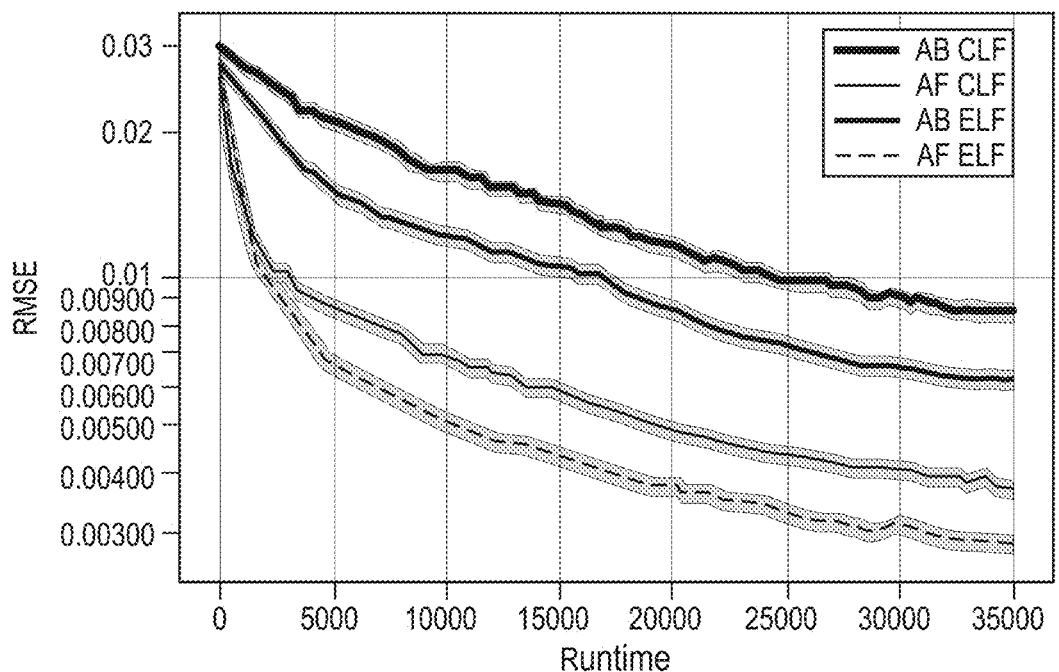
FIGS. 14A-14B, 15A-15B, 16A-16B, 17A-17B, and 18A-18B show plots illustrating performance of various embodiments of the present invention.
Figure 14B:
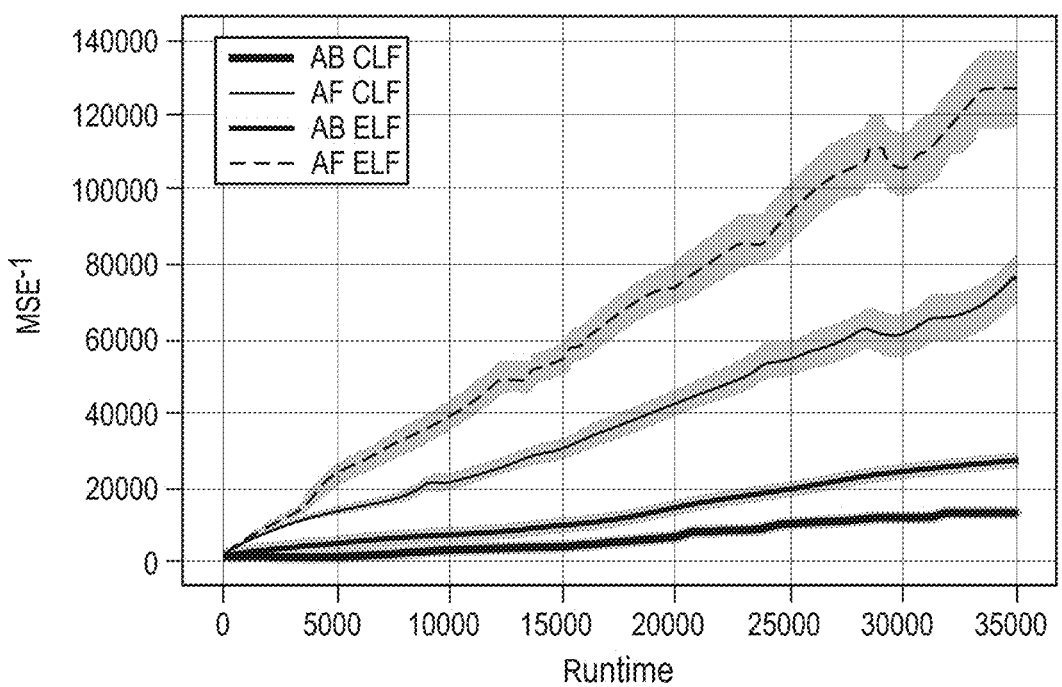
Figure 15A:
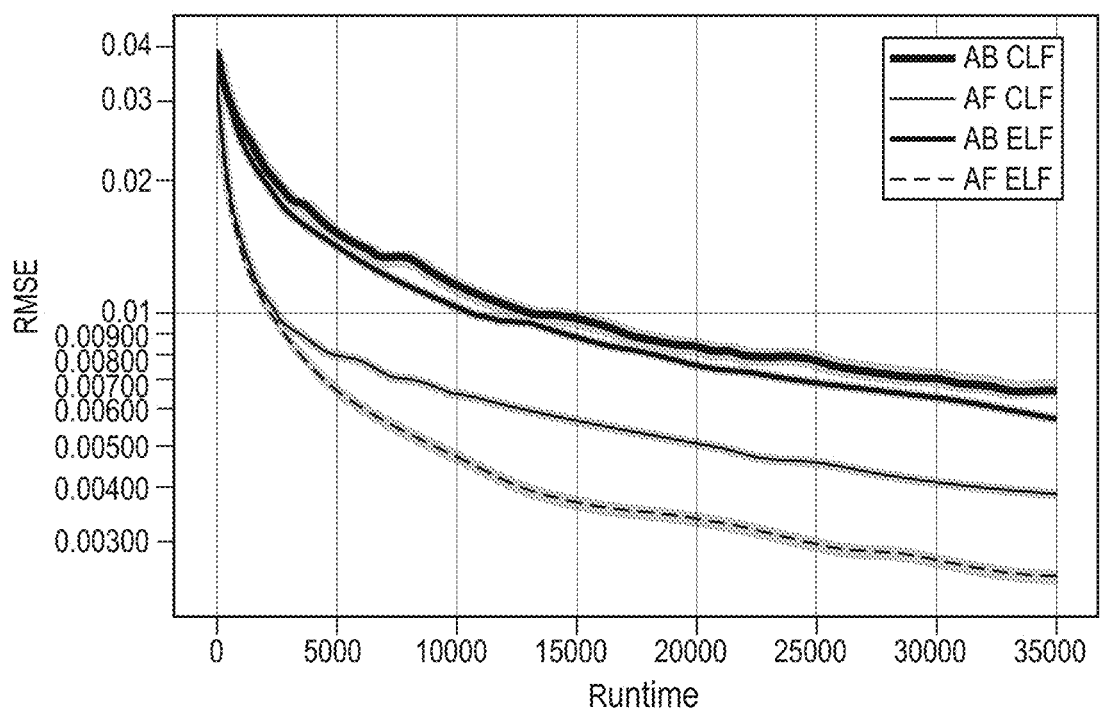
Figure 15B:
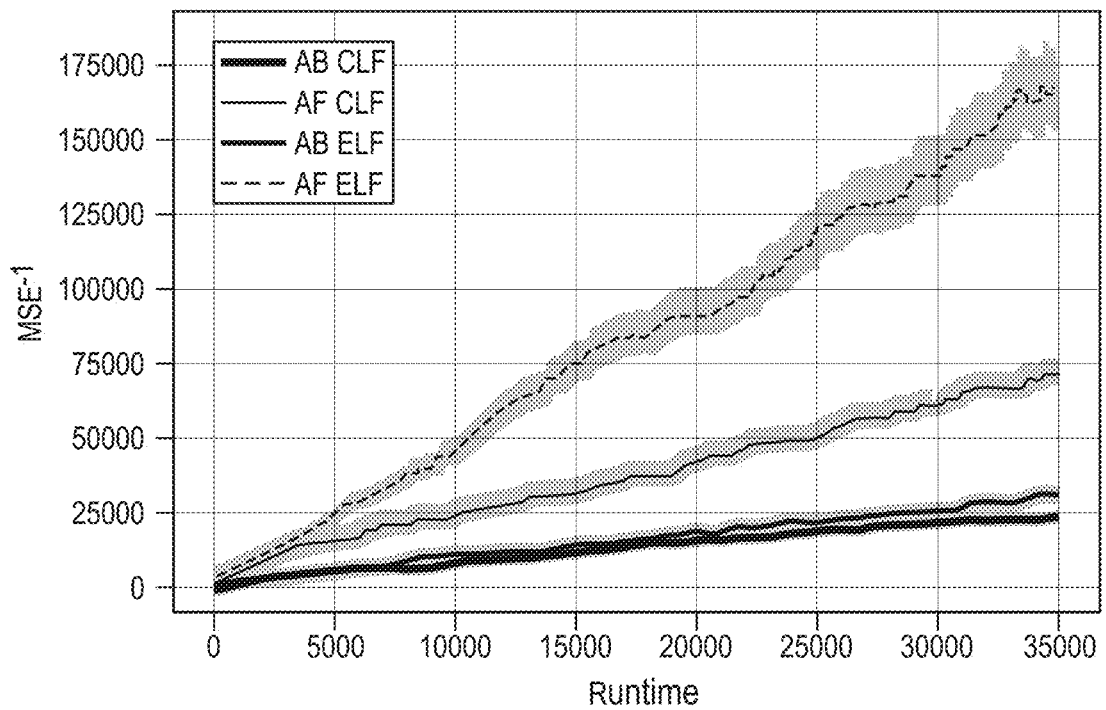
Figure 16A:
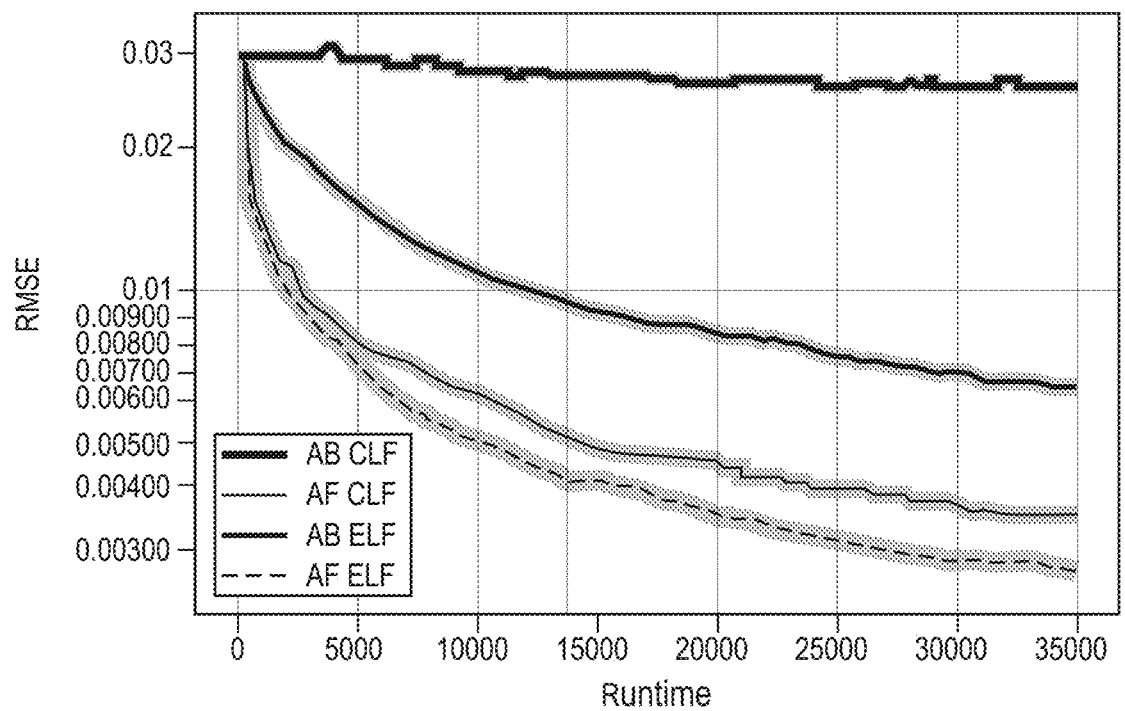
Figure 16B:
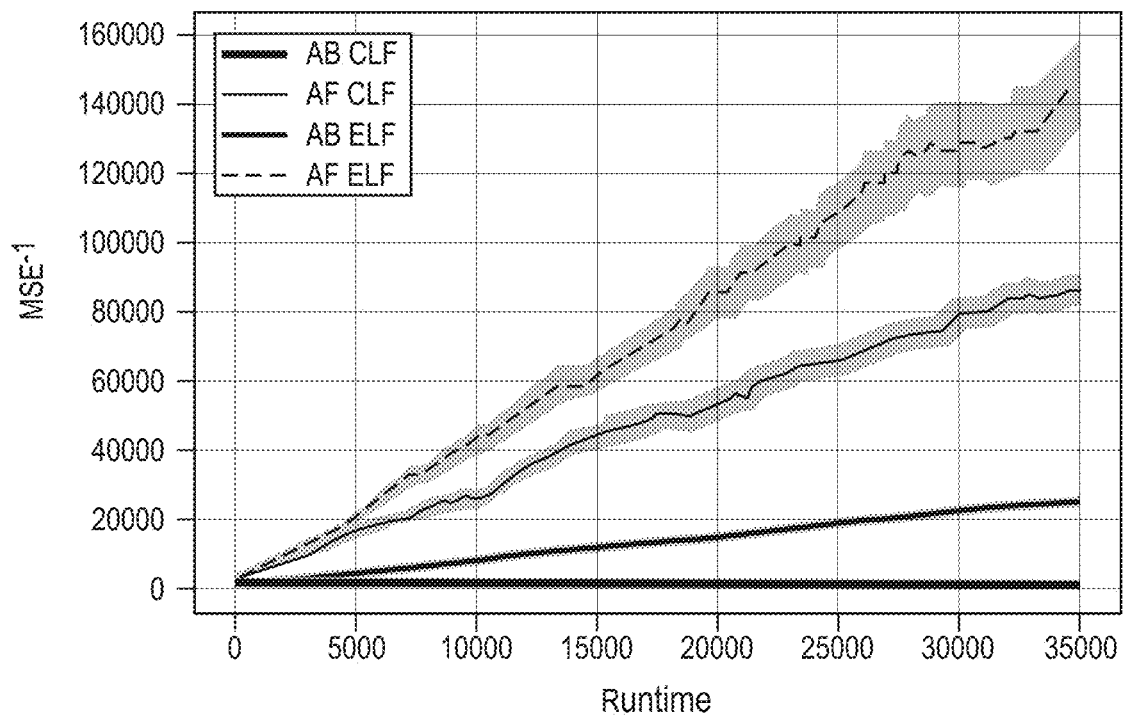
Figure 17A:
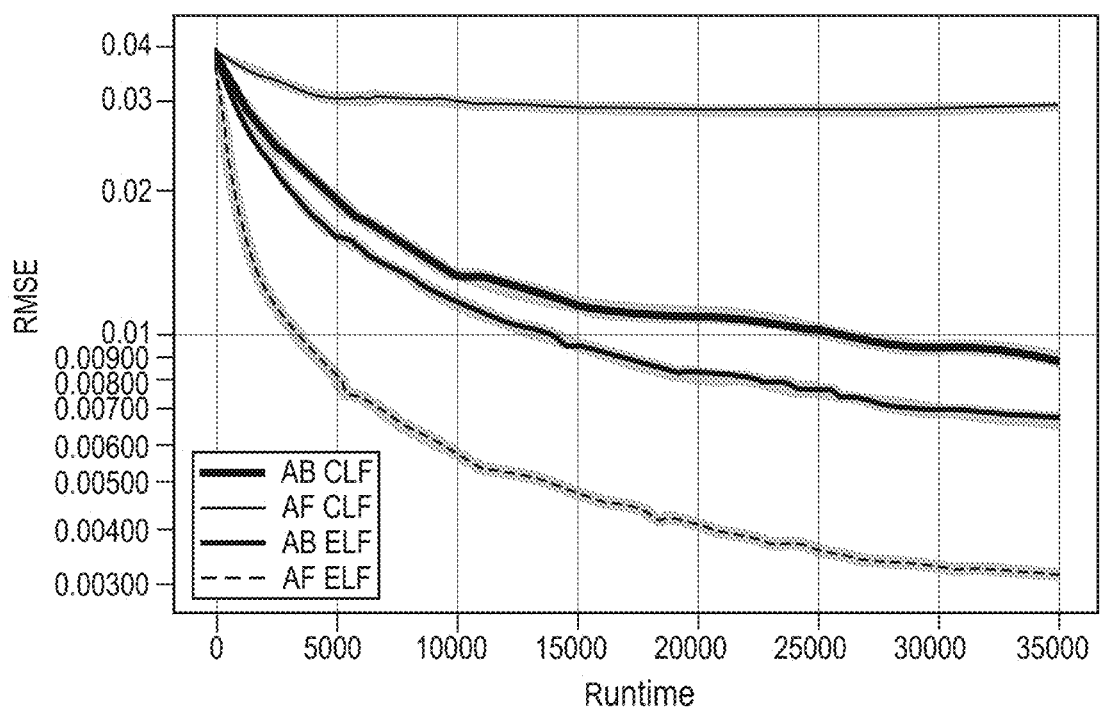
Figure 17B:
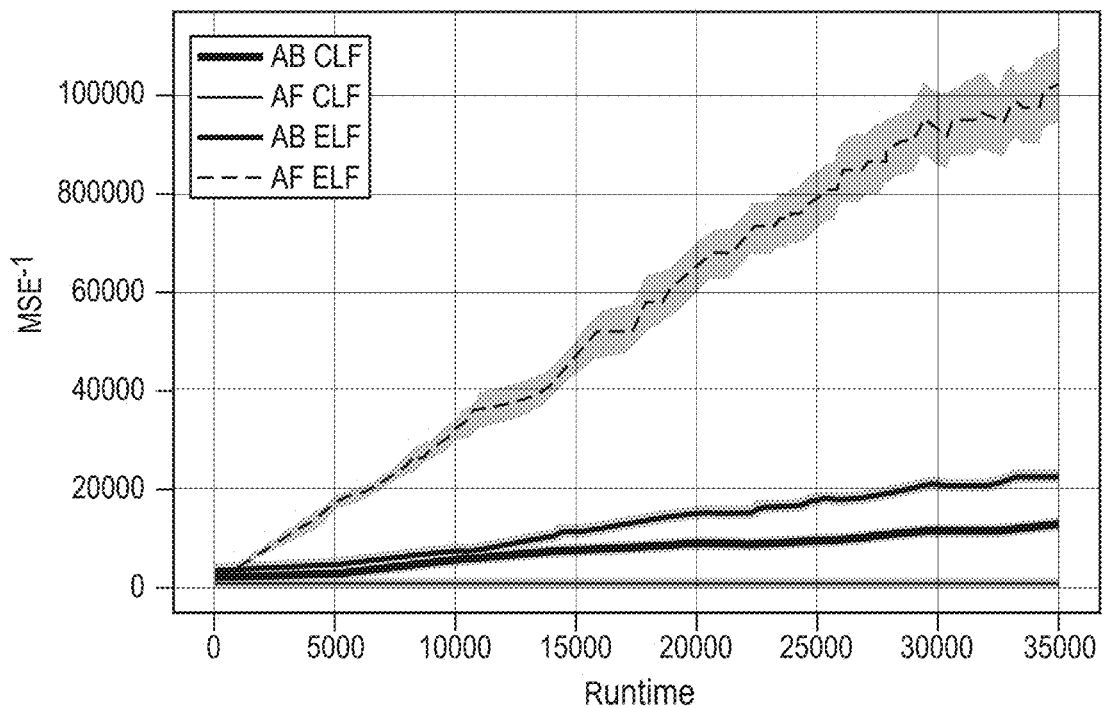
Figure 18A:
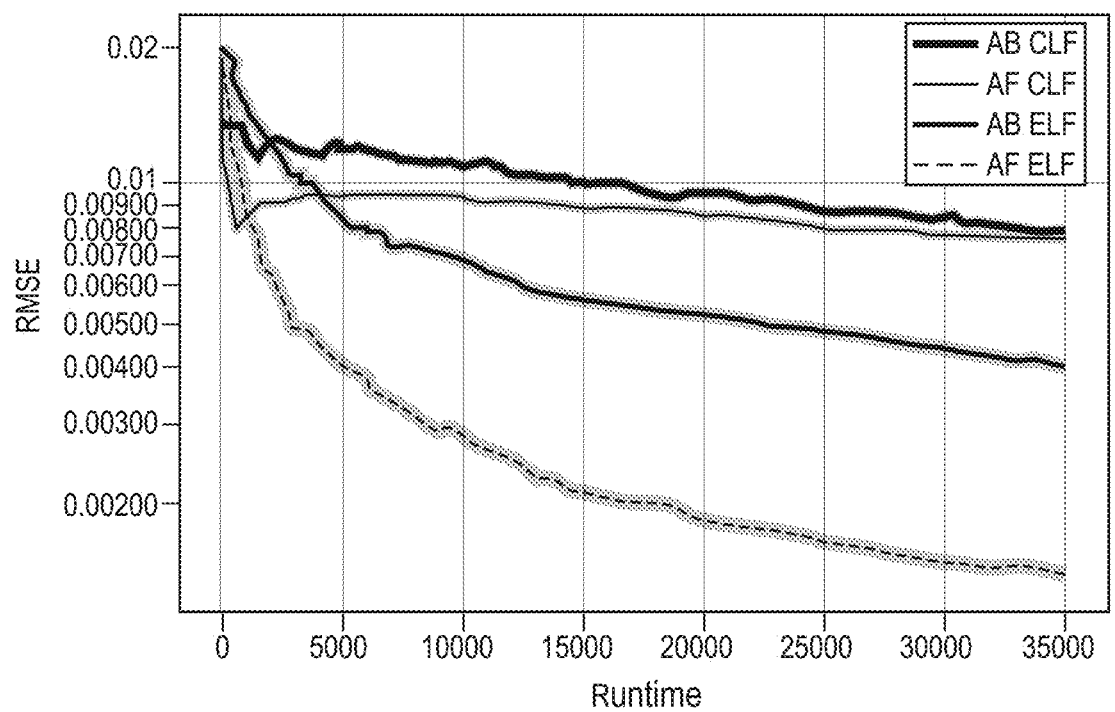
Figure 18B:
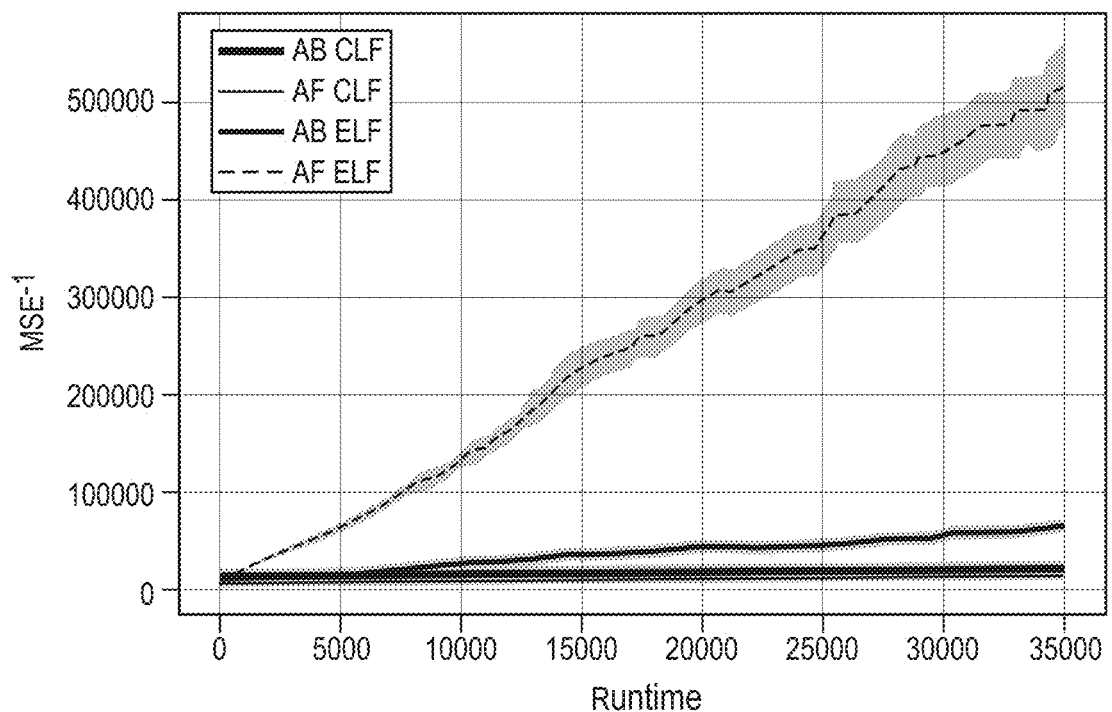

Suppose $\theta$ has prior distribution $\mathcal{N}(\mu, \sigma^2)$, where $\sigma \ll 1/L$, and the fidelity of the process for generating the ELF is $f$. Embodiments of the present invention may find that the parameters $\vec{x} = (x_1, x_2, \ldots, x_{2L})$ that maximize $\mathcal{J}(\mu; f, \vec{x})$ (or $|\Delta'(\mu; f, \vec{x})|$) satisfy the following property: When $\theta$ is close to $\mu$, i.e. $\theta \in [\mu - O(\sigma), \mu + O(\sigma)]$, we have $$\mathbb{P}(d | \theta; f, \vec{x}) \approx \frac{1 + (-1)^d f \sin(r\theta + b)}{2} \quad (67)$$

for some $r, b \in \mathbb{R}$. Namely, embodiments of the present invention may approximate $\Delta(\theta; \vec{x})$ by a sinusoidal function in this region of $\theta$. FIG. 13 illustrates one such example.

Embodiments of the present invention may find the best-fitting r and b by solving the following least squares problem:

$$(r^*, b^*) = \arg\min_{r,b} \sum_{\theta \in \Theta} |\arcsin(\Delta(\theta; \vec{x})) - r\theta - b|^2, \quad (68)$$

where $\Theta = \{\theta_1, \theta_2, \ldots, \theta_k\} \subseteq [\mu - O(\sigma), \mu + O(\sigma)]$. This least-squares problem has the following analytical solution:

$$\binom{r^*}{b^*} = A^+ z = (A^T A)^{-1} A^T z, \quad (69)$$

where $$A = \begin{pmatrix} \theta_1 & 1 \\ \theta_2 & 1 \\ \vdots & \vdots \\ \theta_k & 1 \end{pmatrix}, z = \begin{pmatrix} \arcsin(\Delta(\theta_1; \vec{x})) \\ \arcsin(\Delta(\theta_2; \vec{x})) \\ \vdots \\ \arcsin(\Delta(\theta_k; \vec{x})) \end{pmatrix}. \quad (76)$$

FIG. 13 demonstrates an example of the true and fitted likelihood functions. Once embodiments of the present invention obtain the optimum r and b, they may approximate the posterior mean and variance of $\theta$ by the ones for $$\mathbb{P}(d | \theta; f) = \frac{1 + (-1)^d f \sin(r\theta + b)}{2}, \quad (77)$$

which have analytical formulas. Specifically, suppose $\theta$ has prior distribution $\mathcal{N}(\mu_k, \sigma_k^2)$ at round k. Let $d_k$ be the measurement outcome and $(r_k, b_k)$ be the best-fitting parameters at this round. Then embodiments of the present invention may approximate the posterior mean and variance of $\theta$ by $$\mu_{k+1} = \mu_k + \frac{(-1)^{d_k} f e^{-r_k^2 \sigma_k^2/2} r_k \sigma_k^2 \cos(r_k \mu_k + b_k)}{1 + (-1)^{d_k} f e^{-r_k^2 \sigma_k^2/2} \sin(r_k \mu_k + b_k)}, \quad (78)$$

$$\sigma_{k+1}^2 = \sigma_k^2 \left(1 - \frac{f r_k^2 \sigma_k^2 e^{-r_k^2 \sigma_k^2/2} \left[f e^{-r_k^2 \sigma_k^2/2} + (-1)^{d_k} \sin(r_k \mu_k + b_k)\right]}{\left[1 + (-1)^{d_k} f e^{-r_k^2 \sigma_k^2/2} \sin(r_k \mu_k + b_k)\right]^2}\right). \quad (79)$$

After that, embodiments of the present invention may proceed to the next round, setting $\mathcal{N}(\mu_{k+1}, \sigma_{k+1}^2)$ as the prior distribution of $\theta$ for that round.

Note that, as FIG. 13 illustrates, the difference between the true and fitted likelihood functions can be large when $\theta$ is far from $\mu$, i.e. $|\theta - \mu| \gg \sigma$. But since the prior distribution $$P(\theta) = \frac{1}{\sqrt{2\pi}\sigma} e^{-\frac{(\theta - \mu)^2}{2\sigma^2}}$$

decays exponentially in $|\theta - \mu|$, such $\theta$'s have little contribution to the computation of posterior mean and variance of $\theta$. So Eqs. (78) and (79) give highly accurate estimates of the posterior mean and variance of $\theta$, and their errors have negligible impact on the performance of the whole algorithm.

5. Simulation Results

This section describes certain results of simulating Bayesian inference with engineered likelihood functions for amplitude estimation. These results demonstrate certain advantages of certain engineered likelihood functions over unengineered ones, as well as the impacts of circuit depth and fidelity on their performance.

5.1. Experimental Details

In our experiments, we assume that it takes much less time to implement $U(x)=\exp(-ixP)$ and perform the projective measurement $$\left\{\frac{I+P}{2}, \frac{I-P}{2}\right\}$$

than to implement A. So when the number of circuit layer is L, the time cost of an inference round is roughly $(2L+1)T(A)$, where $T(A)$ is the time cost of A (note that an L-layer circuit makes $2L+1$ uses of A and $A^\dagger$). For simplicity, assume that A takes unit time (i.e. $T(A)=1$) in the upcoming discussion. Moreover, assume that there is no error in the preparation and measurements of quantum states, i.e. $\bar{p}=1$, in the experiments.

Suppose we aim to estimate the expectation value $\Pi=\cos(\theta)=\langle A|P|A\rangle$. Let $\hat{\mu}_t$ be the estimator of $\Pi$ at time t. Note that $\hat{\mu}_t$ itself is a random variable, since it depends on the history of random measurement outcomes up to time t. We measure the performance of a scheme by the root-mean-squared error (RMSE) of $\hat{\mu}_t$, which is given by $$\text{RMSE}_t = \text{MSE}_t = \sqrt{\mathbb{E}[(\hat{\mu}_t - \Pi)^2]}. \quad (80)$$

The following will describe how fast $\text{RMSE}_t$ decays as t grows for various schemes, including the ancilla-based Chebyshev likelihood function (AB CLF), ancilla-based engineered likelihood function (AB ELF), ancilla-free Chebyshev likelihood function (AF CLF), and ancilla-free engineered likelihood function (AF ELF).

In general, the distribution of $\hat{\mu}_t$ is difficult to characterize, and there is no analytical formula for $\text{RMSE}_t$. To estimate this quantity, embodiments of the present invention may execute the inference process M times, and collect M samples $\hat{\mu}_t^{(1)}, \hat{\mu}_t^{(2)}, \ldots, \hat{\mu}_t^{(M)}$ of $\hat{\mu}_t$, where $\hat{\mu}_t^{(i)}$ be the estimate of $\Pi$ at time t in the i-th run, for $i=1, 2, \ldots, M$. Then embodiments of the present invention may use the quantity $$\overline{\text{RMSE}_t} := \sqrt{\frac{1}{M}\sum_{i=1}^{M}(\hat{\mu}_t^{(i)} - \Pi)^2}. \quad (81)$$

to approximate the true $\text{RMSE}_t$. In our experiments, we set $M=300$ and find that this leads to satisfactory results.

Embodiments of the present invention may use coordinate-ascent-based Algorithms 2 and 6 to optimize the circuit parameters $\vec{x}$ in the ancilla-free and ancilla-based cases, respectively. This shows that Algorithms 1 and 2 produce solutions of equal quality, and the same statement holds for Algorithms 5 and 6. So our experimental results would not change if we had used gradient-ascent-based Algorithms 1 and 5 to tune the circuit angles $\vec{x}$ instead.

For Bayesian update with ELFs, embodiments of the present invention may use the methods in Section 4.2 and Appendix A.2 to compute the posterior mean and variance of θ in the ancilla-free and ancilla-based cases, respectively. In particular, during the sinusoidal fitting of ELFs, embodiments of the present invention may set $\Theta=\sigma$, $\mu-0.8\sigma$, ..., $\mu+0.8\sigma+\sigma$ (i.e. $\Theta$ contains 11 uniformly distributed points in $[\mu-\sigma, \mu+\sigma]$) in Eqs. (68) and (148). We find that this is sufficient for obtaining high-quality sinusoidal fits of ELFs.

6. A Model for Noisy Algorithm Performance

Embodiments of the present invention may implement a model for the runtime needed to achieve a target mean-squared error in the estimate of Π as it is scaled to larger systems and run on devices with better gate fidelities. This model may be built on two main assumptions. The first is that the growth rate of the inverse mean squared error is well-described by half the inverse variance rate expression (c.f. Eq. (40)). The half is due to the conservative estimate that the variance and squared bias contribute equally to the mean squared error (simulations from the previous section show that the squared bias tends to be less than the variance). The second assumption is an empirical lower bound on the variance reduction factor, which is motivated by numerical investigations of the Chebyshev likelihood function.

We carry out analysis for the MSE with respect to the estimate of θ. We will then convert the MSE of this estimate to an estimate of MSE with respect to Π. Our strategy will be to integrate upper and lower bounds for the rate expression $R(\mu, \sigma; f, m)$ in Eq. (40) to arrive at bounds for inverse MSE as a function of time.

To help our analysis we make the substitution $m=T(L)=2L+1$ and reparameterize the way noise is incorporated by introducing $\lambda$ and $\alpha$ such that $f^2 = \bar{p}^2 p^{2L} = e^{-\lambda(2L+1)-\alpha} = e^{-\lambda m - \alpha}$.

The upper and lower bounds on this rate expression are based on findings for the Chebyshev likelihood functions, where $\vec{x} = (\pi/2)^{2L}$. Since the Chebyshev likelihood functions are a subset of the engineered likelihood functions, a lower bound on the Chebyshev performance gives a lower bound on the ELF performance. We leave as a conjecture that the upper bound for this rate in the case of ELF is a small multiple (e.g. 1.5) of the upper bound we have established for the Chebyshev rate.

The Chebyshev upper bound is established as follows. For fixed σ, λ, and m, one can show[6] that the variance reduction factor achieves a maximum value of $\mathcal{V} = m^2 \exp(-m^2\sigma^2 - \lambda m - \alpha)$, occurring at $\mu = \pi/2$. This expression is less than $m^2 e^{-m^2\sigma^2}$, which achieves a maximum of $$(e\sigma^2)^{-1} \text{ at } m = \frac{1}{\sigma}.$$

Thus, the factor $1/(1-\sigma^2 \mathcal{V})$ cannot exceed $1/(1-e^{-1})\approx 1.582$. Putting this all together, for fixed σ, λ, and m, the maximum rate is upper bounded as $$R(\mu, \sigma; \lambda, \alpha, m) \le \frac{em}{e-1}\exp(-m^2\sigma^2 - \lambda m - \alpha).$$

This follows from the fact that R is monotonic in $\mathcal{V}$ and that $\mathcal{V}$ is maximized at $\mu=\pi/2$. In practice, embodiments of the present invention may use a value of L which maximizes the inverse variance rate. The rate achieved by discrete L cannot exceed the value obtained when optimizing the above upper bound over continuous value of m. This optimal value is realized for $1/m = \frac{1}{2}(\sqrt{\lambda^2 + 8\sigma^2} + \lambda)$. We define $\bar{R}(\sigma; \lambda, \alpha)$ by evaluating $R(\pi/2, \sigma; \lambda, \alpha, m)$ at this optimum value, $$\overline{R}(\sigma;\lambda,\alpha) = \frac{2e^{-\alpha-1}}{\sqrt{\lambda^2 8\sigma^2}+\lambda}\exp\left(\frac{2\sigma^2}{4\sigma^2+\lambda^2+\lambda^2\sqrt{8\sigma^2/\lambda^2+1}}\right), \quad (82)$$

which gives the upper bound on the Chebyshev rate $$R_C^*(\mu,\sigma;\lambda,\alpha) = \max_L R(\mu,\sigma;\lambda,\alpha,m) \leq \frac{e}{e-1}\overline{R}(\sigma;\lambda,\alpha). \quad (83)$$

Embodiments of the present invention do not have an analytic lower bound on the Chebyshev likelihood performance. We can establish an empirical lower bound based on numerical checks. For any fixed L, the inverse variance rate is zero at the $2L+2$ points $\mu \in \{0, \pi/(2L+1), 2\pi/(2L+1), \ldots, 2L\pi/(2L+1), \pi\}$. Since the rate is zero at these end points for all L, the global lower bound on $R_C^*$ is zero. However, we are not concerned with the poor performance of the inverse variance rate near these end points. When we convert the estimator from $\hat{\theta}$ to $\hat{\Pi}=\cos\hat{\theta}$, the information gain near these end point actually tends to a large value. For the purpose of establishing useful bounds, we will restrict $\mu$ to be in the range $[0.1\pi, 0.9\pi]$. In the numerical tests[7] we find that for all $\mu \in [0.1\pi, 0.9\pi]$, there is always a choice of L for which the inverse variance rate is above $(e-1)^2/e^2 \approx 0.40$ times the upper bound. Putting these together, we have

[7] We searched over a uniform grid of 50000 values of 0, L values from L*/3 to 3L*, where L* is to the optimized value used to arrive at Eq. 82, and $\sigma$ and $\lambda$ ranging over $[10^{-1}, 10^{-2}, \ldots, 10^{-5}]$. For each $(\sigma, \lambda)$ pair we found the $\theta$ for which the maximum inverse variance rate (over L) is a minimum. For all $(\sigma, \lambda)$ pairs checked, this worst-case rate was always between 0.4 and 0.5, with the smallest value found being $R = 0.41700368 \geq (e-1)^2/e^2$.

[6] For the Chebvshev likelihood functions, we can express the variance reduction factor as $$\mathcal{V}\left(\mu,\sigma;f,\left(\frac{\pi}{2}\right)^{2L}\right) = m_L^2/\left(1+\left(f^{-2}e^{m_L^2\sigma^2}-1\right)\csc^2(m_L\mu)\right)$$

whenever $\sin(m_L\mu) \neq 0$. Then, $\csc(m_L\mu) \geq 1$ implies that $\mathcal{V}(\mu, \sigma; f,$ $$\left(\frac{\pi}{2}\right)^{2L}\right) \leq f^2 m_L^2 e^{-m_L^2\sigma^2}.$$

For now, we will assume that the rate tracks the geometric mean of these two bounds, i.e. $R_C^*(\sigma, \lambda, \mu) = \overline{R}(\sigma, \lambda)$, keeping in mind that the upper and lower bounds are small constant factors off of this.

Assume that the inverse variance grows continuously in time at a rate given by the difference quotient expression captured by the inverse-variance rate, $$R^* = \frac{d}{dt}\frac{1}{\sigma^2}.$$

$$\frac{e-1}{e}\overline{R}(\sigma;\lambda,\alpha) \leq R_C^*(\mu,\sigma;\lambda,\alpha) \leq \frac{e}{e-1}\overline{R}(\sigma;\lambda,\alpha). \quad (84)$$

It is important to note that by letting m be continuous, certain values of $\sigma$ and $\lambda$ can lead to an optimal m for which $L=(m-1)/2$ is negative. Therefore, these results apply only in the case that $\lambda \leq 1$, which ensures that $m \geq 1$. We expect this model to break down in the large-noise regime (i.e. $\lambda \geq 1$).

Letting $F=1/\sigma^2$ denote this inverse variance, the rate equation above can be recast as a differential equation for F, $$\frac{dF}{dt} = \frac{2e^{-\alpha-1}}{\lambda\sqrt{1+8/(F\lambda^2)}+\lambda}\exp\left(\frac{2}{4+\lambda^2 F+\lambda^2 F\sqrt{1+8/(\lambda^2 F)}}\right). \quad (85)$$

Through this expression, we can identify both the Heisenberg limit behavior and shot-noise limit behavior. For $F \ll 1/\lambda^2$, the differential equation becomes $$\frac{dF}{dt} = \frac{e^{-\alpha-1/2}}{\sqrt{2}}\sqrt{F}, \quad (86)$$

which integrates to a quadratic growth of the inverse squared error $F(t) \sim t^2$. This is the signature of the Heisenberg limit regime. For $F \gg 1/\lambda^2$, the rate approaches a constant, $$\frac{dF}{dt} = \frac{e^{-\alpha-1}}{\lambda}. \quad (87)$$

This regime yields a linear growth in the inverse squared error $F(t) \sim t$, indicative of the shot-noise limit regime.

In order to make the integral tractable, the rate expression may be replaced with integrable upper and lower bound expressions (to be used in tandem with our previous bounds). Letting $x = \lambda^2 F$, these bounds are re-expressed as, $$\frac{2e^{-\alpha-1}\lambda}{1+1/\sqrt{12x}+(x+4)/\sqrt{x^2+8x}} \geq \quad (88)$$

$$\frac{dx}{dt} \geq \frac{2e^{-\alpha-1}\lambda}{1+1/\sqrt{4x}+(x+4)/\sqrt{x^2+8x}}.$$

From the upper bound we can establish a lower bound on the runtime, by treating time as a function of x and integrating, $$\int_0^t dt \geq \int_{x_0}^{x_f} dx \frac{e^{\alpha+1}}{2\lambda}\left(1+1/\sqrt{12x}+(x+4)/\sqrt{x^2+8x}\right) \quad (89)$$

$$= \frac{e^{\alpha+1}}{2\lambda}\left(x_f+\sqrt{x_f/3}+\frac{1}{2}\sqrt{x_f^2+8x_f}-x_0-\sqrt{x_0/3}-\frac{1}{2}\sqrt{x_0^2+8x_0}\right). \quad (90)$$

Similarly, we can use the lower bound to establish an upper bound on the runtime. Here we introduce our assumption that, in the worst case, the MSE of the phase estimate $\varepsilon_\theta^2$ is twice the variance (i.e. the variance equals the bias), so the variance must reach half the MSE: $\sigma^2 = \varepsilon_\theta^2/2 = \lambda^2/x$. In the best case, we assume the bias in the estimate is zero and set $\varepsilon_\theta^2 = \lambda^2/x$. We combine these bounds with the upper and lower bounds of Eq. (84) to arrive at the bounds on the estimation runtime as a function of target MSE, $$(e-1)\frac{e^{-\lambda}}{2\bar{p}^2}\left(\frac{\lambda}{\varepsilon_\theta^2}+\frac{1}{\sqrt{3}\,\varepsilon_\theta}+\sqrt{\left(\frac{\lambda}{\varepsilon_\theta^2}\right)^2+\left(\frac{2\sqrt{2}}{\varepsilon_\theta}\right)^2}\right)\leq \quad (91)$$

$$t_{\varepsilon_\theta}\leq \frac{e^2}{e-1}\frac{e^{-\lambda}}{\bar{p}^2}\left(\frac{\lambda}{\varepsilon_\theta^2}+\frac{1}{\sqrt{2}\,\varepsilon_\theta}+\sqrt{\left(\frac{\lambda}{\varepsilon_\theta^2}\right)^2+\left(\frac{2}{\varepsilon_{beta}}\right)^2}\right).$$

where $\theta \in [0.1\pi, 0.9\pi]$.

At this point, we can convert our phase estimate $e$ back into the amplitude estimate $\hat{\Pi}$. The MSE with respect to the amplitude estimate $\varepsilon_\Pi^2$ can be approximated in terms of the phase estimate MSE as $$\varepsilon_\Pi^2 = \mathbb{E}(\hat{\Pi}-\Pi)^2 = \mathbb{E}(\cos\hat{\theta}-\cos\theta)^2 \approx \mathbb{E}\left((\hat{\theta}-\theta)\frac{d\cos\theta}{d\theta}\right)^2 = \varepsilon_\theta^2 \sin^2\theta, \quad (92)$$

where we have assumed that the distribution of the estimator is sufficiently peaked about $\theta$ to ignore higher-order terms. This leads to $\varepsilon_\theta^2 = \varepsilon_\Pi^2/(1-\Pi^2)$, which can be substituted into the above expressions for the bounds, which hold for $\Pi \in [\cos 0.9\pi, \cos 0.1\ \pi] \approx [-0.95, 0.95]$. Dropping the estimator subscripts (as they only contribute constant factors), we can establish the runtime scaling in the low-noise and high-noise limits, $$t_\varepsilon = \begin{cases} O(e^\alpha/\varepsilon) & \lambda \ll \varepsilon, \quad (93) \\ O(e^\alpha \lambda/\varepsilon^2) & \lambda \gg \varepsilon, \quad (94) \end{cases}$$

observing that the Heisenberg-limit scaling and shot-noise limit scaling are each recovered.

Figure 19:
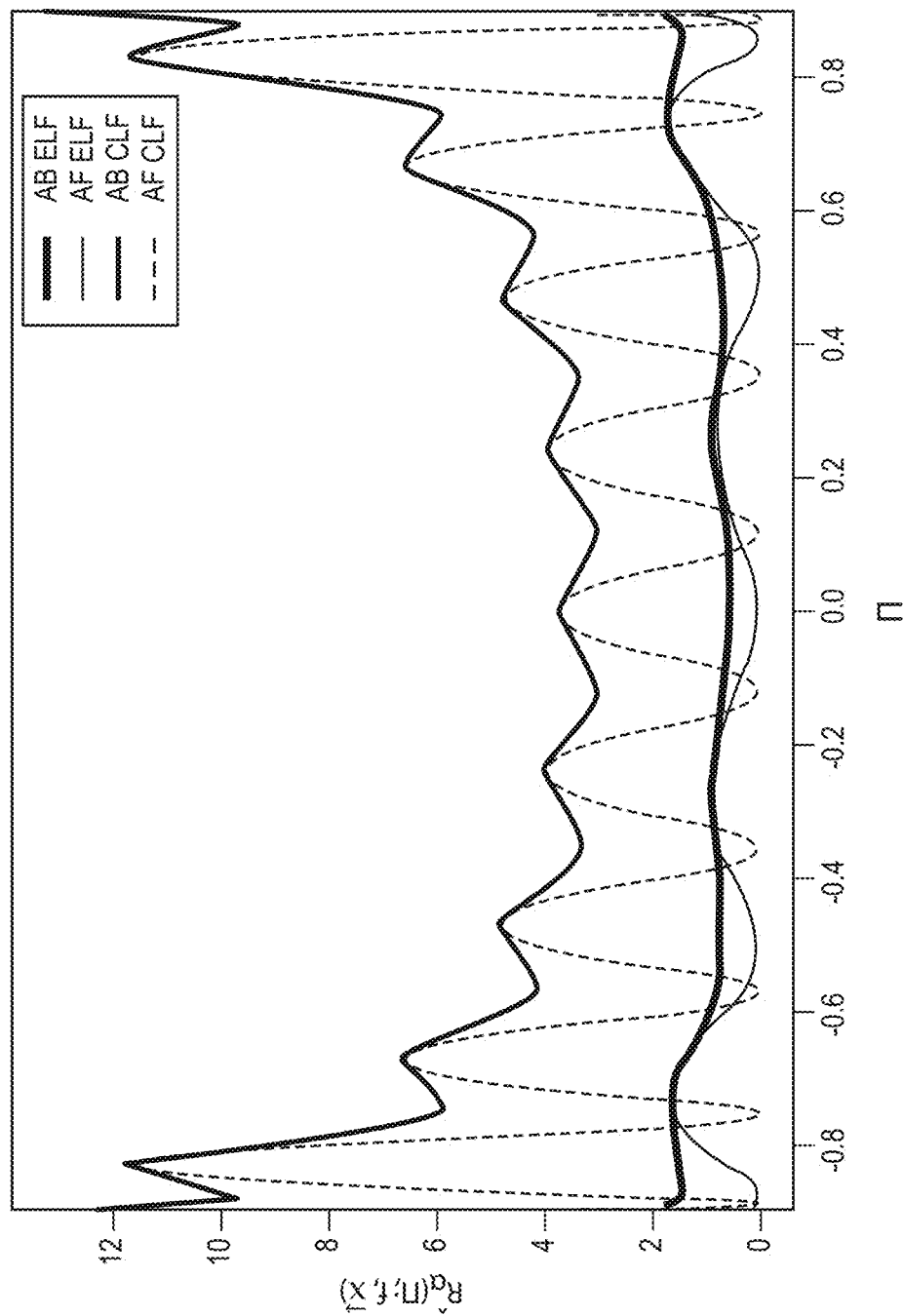
FIG. 19 shows the $\widehat{R_0}$ factors of various embodiments of the present invention.
Figure 20A:
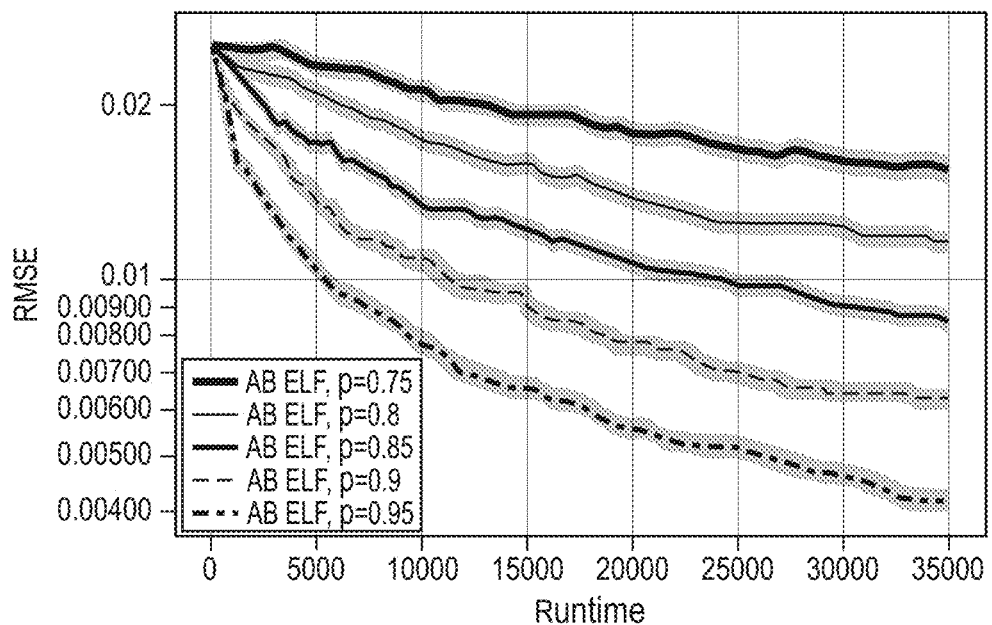
FIGS. 20A-20B and 21A-21B show plots illustrating performance of various embodiments of the present invention.
Figure 20B:
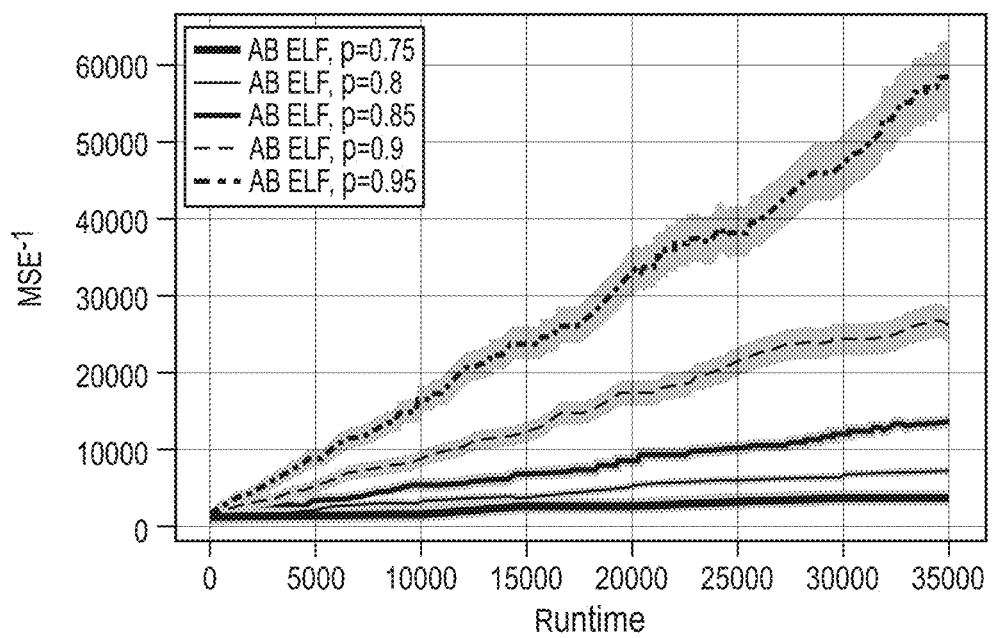
Figure 21A:
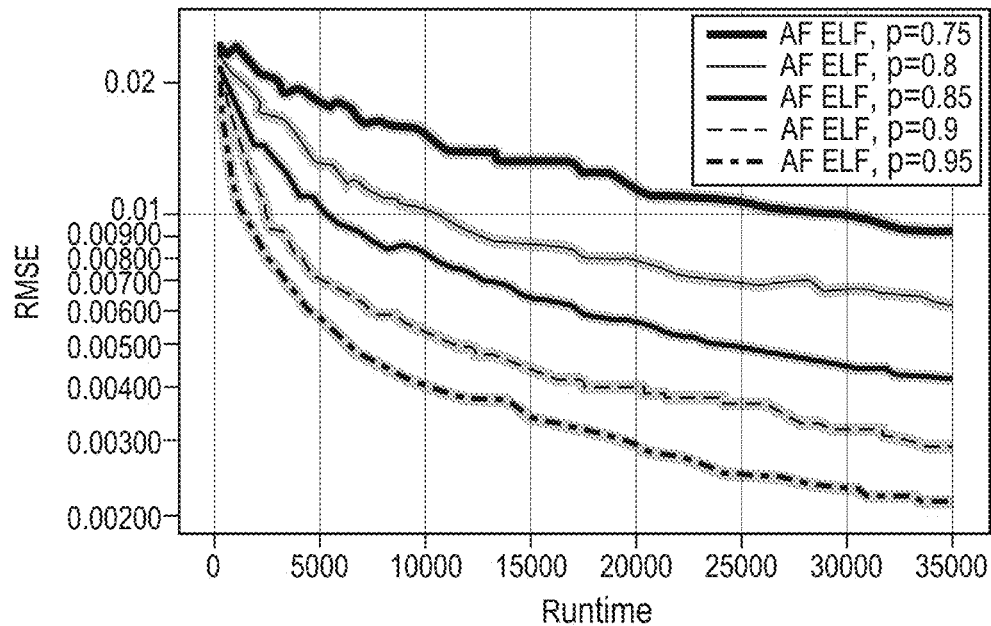
Figure 21B:
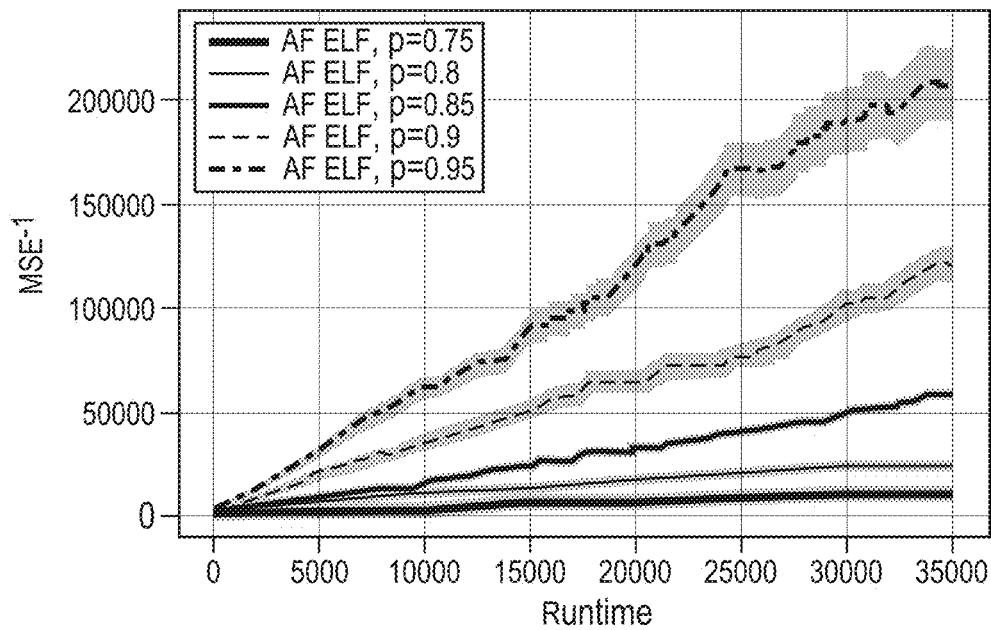
Figure 22A:
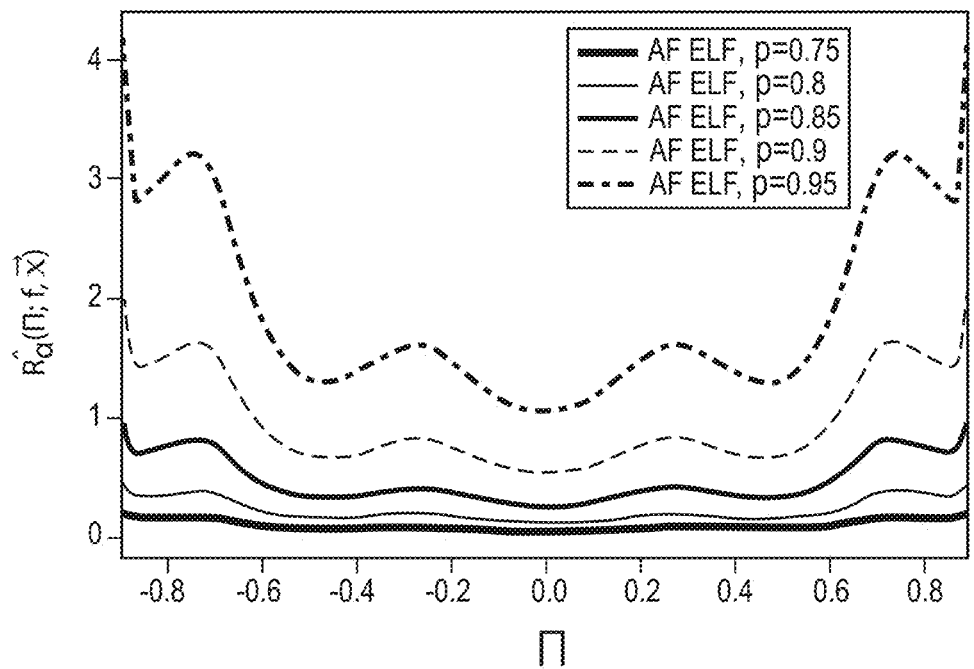
FIGS. 22A-22B show the $\widehat{R_0}$ factors of various embodiments of the present invention.
Figure 22B:
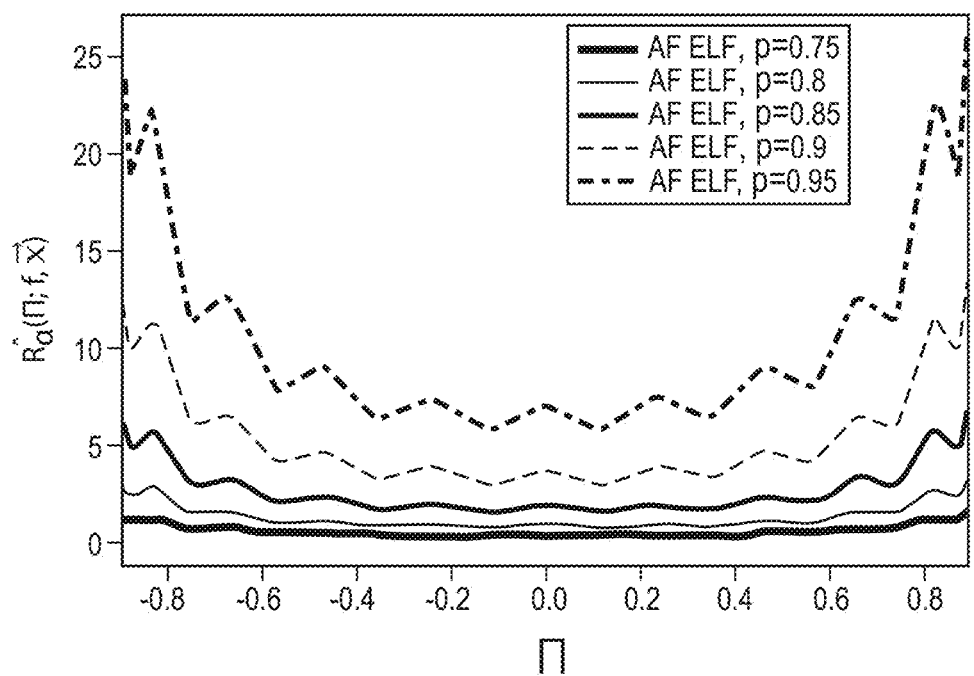
Figure 23A:
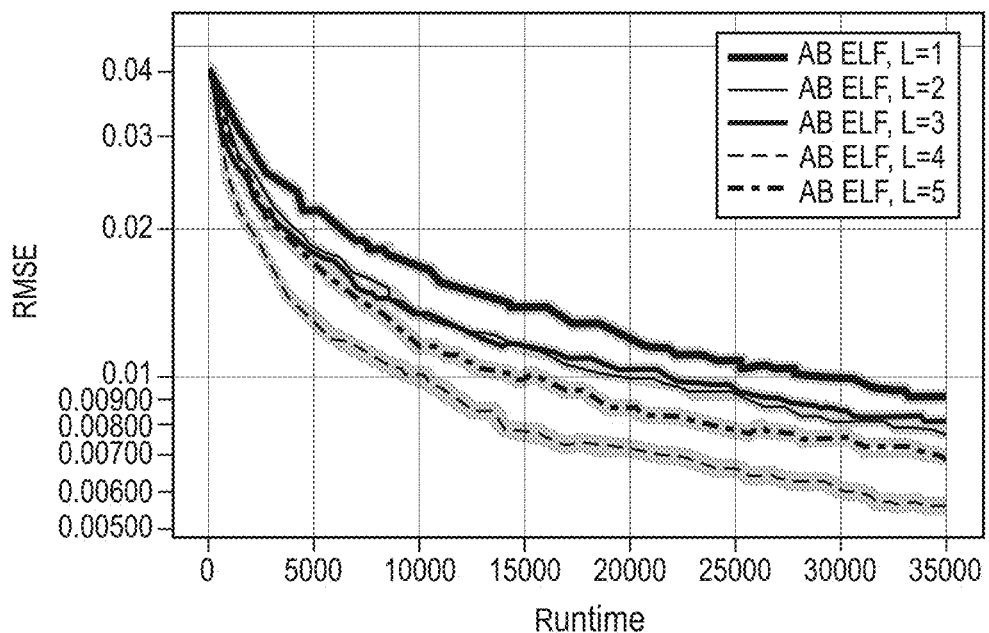
FIGS. 23A-23B and 24A-24B show plots illustrating performance of various embodiments of the present invention.
Figure 23B:
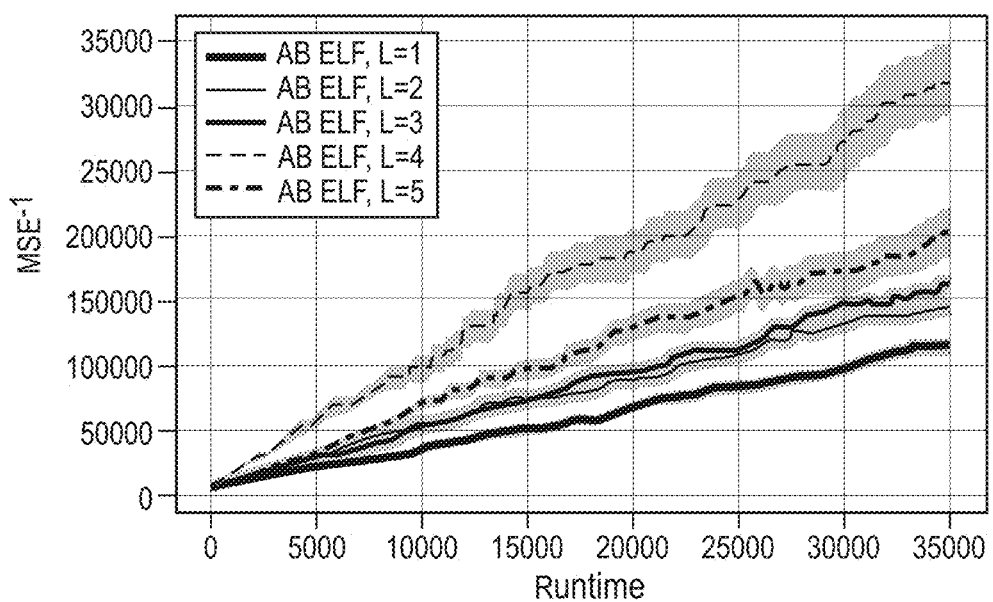
Figure 24A:
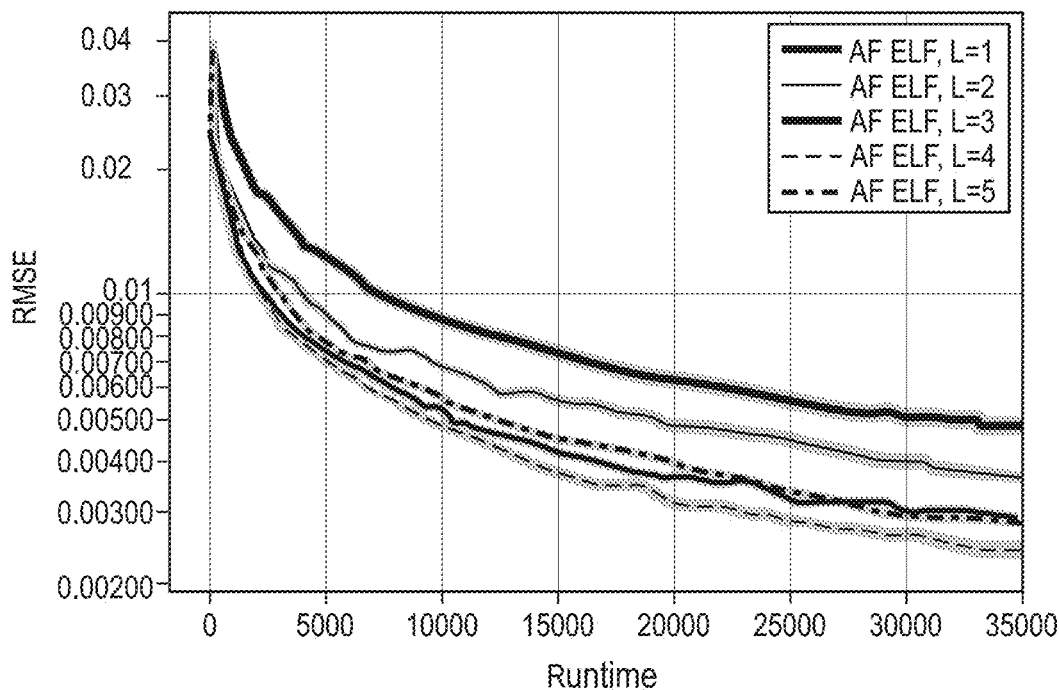
Figure 24B:
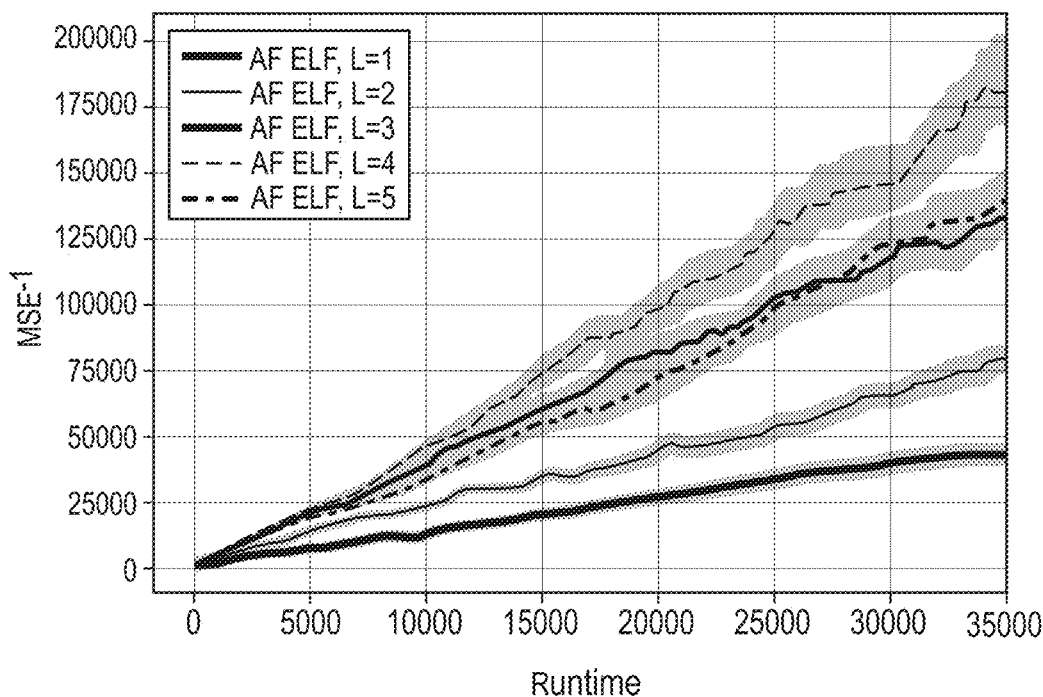
Figure 25A:
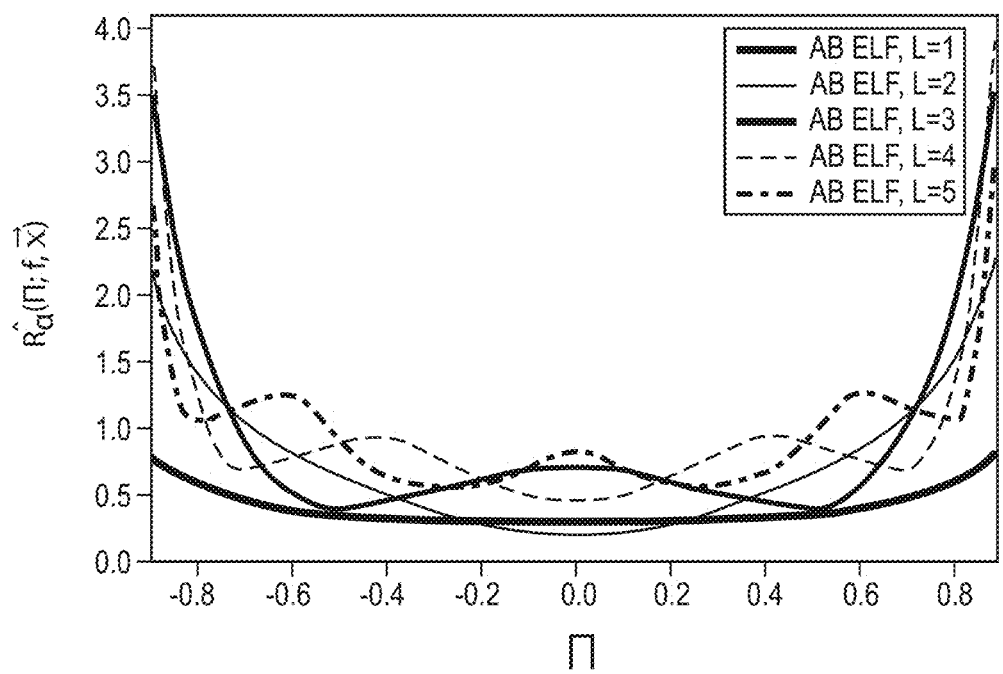
FIGS. 25A-25B show the $\widehat{R_0}$ factors of various embodiments of the present invention.
Figure 25B:
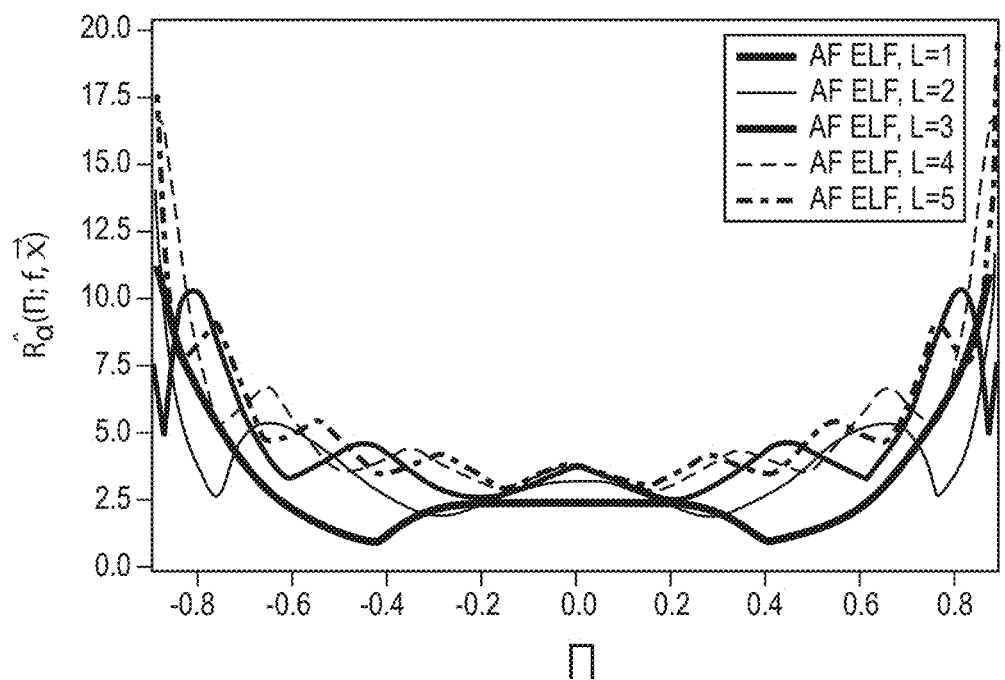

We arrived at these bounds using properties of Chebyshev likelihood functions. As we have shown in the previous section, by engineering likelihood functions, in many cases we can reduce estimation runtimes. Motivated by our numerical findings of the variance reduction factors of engineered likelihood functions (see, e.g. FIG. 19), we conjecture that using engineered likelihood functions increases the worst case inverse-variance rate in Eq. (84) to $\overline{R}(\sigma;\lambda,\alpha) \leq R_C(\mu,\sigma;\lambda,\alpha)$.

In order to give more meaning to this model, we will refine it to be in terms of number of qubits $n$ and two-qubit gate fidelities $f_{2Q}$. We consider the task of estimating the expectation value of a Pauli string $P$ with respect to state $|A\rangle$. Assume that $\Pi = \langle A|P|A\rangle$ is very near zero so that $\varepsilon^2 = \varepsilon_\Pi^2 \approx \Pi_\theta^2$. Let the two-qubit gate depth of each of the $L$ layers be $D$. We model the total layer fidelity as $p = f_{2Q}^{nD/2}$, where we have ignored errors due to single-qubit gates. From this, we have $\lambda = \frac{1}{2} nD \ln(1/f_{2Q})$ and $\alpha = 2 \ln(1/\bar{p}) = \frac{1}{2} nD \ln(1/f_{2Q})$. Putting these together, we arrive at the runtime expression, $$t_\varepsilon = \quad (95)$$

$$\frac{f_{2Q}^{nD/2}}{2\bar{p}^2}\left(\frac{nD\ln(1/f_{2Q})}{2\varepsilon^2}+\frac{1}{\sqrt{6}\,\varepsilon}+\sqrt{\left(\frac{nD\ln(1/f_{2Q})}{2\varepsilon^2}\right)^2+\left(\frac{2\sqrt{2}}{\varepsilon}\right)^2}\right).$$

Figure 26:
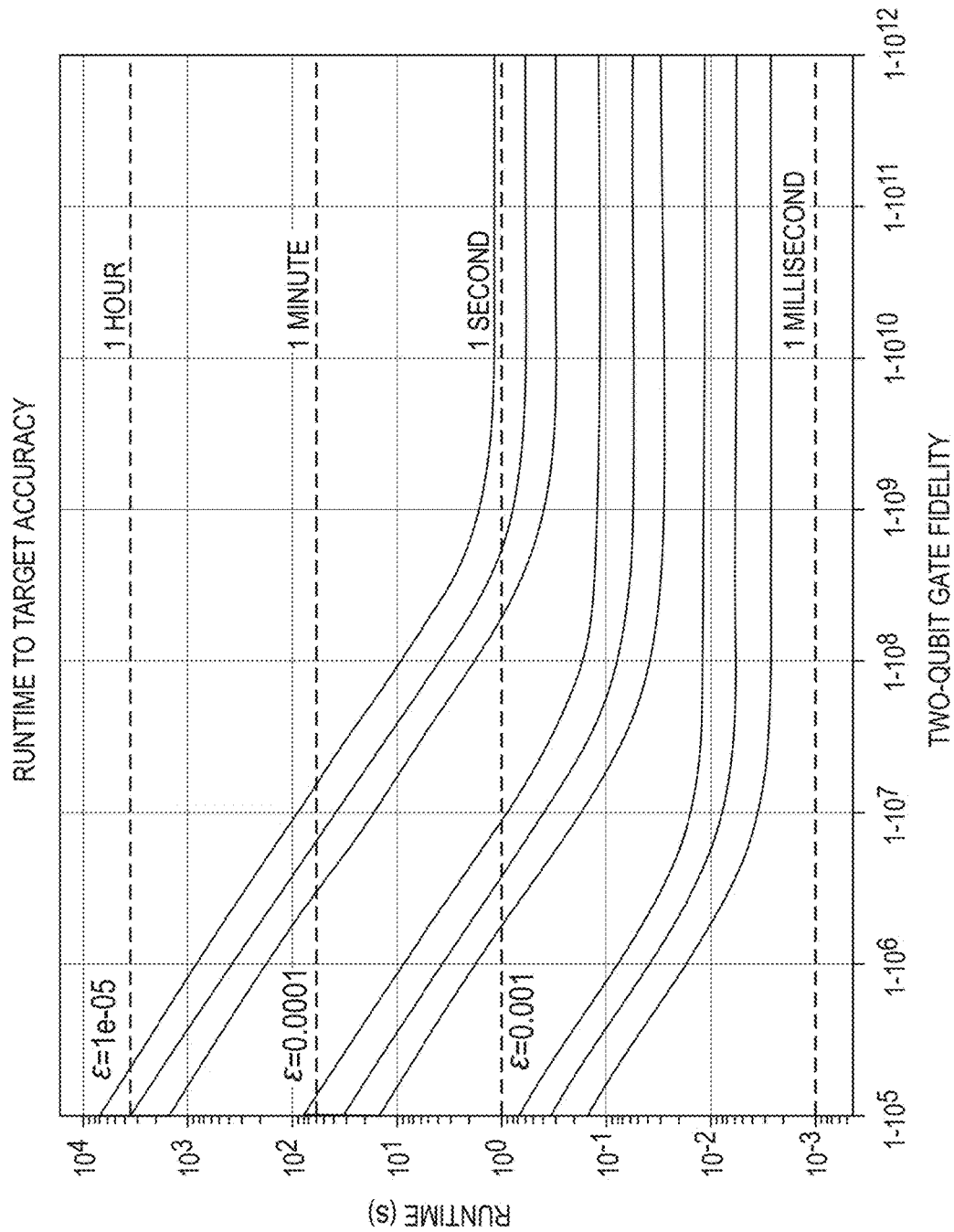
FIG. 26 shows plots illustrating the runtime to target accuracy of various embodiments of the present invention.

Finally, we will put some meaningful numbers in this expression and estimate the required runtime in seconds as a function of two-qubit gate fidelities. To achieve quantum advantage we expect that the problem instance will require on the order of $n=100$ logical qubits and that the two-qubit gate depth is on the order of the number of qubits, $D=200$. Furthermore, we expect that target accuracies $\varepsilon$ will need to be on the order of $\varepsilon=10^{-3}$ to $10^{-5}$. The runtime model measures time in terms of ansatz circuit durations. To convert this into seconds we assume each layer of two-qubit gates will take time $G=10^{-8}$ s, which is an optimistic assumption for today's superconducting qubit hardware. FIG. 26 shows this estimated runtime as a function of two-qubit gate fidelity.

The two-qubit gate fidelities required to reduce runtimes into a practical region will most likely require error correction. Performing quantum error correction requires an overhead which increases these runtimes. In designing quantum error correction protocols, it is essential that the improvement in gate fidelities is not outweighed by the increase in estimation runtime. The proposed model gives a means of quantifying this trade-off: the product of gate infidelity and (error-corrected) gate time should decrease as useful error correction is incorporated. In practice, there are many subtleties which should be accounted for to make a more rigorous statement. These include considering the variation in gate fidelities among gates in the circuit and the varying time costs of different types of gates. Nevertheless, the cost analyses afforded by this simple model may be a useful tool in the design of quantum gates, quantum chips, error correcting schemes, and noise mitigation schemes.

APPENDIX A. ANCILLA-BASED SCHEME

In this appendix, we present an alternative scheme, called the ancilla-based scheme. In this scheme, the engineered likelihood function (ELF) is generated by the quantum circuit in FIG. 27, in which $\vec{x}=(x_1, x_2, \ldots, x_{2L-1}, x_{2L}) \in \mathbb{R}$ are tunable parameters.

Figure 27:
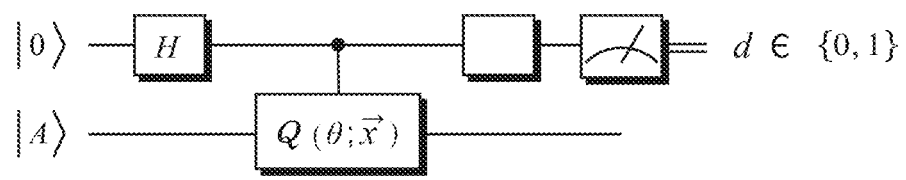
FIGS. 27-28 show quantum circuits implemented according to embodiments of the present invention.
Figure 28:
Figure 33:
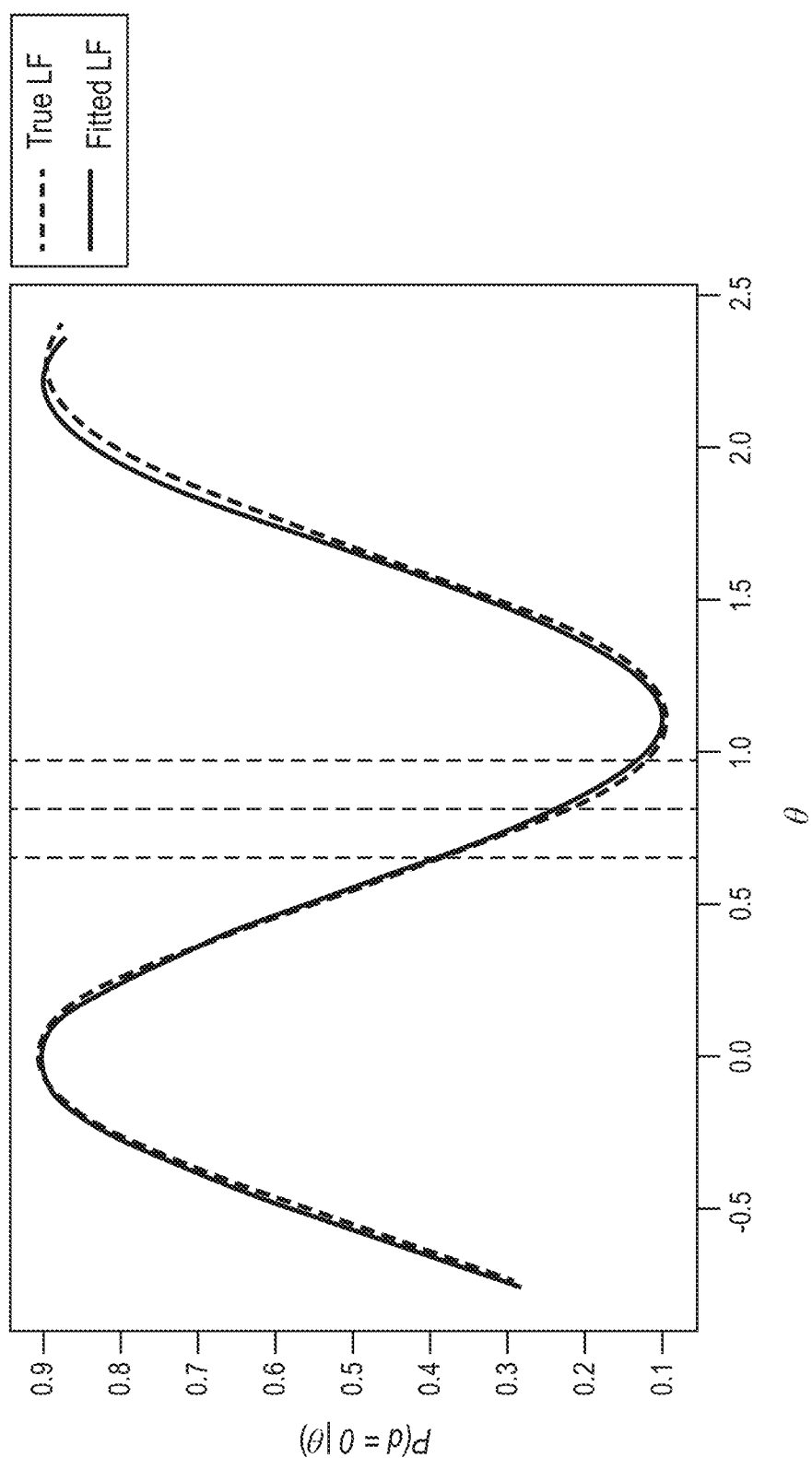
FIG. 33 shows true and fitted likelihood functions according to embodiments of the present invention.

Assuming the circuit in FIG. 27 is noiseless, the engineered likelihood function is given by $$\mathbb{P}(d|\theta;\vec{x}) = \frac{1}{2}[1+(-1)^d \Lambda(\theta;\vec{x})], \forall d \in \{0,1\} \quad (96)$$

where $$\Lambda(\theta;\vec{x}) = \text{Re}(\langle A|Q(\theta;\vec{x})|A\rangle) \quad (97)$$

is the bias of the likelihood function. It turns out that most of the argument in Section 3.1 still holds in the ancilla-based case, except that $\Delta(\theta; \vec{x})$ is replaced with $\Lambda(\theta; \vec{x})$. So we will use the same notation (e.g. $|0\rangle$, $|1\rangle$, $\overline{X}$, $\overline{Y}$, $\overline{Z}$, $\overline{I}$) as before, unless otherwise stated. In particular, when we take the errors in the circuit in FIG. 27 into account, the noisy likelihood function is given by $$\mathbb{P}(d|\theta;f,\vec{x}) = \frac{1}{2}[1+(-1)^d f \Lambda(\theta;\vec{x})], \forall d \in \{0,1\} \quad (98)$$

where $f$ is the fidelity of the process for generating the ELF. Note that, however, there does exist a difference between $\Delta(\theta; \vec{x})$ and $\Lambda(\theta; \vec{x})$, as the former is trigono-multiquadratic—in $\vec{x}$, while the latter is trigono-multilinear in $\vec{x}$.

We will tune the circuit angles $\vec{x}$ and perform Bayesian inference with the resultant ELFs in the same way as in Section 3.2. In fact, the argument in Section 3.2 still holds in the ancilla-based case, except that we need to replace $\Delta(\theta; \vec{x})$ with $\Lambda(\theta; \vec{x})$. So we will use the same notation as before, unless otherwise stated. In particular, we also define the variance reduction factor $\mathcal{V}(\mu, \sigma; f, x)$ as in Eqs. (37) and (38), replacing $\Delta(\theta; \vec{x})$ with $\Lambda(\theta; \vec{x})$. It can be shown, $$\mathcal{V}(\mu, \sigma; f, \vec{x}) \approx \mathcal{J}(\mu; f, \vec{x}) = \frac{f^2(\Lambda'(\theta; \vec{x}))^2}{1 - f^2(\Lambda(\theta; \vec{x}))^2}, \text{ when } \sigma \text{ is small,} \quad (99)$$

and $$\mathcal{V}(\mu, \sigma; f, \vec{x}) \approx f^2(\Lambda'(\mu; \vec{x}))^2, \text{ when both } \sigma \text{ and } f \text{ are small.} \quad (100)$$

Namely, the Fisher information and slope of the likelihood function $\mathbb{P}(d|\theta; f, \vec{x})$ at $\theta = \mu$ are two proxies of the variance reduction factor $\mathcal{V}(\mu, \sigma; f, \vec{x})$ under reasonable assumptions. Since the direct optimization of $\mathcal{V}$ is hard in general, we will tune the parameters $\vec{x}$ by optimizing these proxies instead.

A.1. Efficient Maximization of Proxies of the Variance Reduction Factor

Now we present efficient heuristic algorithms for maximizing two proxies of the variance reduction factor $\mathcal{V}$ —the Fisher information and slope of the likelihood function $\mathbb{P}(d|\theta; f, \vec{x})$. All of these algorithms make use of the following procedures for evaluating the CSD coefficient functions of the bias $\Lambda(\theta; \vec{x})$ and its derivative $\Lambda'(\theta; \vec{x})$ with respect to $x_j$ for $j = 1, 2, \ldots, 2L$.

A.1.1. Evaluating the CSD Coefficient Functions of the Bias and its Derivative Since $\Lambda(\theta; \vec{x})$ is trigono-multilinear in $\vec{x}$, for any $j \in \{1, 2, \ldots, 2L\}$, there exist functions $C_j(\theta; \vec{x}_{-j})$ and $S_j(\theta; \vec{x}_{-j})$ which are trigono-multilinear in $\vec{x}_{-j} = (x_1, \ldots, x_{j-1}, x_{j+1}, x_{2L})$, such that $$\Lambda(\theta; \vec{x}) = C_j(\theta; \vec{x}_{-j})\cos(x_j) + S_j(\theta; \vec{x}_{-j})\sin(x_j). \quad (101)$$

It follows that $$\Lambda'(\theta; \vec{x}) = C_j'(\theta; \vec{x}_{-j})\cos(x_j) + S_j'(\theta; \vec{x}_{-j})\sin(x_j). \quad (102)$$

is also trigono-multilinear in $\vec{x}$, where $C_j'(\theta; \vec{x}_{-j}) = \partial_\theta C_j(\theta; \vec{x}_{-j})$ and $S_j'(\theta; \vec{x}_{-j}) = \partial_\theta S_j(\theta; \vec{x}_{-j})$ are the derivatives of $C_j(\theta; \vec{x}_{-j})$ and $S_j(\theta; \vec{x}_{-j})$ with respect to $\theta$, respectively.

Our optimization algorithms require efficient procedures for evaluating $C_j(\theta; \vec{x}_{-j}) = \partial_\theta S_j(\theta; \vec{x}_{-j})$ and $S_j'(\theta; \vec{x}_{-j})$ for given $\theta$ and $\vec{x}_{-j}$. It turns out that these tasks can be accomplished in $O(L)$ time.

Lemma 2. Given $\theta$ and each of $C_j(\theta; \vec{x}_{-j})$, $S_j(\theta; \vec{x}_{-j})$, $C_j'(\theta; \vec{x}_{-j})$ and $S_j'(\theta; \vec{x}_{-j})$ can be computed in $O(L)$ time.

Proof. For convenience, we introduce the following notation. Let $W_{2i} = V(x_{2L-2i})$, $W_{2i+1} = U(\theta; x_{2L-2i-1})$, for $i = 0, 1, \ldots, L-1$. Furthermore, let $W_j' = \partial_\theta W_j$ for $j = 0, 1, \ldots, 2L-1$. Note that $W_j' = 0$ if $j$ is even. Then we define $P_{a,b} = W_a W_{a+1} \ldots W_b$ if $0 \leq a \leq b \leq 2L-1$, and $P_{a,b} = I$ otherwise.

With this notation, it can be shown that $$Q(\theta; \vec{x}) = P_{0,a-1} W_a P_{a+1,2L-1}, \forall 0 \leq a \leq 2L-1, \quad (103)$$

and $$Q'(\theta; \vec{x}) = P_{0,0} W_1' P_{2,2L-1} + P_{0,2} W_3' P_{4,2L-1} + \ldots P_{0,2L-4} W_{2L-3}' P_{2L-2,2L-1} + P_{0,2L-2} W_{2L-1}'. \quad (104)$$

In order to evaluate $C_j(\theta; \vec{x}_{-j})$, $S_j(\theta; \vec{x}_{-j})$, $C_j'(\theta; \vec{x}_{-j})$ and $S_j'(\theta; \vec{x}_{-j})$ for given $\theta$ and $\vec{x}_{-j}$, we consider the case $j$ is even and the case $j$ is odd separately.

Case 1: $j = 2(L-t)$ is even, where $0 \leq t \leq L-1$. In this case, $W_{2t} = V(X_j)$. Using the fact $$Q(\theta; \vec{x}) = P_{0,2t-1} W_{2t} P_{2t+1,2L-1} \quad (105)$$

$$= P_{0,2t-1}(\cos(x_j)I - i\sin(x_j)\overline{Z})P_{2t+1,2L-1} \quad (106)$$

$$= \cos(x_j)P_{0,2t-1}P_{2t+1,2L-1} - i\sin(x_j)P_{0,2t-1}\overline{Z}P_{2t+1,2L-1}, \quad (107)$$

we obtain $$\Lambda(\theta; \vec{x}) = C_j(\theta; \vec{x}_{-j})\cos(x_j) + S_j(\theta; \vec{x}_{-j})\sin(x_j), \quad (108)$$

where $$C_j(\theta; \vec{x}_{-j}) = \text{Re}(\langle \overline{0}|P_{0,2t-1}P_{2t+1,2L-1}|\overline{0}\rangle), \quad (109)$$

$$S_j(\theta; \vec{x}_{-j}) = \text{Im}(\langle \overline{0}|P_{0,2t-1}\overline{Z}P_{2t+1,2L-1}|\overline{0}\rangle), \quad (110)$$

Given $\theta$ and $\vec{x}_{-j}$, we first compute $P_{0,2t-1}$ and $P_{2t+1,2L-1}$ in $O(L)$ time.

Then we calculate $C_j(\theta; \vec{x}_{-j})$ and $S_j(\theta; \vec{x}_{-j})$ by Eqs. (109) and (110). This procedure takes only $O(L)$ time.

Next, we describe how to compute $C_j'(\theta; \vec{x}_{-j})$ and $S_j'(\theta; \vec{x}_{-j})$. Using Eq. (104) and the fact $P_{a,b} = P_{a,2t-1} W_{2t} P_{2t+1,b}$, for any $a \leq 2t \leq b$, we obtain $$Q'(\theta; \vec{x}) = \quad (111)$$
$$P_{0,0} W_1' P_{2,2t-1} W_{2t} P_{2t+1,2L-1} + P_{0,2} W_3' P_{4,2t-1} W_{2t} P_{2t+1,2L-1} + \cdots +$$
$$P_{0,2t-2} W_{2t-1}' W_{2t} P_{2t+1,2L-1} + P_{0,2t-1} W_{2t} W_{2t+1}' P_{2t+2,2L-1} + \cdots +$$
$$P_{0,2t-1} W_{2t} P_{2t+1,2L-4} W_{2L-3}' P_{2L-2,2L-1} + P_{0,2t-1} W_{2t} P_{2t+1,2L-2} W_{2L-1}'.$$

Let $$A_t = \sum_{s=1}^{t} P_{0,2s-1} W_{2s-1}' P_{2s,2t-1} \quad (112)$$

$$= \sum_{s=1}^{t} P_{0,2s-2} U'(\theta; x_{2L-2s+1}) P_{2s,2t-1}, \quad (113)$$

$$B_t = \sum_{s=t+1}^{L} P_{2t+1,2s-2} W_{2s-1}' P_{2s,2L-1} \quad (114)$$

$$= \sum_{s=t+1}^{L} P_{2t+1,2s-2} U'(\theta; x_{2L-2s+1}) P_{2s,2L-1}. \quad (115)$$

Then Eq. (111) yields $$Q'(\theta; \vec{x}) = A_t W_{2t} P_{2t+1,2L-1} + P_{0,2t-1} W_{2t} B_t \quad (116)$$

$$= A_t(\cos(x_j)I - i\sin(x_j)\overline{Z})P_{2t+1,2L-1} + \quad (117)$$
$$\quad P_{0,2t-1}(\cos(x_j)I - i\sin(x_j)\overline{Z})B_t$$

$$= \cos(x_j)(A_t P_{2t+1,2L-1} + P_{0,2t-1} B_t) - \quad (118)$$
$$\quad i\sin(x_j)(A_t \overline{Z} P_{2t+1,2L-1} + P_{0,2t-1} \overline{Z} B_t),$$

which leads to $$\Lambda'(\theta; \vec{x}) = C_j'(\theta; \vec{x}_{-j})\cos(x_j) + S_j'(\theta; \vec{x}_{-j})\sin(x_j), \quad (119)$$

where $$C'_j(\theta; \vec{x}_{-j}) = \text{Re}(\langle \bar{0}|(A_t P_{2t+1,2L-1} + P_{0,2t-1} B_t)|\bar{0}\rangle), \quad (120)$$

$$S'_j(\theta; \vec{x}_{-j}) = \text{Im}(\langle \bar{0}|(A_t Z P_{2t+1,2L-1} P_{0,2t-1} Z B_t)|\bar{0}\rangle). \quad (121)$$

Given $\theta$ and $\vec{x}_{-j}$, we first compute the following matrices in a total of $O(L)$ time by standard dynamic programming techniques:

$P_{0,2s-2}$ and $P_{2s,2t-1}$ for $s=1,2,\ldots,t$;

$P_{2t+1,2s-2}$ and $P_{2,2L-1}$ for $s=t+1,t+2,\ldots,L$;

$P_{0,2t-1}$ and $P_{2t+1,2L-1}$.

Then we compute $A_t$ and $B_t$ by Eqs. (113) and (115). After that, we calculate $C'_j(\theta; \vec{x}_{-j})$ and $S'_j(\theta; \vec{x}_{-j})$ by Eqs. (120) and (121). Overall, this procedure takes $O(L)$ time.

1. Case 2: $j=2(L-t)-1$ is odd, where $0 \le t \le L-1$. In this case, $W_{2t+1} = U(\theta; x_j)$. Using the fact $$Q(\theta; \vec{x}) = P_{0,2t} W_{2t+1} P_{2t+2,2L-1} \quad (122)$$

$$= P_{0,2t}(\cos(x_j)I - i\sin(x_j)P(\theta))P_{2t+2,2L-1} \quad (123)$$

$$= \cos(x_j) P_{0,2t} P_{2t+2,2L-1} - i\sin(x_j) P_{0,2t} P(\theta) P_{2t+2,2L-1}, \quad (124)$$

2. we obtain $$\Lambda(\theta; \vec{x}) = C_j(\theta; \vec{x}_{-j})\cos(x_j) + S_j(\theta; \vec{x}_{-j})\sin(x_j), \quad (125)$$

3. where $$C_j(\theta; \vec{x}_{-j}) = \text{Re}(\langle \bar{0}|P_{0,2t} P_{2t+2,2L-1}|\bar{0}\rangle), \quad (126)$$

$$S_j(\theta; \vec{x}_{-j}) = \text{Im}(\langle \bar{0}|P_{0,2t} P(\theta) P_{2t+2,2L-1}|\bar{0}\rangle). \quad (127)$$

4. Given $\theta$ and $\vec{x}_{-j}$, we first compute $P_{0,2t}$ and $P_{2t+2,2L-1}$ in $O(L)$ time.

Then we calculate $C_j(\theta; \vec{x}_{-j})$ and $S_j \vec{x}_{-j}$ by Eqs. (126) and (127). This procedure takes only $O(L)$ time.

Next, we describe how to compute $C'_j(\theta; \vec{x}_{-j})$ and $S'_j(\vec{x}_{-j})$. Using Eq. (104) and the fact $P_{a,b} = P_{a,2t} W_{2t+1} P_{2t+2,b}$ for any $a \le 2t+1 \le b$, we get $$Q'(\theta; \vec{x}) = \quad (128)$$
$$P_{0,0} W'_1 P_{2,2t} W_{2t+1} P_{2t+2,2L-1} + P_{0,2} W'_3 P_{4,2t} W_{2t+1} P_{2t+2,2L-1} + \cdots +$$
$$P_{0,2t-2} W'_{2t-1} P_{2t,2t} W_{2t+1} P_{2t+2,2L-1} + P_{0,2t} W'_{2t+1} P_{2t+2,2L-1} +$$
$$P_{0,2t} W_{2t+1} P_{2t+2,2t+2} W'_{2t+3} P_{2t+4,2L-1} + \cdots +$$
$$P_{0,2t} W_{2t+1} P_{2t+2,2L-4} W'_{2L-3} P_{2L-2,2L-1} + P_{0,2t} W_{2t+1} P_{2t+2,2L-2} W'_{2L-1}.$$

Let $$A_t = \sum_{s=1}^{t} P_{0,2s-2} W'_{2s-1} P_{2s,2t} \quad (129)$$

$$= \sum_{s=1}^{t} P_{0,2s-2} U'(\theta; x_{2L-2s+1}) P_{2s,2t}, \quad (130)$$

$$B_t = \sum_{s=t+2}^{L} P_{2t+2,2s-2} W'_{2s-1} P_{2s,2L-1} \quad (131)$$

$$= \sum_{s=t+2}^{L} P_{2t+2,2s-2} U'(\theta; x_{2L-2s+1}) P_{2s,2L-1}. \quad (132)$$

Then Eq. (128) yields $$Q'(\theta; \vec{x}) = \quad (133)$$
$$A_t W_{2t+1} P_{2t+2,2L-1} + P_{0,2t} W'_{2t+1} P_{2t+2,2L-1} + P_{0,2t} W_{2t+1} B_t$$

$$= A_t(\cos(x_j)I - i\sin(x_j)P(\theta))P_{2t+2,2L-1} - \quad (134)$$
$$i\sin(x_j) P_{0,2t} P'(\theta) P_{2t+2,2L-1} +$$
$$P_{0,2t}(\cos(x_j)I - i\sin(x_j)P(\theta))B_t$$

$$= \cos(x_j)(A_t P_{2t+2,2L-1} + P_{0,2t} B_t) - i\sin(x_j) \quad (135)$$
$$(A_t P(\theta) P_{2t+2,2L-1} + P_{0,2t} P'(\theta) P_{2t+2,2L-1} + P_{0,2t} P(\theta) B_t),$$

which leads to $$\Lambda'(\theta; \vec{x}) = C'_j(\vec{x}_{-j})\cos(x_j) + S'_j(\vec{x}_{-j})\sin(x_j), \quad (136)$$

where $$C'_j(\theta; \vec{x}_{-j}) = \text{Re}(\langle \bar{0}|(A_t P_{2t+2,2L-1} + P_{0,2t} B_t)|\bar{0}\rangle), \quad (137)$$

$$S'_j(\theta; \vec{x}_{-j}) = \quad (138)$$
$$\text{Im}(\langle \bar{0}|(A_t P(\theta) P_{2t+2,2L-1} + P_{0,2t} P'(\theta) P_{2t+2,2L-1} + P_{0,2t} P(\theta) B_t)|\bar{0}\rangle).$$

Given $\theta$ and $\vec{x}_{-j}$, we first compute the following matrices in a total of $O(L)$ time by standard dynamic programming techniques:

$P_{0,2s-2}$ and $P_{2s,2t}$ for $s=1,2,\ldots,t$;
$P_{2t+2,2s-2}$ and $P_{2,2L-1}$ for $s=t+2, t+3, \ldots, L$;
$P_{0,2t}$ and $P_{2t+2,2L-1}$.

Then we compute $A_t$ and $B_t$ by Eqs. (130) and (132). After that, we calculate $C'_j(\vec{x}_{-j})$ and $S'_j(\vec{x}_{-j})$ by Eqs. (137) and (138). Overall, this procedure takes $O(L)$ time.
W A.1.2. Maximizing the Fisher Information of the Likelihood Function We propose two algorithms for maximizing the Fisher information of the likelihood function $\mathbb{P}(d|\theta; f, \vec{x})$ at a given point $\theta = \mu$ (i.e. the prior mean of $\theta$). Namely, our goal is to find $\vec{x} \in \mathbb{R}^{2L}$ that maximize $$\mathcal{J}(\theta; f, \vec{x}) = \frac{f^2(\Lambda'(\theta; \vec{x}))^2}{1 - f^2(\Lambda(\theta; \vec{x}))^2}. \quad (139)$$

These algorithms are similar to Algorithms 1 and 2 for Fisher information maximization in the ancilla-free case, in the sense that they are also based on gradient ascent and coordinate ascent, respectively. The main difference is that now we invoke the procedures in Lemma 2 to evaluate $C(\mu; \vec{x}_{-j})$, $S(\vec{x}_{-j})$, $C'(\vec{x}_{-j})$ and $S'(\vec{x}_{-j})$ for given $\vec{x}_{-j}$, and then use them to either compute the partial derivative of $\mathcal{J}(\mu; f, \vec{x})$ with respect to $x_j$ (in gradient ascent) or define a single-variable optimization problem for $x_j$ (in coordinate ascent). These algorithms are formally described in Algorithms 5 and 6.

A.1.3. Maximizing the Slope of the Likelihood Function

We also propose two algorithms for maximizing the slope of the likelihood function $\mathbb{P}(d|\theta; f, \vec{x})$ at a given point $\theta = \mu$ (i.e. the prior mean of $\theta$). Namely, our goal is to find $\vec{x} \in \mathbb{R}^{2L}$ that maximize $|\mathbb{P}'(d|\theta; f, \vec{x})| = f|\Lambda'(\theta; \vec{x})|/2$.

These algorithms are similar to Algorithms 3 and 4 for slope maximization in the ancilla-free case, in the sense that they are also based on gradient ascent and coordinate ascent, respectively. The main difference is that now we invoke the procedures in Lemma 2 to evaluate $C'(\mu; \vec{x}_{-j})$ and $S'(\mu; \vec{x}_{-j})$ for given $\mu$ and $\vec{x}_{-j}$. Then we use these quantities to either compute the partial derivative of $(\Lambda(\mu; \vec{x}))^2$ with respect to $x_j$ (in gradient ascent) or directly update the value of $x_j$ (in coordinate ascent). These algorithms are formally described in Algorithms 7 and 8.

A.2. Approximate Bayesian Inference with Engineered Likelihood Functions

With the algorithms for tuning the circuit parameters $\vec{x}$ in place, we now briefly describe how to perform Bayesian inference efficiently with the resultant likelihood functions. The idea is similar to the one in Section 4.2 for the ancilla-free scheme. Suppose $\theta$ has prior distribution $\mathcal{N}(\mu, \sigma^2)$, where $\sigma \ll 1/L$, and the fidelity of the process for generating the ELF is $f$. We find that the parameters $\vec{x} = (x_1, x_2, \ldots, x_{2L})$ that maximize $\mathcal{J}(\mu; f, \vec{x})$ or $(|\Lambda'(\mu; \vec{x})|)$ satisfy the following property: When $\theta$ is close to $\mu$, i.e. $\theta \in [\mu - O(\sigma), \mu + O(\sigma)]$, we have $$\mathbb{P}(d \mid \theta; f, \vec{x}) \approx \frac{1 + (-1)^d f \sin(r\theta + b)}{2} \quad (147)$$

for some $r, b \in \mathbb{R}$. We find the best-fitting $r$ and $b$ by solving the following least squares problem:

$$(r^*, b^*) = \arg\min_{r,b} \sum_{\theta \in \Theta} |\arcsin(\Lambda(\theta; \vec{x})) - r\theta - b|^2, \quad (148)$$

where $\Theta = \{\theta_1, \theta_2, \theta_k\} \subseteq [\mu - O(\sigma), \mu + O(\sigma)]$. This least-squares problem has the following analytical solution:

$$\begin{pmatrix} r^* \\ b^* \end{pmatrix} = A^+ z = (A^T A)^{-1} A^T z, \quad (149)$$

where $$A = \begin{pmatrix} \theta_1 & 1 \\ \theta_2 & 1 \\ \vdots & \vdots \\ \theta_k & 1 \end{pmatrix}, \quad z = \begin{pmatrix} \arcsin(\Lambda(\theta_1; \vec{x})) \\ \arcsin(\Lambda(\theta_1; \vec{x})) \\ \vdots \\ \arcsin(\Lambda(\theta_k; \vec{x})) \end{pmatrix}. \quad (156)$$

FIG. 34 illustrates an example of the true and fitted likelihood functions.

Once we obtain the optimum $r$ and $b$, we approximate the posterior mean and variance of $\theta$ with the ones for $$\mathbb{P}(d \mid \theta; f) = \frac{1 + (-1)^d f \sin(r\theta + b)}{2}, \quad (157)$$

which have analytical formulas. Specifically, suppose $\theta$ has prior distribution $\mathcal{N}(\mu_k, \sigma_k^2)$ at round k. Let $d_k$ be the measurement outcome and $(r_k, b_k)$ be the best-fitting parameters at this round. Then we approximate the posterior mean and variance of $\theta$ by $$\mu_{k+1} = \mu_k + \frac{(-1)^{d_k} f e^{-r_k^2 \sigma_k^2/2} r_k \sigma_k^2 \cos(r_k \mu_k + b_k)}{1 + (-1)^{d_k} d e^{-r_k^2 \sigma_k^2/2} \sin(r_k \mu_k + b_k)}, \quad (158)$$

$$\sigma_{k+1}^2 = \sigma_k^2 \left(1 - \frac{f r_k^2 \sigma_k^2 e^{-r_k^2 \sigma_k^2/2} \left[f e^{-r_k^2 \sigma_k^2/2} + (-1)^{d_k} \sin(r_k \mu_k + b_k)\right]}{\left[1 + (-1)^{d_k} f e^{-r_k^2 \sigma_k^2/2} \sin(r_k \mu_k + b_k)\right]^2}\right). \quad (159)$$

After that, we proceed to the next round, setting $\mathcal{N}(\mu_{k+1}, \sigma_{k+1}^2)$ as the prior distribution of $\theta$ for that round. The approximation errors incurred by Eqs. (158) and (159) are small and have negligible impact on the performance of the whole algorithm for the same reason as in the ancilla-free case.

C. Proof of Lemma

For convenience, we introduce the following notation. Let $W_{2i} = U^\dagger(\theta; x_{2i+1}) = U(\theta; -X_{2i+1})$, $W_{2i+1} = V^\dagger(x_{2i+2}) = V(-x_{2i+2})$, $W_{4L-2i} = U(\theta; x_{2i+1})$, and $W_{4L-2i-1} = V(x_{2i+2})$, for $i = 0, 1, \ldots, L-1$, and $W_{2L} = P(\theta)$. Furthermore, let $W'_j = \partial_\theta W_j$ for $j = 0, 1, \ldots, 4L$. Note that $W'_j = 0$ if $j$ is odd. Then we define $P_{a,b} = W_a W_{a+1} \ldots W_b$ if $0 \leq a \leq b \leq 4L$, and $P_{a,b} = I$ otherwise.

With this notation, $$Q(\theta; \vec{x})^\dagger = P_{0,a-1} W_a P_{a+1,2L-1}, \forall 0 \leq a \leq 2L-1,$$

$$Q(\theta; \vec{x}) = P_{2L+1,b-1} W_b P_{b+1,4L}, \forall 2L+1 \leq b \leq 4L,$$

$$Q(\theta; \vec{x})^\dagger P(\theta) Q(\theta; \vec{x}) = P_{0,a-1} W_a P_{a+1,b-1} W_b P_{b+1,4L}, \forall 0 \leq a < b \leq 4L.$$

Moreover, taking the derivative with respect to $\theta$ yields $$Q'(\theta; \vec{x}) = \partial_\theta Q(\theta; \vec{x}) =$$
$$V(x_{2L}) U'(\theta; x_{2L-1}) V(x_{2L-2}) U(\theta; x_{2L-3}) \ldots V(x_4) U(\theta; x_3) V(x_2) U(\theta; x_1) +$$
$$V(x_{2L}) U(\theta; x_{2L-1}) V(x_{2L-2}) U'(\theta; x_{2L-3}) \ldots V(x_4) U(\theta; x_3) V(x_2) U(\theta; x_1) + \cdots +$$
$$V(x_{2L}) U(\theta; x_{2L-1}) V(x_{2L-2}) U(\theta; x_{2L-3}) \ldots V(x_4) U'(\theta; x_3) V(x_2) U(\theta; x_1) +$$
$$V(x_{2L}) U(\theta; x_{2L-1}) V(x_{2L-2}) U(\theta; x_{2L-3}) \ldots V(x_4) U(\theta; x_3) V(x_2) U'(\theta; x_1),$$

where $$U'(\theta; \alpha) = \partial_\theta U(\theta; \alpha) = -i \sin(\alpha) P'(\theta) = i \sin(\alpha) \left(\sin(\theta) \overline{Z} - \cos(\theta) \overline{X}\right)$$

is the derivative of $U(\theta; \alpha)$ with respect to $\theta$, in which $$P'(\theta) = -\sin(\theta) \overline{Z} + \cos(\theta) \overline{X}$$

is the derivative of $P(\theta)$ with respect to $\theta$. It follows that $$Q'(\theta; \vec{x}) = P_{2L+1,2L+1} W'_{2L+2} P_{2L+3,4L} + P_{2L+1,2L+3} W'_{2L+4} P_{2L+5,4L} +$$
$$\cdots + P_{2L+1,4L-3} W'_{4L-2} P_{4L-1,4L} + P_{2L+1,4L-1} W'_{4L}.$$

The following facts will be useful. Suppose A, B and C are arbitrary linear operators on the Hilbert space $\mathcal{H} = \text{span}\{|\overline{0}\rangle, |\overline{1}\rangle\}$. Then by direct calculation, one can verify that $\langle \bar{0}|AV(-x)BV(x)C|\bar{0}\rangle =$ $\langle \bar{0}|A[\cos(x)\bar{I} + i\sin(x)\bar{Z}]B[\cos(x)\bar{I} - i\sin(x)\bar{Z}]C|\bar{0}\rangle =$ $\frac{1}{2}[\cos(2x)\langle\bar{0}|A(B-\bar{Z}B\bar{Z})C|\bar{0}\rangle - i\sin(2x)\langle\bar{0}|A(B\bar{Z}-\bar{Z}B)C|\bar{0}\rangle + \langle\bar{0}|A(B+\bar{Z}B\bar{Z})C|\bar{0}\rangle],$ $\langle \bar{0}|AU(\theta;-x)BU(\theta;x)C|\bar{0}\rangle =$ $\langle \bar{0}|A[\cos(x)\bar{I} + i\sin(x)P(\theta)]B[\cos(x)\bar{I} - i\sin(x)P(\theta)]C|\bar{0}\rangle =$ $\frac{1}{2}[\cos(2x)\langle\bar{0}|A(B - P(\theta)BP(\theta))C|\bar{0}\rangle - i\sin(2x)\langle\bar{0}|A(BP(\theta) - P(\theta)B)C|\bar{0}\rangle + \langle\bar{0}|A(B + P(\theta)BP(\theta))C|\bar{0}\rangle],$ and $\langle \bar{0}|AU(\theta;-x)BU'(\theta;x)C|\bar{0}\rangle =$ $\langle \bar{0}|A[\cos(x)\bar{I} + i\sin(x)P(\theta)]B[-i\sin(x)P'(\theta)]C|\bar{0}\rangle =$ $\frac{1}{2}[-\cos(2x)\langle\bar{0}|AP(\theta)BP'(\theta)C|\bar{0}\rangle - i\sin(2x)\langle\bar{0}|ABP'(\theta)C|\bar{0}\rangle + \langle\bar{0}|AP(\theta)BP'(\theta)C|\bar{0}\rangle].$ The following fact will be also useful. Taking the derivative with respect to $\theta$ yields $\Delta'(\theta;\vec{x}) = \langle\bar{0}|Q^\dagger(\theta;\vec{x})P(\theta)Q'(\theta;\vec{x})|\bar{0}\rangle +$
$\langle\bar{0}|Q^\dagger(\theta;\vec{x})P'(\theta)Q(\theta;\vec{x})|\bar{0}\rangle + \langle\bar{0}|(Q'(\theta;\vec{x}))^\dagger P(\theta)Q(\theta;\vec{x})|\bar{0}\rangle =$
$2\,\mathrm{Re}(\langle\bar{0}|Q^\dagger(\theta|\vec{x})P(\theta)Q'(\theta;\vec{x})|\bar{0}\rangle) + \langle\bar{0}|Q^\dagger(\theta;\vec{x})P'(\theta)Q(\theta;\vec{x})|\bar{0}\rangle.$ In order to evaluate $C_j(\theta; \vec{x}_{-j})$, $S_j(\theta; \vec{x}_{-j})$, $B_j(\theta; \vec{x}_{-j})$, $C'_j(\theta; \vec{x}_{-j})$, $S'_j(\theta; \vec{x}_{-j})$ and $B'_j(\theta; \vec{x}_{-j})$ for given $\theta$ and $\vec{x}_{-j}$, we consider the case $j$ is even and the case $j$ is odd separately.

Case 1: $j=2(t+1)$ is even, where $0 \leq t \leq L-1$. In this case, $W_{2t+1}=V(x_j)$, and $W_{4L-2t-1}=V(x_j)$. Then we obtain $\Delta(\theta;\vec{x}) = \langle\bar{0}|P_{0,2t}C(-x_j)P_{2t+2,4L-2t-2}V(x_j)P_{4L-2t,4L}|\bar{0}\rangle =$
$C_j(\theta;\vec{x}_{-j}) + S_j(\theta;\vec{x}_{-j})\sin(2x_j) + B_j(\theta;\vec{x}_{-j}),$ where $C_j(\theta;\vec{x}_{-j}) = \frac{1}{2}\langle\bar{0}|P_{0,2t}C(-x_j)P_{2t+2,4L-2t-2} - \bar{Z}P_{2t+2,4L-2t-2}\bar{Z})P_{4L-2t,4L}|\bar{0}\rangle,$ $S_j(\theta;\vec{x}_{-j}) = -\frac{i}{2}\langle\bar{0}|P_{0,2t}(P_{2t+2,4L-2t-2}\bar{Z} - \bar{Z}P_{2t+2,4L-2t-2})P_{4L-2t,4L}|\bar{0}\rangle,$ $B_j(\theta;\vec{x}_{-j}) = \frac{1}{2}\langle\bar{0}|P_{0,2t}(P_{2t+2,4L-2t-2} - \bar{Z}P_{2t+2,4L-2t-2}\bar{Z})P_{4L-2t,4L}|\bar{0}\rangle.$ Given $\theta$ and $\vec{x}_{-j}$, we first compute $P_{0,2t}$, $P_{2t+2,4L-2t-2}$ and $P_{4L-2t,4L}$ in $O(L)$ time. Then we calculate $C_j(\theta; \vec{x}_{-j})$, $S_j(\theta; \vec{x}_{-j})$ and $B_j(\theta; \vec{x}_{-j})$. This procedure takes only $O(L)$ time.

Next, we show how to compute $C'_j(\theta; \vec{x}_{-j})$, $S'_j(\theta; \vec{x}_{-j})$ and $B'_j(\theta; \vec{x}_{-j})$. Using the above and the fact $P_{a,b} = P_{a,4L-2t-2}W_{4L-2t-1}P_{4L-2t,4L}$ for any $a \leq 4L-2t-1 \leq b$, we obtain $Q'(\theta;\vec{x}) = P_{2L+1,2L+1}W'_{2L+2}P_{2L+3,4L-2t-2}W_{4L-2t-1}P_{4L-2t,4L} +$
$P_{2L+1,L3}W'_{2L+4}P_{2L+5,4L-2t-2}W_{4L-2t-1}P_{4L-2t,4L} +$ -continued $\cdots + P_{2L+1,4L-2t-3}W'_{4L-2t-2}W_{4L-2t-1}P_{4L-2t,4L} +$
$P_{2L+1,4L-2t-2}W_{4L-2t-1}W'_{4L-2t}P_{4L-2t+1,4L} + \cdots +$
$P_{2L+1,4L-2t-2}W_{4L-2t-1}P_{4L-2t,4L-3}W'_{4L-2}P_{4L-1,4L} +$
$P_{2L+1,4L-2t-2}W_{4L-2t-1}P_{4L-2t,4L-1}W'_{4L}.$ Then it follows that $Q(\theta;\vec{x})^\dagger P(\theta)Q'(\theta;\vec{x}) =$
$A_t^{(1)}W_{2t+1}B_t^{(1)}W_{4L-2t-1}C_t^{(1)} + A_t^{(2)}W_{2t+1}B_t^{(2)}W_{4L-2t-1}C_t^{(2)},$
$= A_t^{(1)}V(-x_j)B_t^{(1)}V(x_j)C_t^{(1)} + A_t^{(2)}V(-x_j)B_t^{(2)}V(x_j)C_t^{(2)},$ where $A_t^{(1)} = P_{0,2t},$ $B_t^{(1)} = P_{2t+2,4L-2t-2},$ $C_t^{(1)} = \sum_{k=0}^{t} P_{4L-2t,4L-2k-1}W'_{4L-2k}P_{4L-2k+1,4L} =$ $\sum_{k=0}^{t} P_{4L-2t,4L-2k-1}U'(\theta;x_{2k+1})P_{4L-2k+1,4L},$ $A_t^{(2)} = P_{0,2t},$ $B_t^{(2)} = \sum_{k=t+1}^{L-1} P_{2t+2,4L-2k-1}W'_{4L-2k}P_{4L-2k+1,4L-2t-2} =$ $\sum_{k=t+1}^{L-1} P_{2t+2,4L-2k-1}U'(\theta;x_{2k+1})P_{4L-2k+1,4L-2t-2},$ $C_t^{(2)} = P_{4L-2t,4L}.$ Meanwhile, we have $Q(\theta;\vec{x})^\dagger P'(\theta)Q(\theta;\vec{x}) =$
$A_t^{(3)}W_{2t+1}B_t^{(3)}W_{4L-2t-1}C_t^{(3)} = A_t^{(3)}V(-x_j)B_t^{(3)}V(x_j)C_t^{(3)},$ where $A_t^{(3)} = P_{0,2t},$ $B_t^{(3)} = P_{2t+2,2L-1}P'(\theta)P_{2L+1,4L-2t-2},$ $C_t^{(3)} = P_{4L-2t,4L}.$ Combining the above facts yields $\Delta'(\theta;\vec{x}) = C'_j(\vec{x}_{-j})\cos(2x_j) + S'_j(\vec{x}_{-j})\sin(2x_j) + B'_j(\theta;\vec{x}_{-j}),$ where $C'_j(\theta;\vec{x}_{-j}) = \mathrm{Re}(\langle\bar{0}|A_t^{(1)}(B_t^{(1)} - \bar{Z}B_t^{(1)}\bar{Z})C_t^{(1)}|\bar{0}\rangle) +$
$\mathrm{Re}(\langle\bar{0}|A_t^{(2)}(B_t^{(2)} - \bar{Z}B_t^{(2)}\bar{Z})C_t^{(2)}|\bar{0}\rangle) + \frac{1}{2}\langle\bar{0}|A_t^{(3)}(B_t^{(3)} - \bar{Z}B_t^{(3)}\bar{Z})C_t^{(3)}|\bar{0}\rangle,$ $S'_j(\theta;\vec{x}_{-j}) = \mathrm{Im}(\langle\bar{0}|A_t^{(1)}(B_t^{(1)}\bar{Z} - \bar{Z}B_t^{(1)})C_t^{(1)}|\bar{0}\rangle) +$
$\mathrm{Im}(\langle\bar{0}|A_t^{(2)}(B_t^{(2)}\bar{Z} - \bar{Z}B_t^{(2)})C_t^{(2)}|\bar{0}\rangle) - \frac{i}{2}\langle\bar{0}|A_t^{(3)}(B_t^{(3)}\bar{Z} - \bar{Z}B_t^{(3)})C_t^{(3)}|\bar{0}\rangle$ -continued $$B'_j(\theta; \vec{x}_{-j}) = \text{Re}(\langle \bar{0}|A_t^{(1)}(B_t^{(1)} + \bar{Z}B_t^{(1)}Z)C_t^{(1)}|\bar{0}\rangle) +$$
$$\text{Re}(\langle \bar{0}|A_t^{(2)}(B_t^{(2)} + \bar{Z}B_t^{(2)}Z)C_t^{(2)}|\bar{0}\rangle) + \frac{1}{2}\langle \bar{0}|A_t^{(3)}(B_t^{(3)} - \bar{Z}B_t^{(3)}Z)C_t^{(3)}|\bar{0}\rangle.$$

Given $\theta$ and $\vec{x}_{-j}$, we first compute the following matrices in a total of O(L) time by standard dynamic programming technique:

$P_{0,2t}$, $P_{2t+2,4L-2t-2}$, $P_{4L-2t,4L}$, $P_{2t+2,2L-1}$, $P_{2L+1,4L-2t-2}$, $P_{4L-2t,4L-2k-1}$ and $P_{4L-2k+1,4L}$ for $k=0, 1, \ldots, t$;
$P_{2t+2,4L-2k-1}$ and $P_{4L-2k+1,4L-2t-2}$ for $t+1, t+2, \ldots, L-1$.

Then we compute $A_t^{(i)}$, $B_t^{(i)}$ and $C_t^{(i)}$ for $i=1, 2, 3$. After that, we calculate $C'_j(\theta; \vec{x}_{-j})$, $S'_j(\theta; \vec{x}_{egj})$ and $B'_j(\theta; \vec{x}_{-j})$. Overall, this procedure takes O(L) time.

5. Case 2: $j=2t+1$ is odd, where $0 \leq t \leq L-1$. In this case, $W_{2t}=U(\theta; -x_j)$, and $W_{4L-2t}=U(\theta; x_j)$. They we get $$\Delta(\theta; \vec{x}) = \langle \bar{0}|P_{0,2t-1}U(\theta; x_j)P_{2t+1,4L-2t-1}U(\theta; x_j)P_{4L-2t+1,4L}|\bar{0}\rangle =$$
$$C_j(\theta; \vec{x}_{-j}) + S_j(\theta; \vec{x}_{-j})\sin(2x_j) + B_j(\theta; \vec{x}_{-j}),$$

6. where $$C_j(\theta; \vec{x}_{-j}) = \frac{1}{2}\langle \bar{0}|P_{0,2t-1}(P_{2t+1,4L-2t-2} - P(\theta)P_{2t+1,4L-2t-1}P(\theta))P_{4L-2t+1,4L}|\bar{0}\rangle,$$
$$S_j(\theta; \vec{x}_{-j}) = -\frac{i}{2}\langle \bar{0}|P_{0,2t-1}(P_{2t+1,4L-2t-1}P(\theta) - P(\theta)_{2t+1,4L-2t-1})P_{4L-2t+1,4L}|\bar{0}\rangle,$$
$$B_j(\theta; \vec{x}_{-j}) = \frac{1}{2}\langle \bar{0}|P_{0,2t-1}(P_{2t+1,4L-2t-1} + P(\theta)P_{2t+1,4L-2t-1}P(\theta))P_{4L-2t+1,4L}|\bar{0}\rangle,$$

7. Given $\theta$ and $\vec{x}_{-j}$, we first compute $P_{0,2t-1}$, $P_{2t+1,4L-2t-1}$ and $P_{4L-2t+1,4L}$ in O(L) time. Then we calculate $C_j(\theta; \vec{x}_{-j})$, $S_j(\theta; \vec{x}_{-j})$ and $B_j(\theta; \vec{x}_{-j})$. This procedure takes only O(L) time.

Next, we describe how to compute $C'_j(\theta; \vec{x}_{-j})$, $S'_j(\theta; \vec{x}_{-j})$ and $B'_j(\theta; \vec{x}_{-j})$. Using the above and the fact $P_{a,b} = P_{a,4L-2t-1}W_{4L-2t}P_{4L-2t+1,4L}$ for any $a \leq 4L-2t \leq b$, we obtain $$Q'(\theta; \vec{x}) = P_{2L+1,2L+1}W'_{2L+2}P_{2L+3,4L-2t-1}W_{4L-2t}P_{4L-2t+1,4L} +$$
$$P_{2L+1,2L+3}W'_{2L+4}P_{2L+5,4L-2t-1}W_{4L-2t}P_{4L-2t+1,4L} + \cdots +$$
$$P_{2L+1,4L-2t-3}W'_{4L-2t-2}P_{4L-2t-1,4L-2t-1}W_{4L-2t}P_{4L-2t+1,4L} +$$
$$P_{2L+1,4L-2t-1}W'_{4L-2t}P_{4L-2t+1,4L} +$$
$$P_{2L+1,4L-2t-1}W_{4L-2t}P_{4L-2t+1,4L-2t+1}W'_{4L-2t+2}P_{4L-2t+3,4L} +$$
$$\cdots + P_{2L+1,4L-2t-1}W_{4L-2t}P_{4L-2t+1,4L-3}W'_{4L-2}P_{4L-1,4L} +$$
$$P_{2L+1,4L-2t-1}W_{4L-2t}P_{4L-2t+1,4L-1}W'_{4L}.$$

Then it follows that $$Q(\theta; \vec{x})^\dagger P(\theta)Q'(\theta; \vec{x}) =$$
$$A_t^{(1)}W_{2t}B_t^{(1)}W_{4L-2t}C_t^{(1)} + A_t^{(2)}W_{2t}B_t^{(2)}W_{4L-2t}C_t^{(2)} + A_t^{(3)}W_{2t}B_t^{(3)}W'_{4L-2t}C_t^{(2)},$$
$$= A_t^{(1)}U(\theta; -x_j)B_t^{(1)}U(\theta; x_j)C_t^{(1)} +$$
$$A_t^{(2)}U(\theta; -x_j)B_t^{(2)}U'(\theta; x_j)C_t^{(2)} + A_t^{(3)}U(\theta; -x_j)B_t^{(3)}U(\theta; x_j)C_t^{(3)},$$

where $A_t^{(1)} = P_{0,2t-1}$,
$B_t^{(1)} = P_{2t+1,4L-2t-1}$,
$$C_t^{(1)} = \sum_{k=0}^{t-1}P_{4L-2t+1,4L-2k-1}W'_{4L-2k}P_{4L-2k+1,4L} =$$
$$\sum_{k=0}^{t-1}P_{4L-2t+1,4L-2k-1}U'(\theta; x_{2k+1})P_{4L-2k+1,4L},$$
$A_t^{(2)} = P_{0,2t-1}$,
$B_t^{(2)} = P_{2t+1,4L-2t-1}$,
$C_t^{(2)} = P_{4L-2t+1,4L}$,
$A_t^{(3)} = P_{0,2t-1}$,
$$B_t^{(3)} = \sum_{k=t+1}^{L-1}P_{2t+1,4L-2k-1}W'_{4L-2k}P_{4L-2k+1,4L-2t-1} =$$
$$\sum_{k=t+1}^{L-1}P_{2t+1,4L-2k-1}U'(\theta; x_{2k+1})P_{4L-2k+1,4L-2t-1},$$
$C_t^{(3)} = P_{4L-2t+1,4L}.$ Meanwhile, we have $$Q(\theta; \vec{x})^\dagger P'(\theta)Q(\theta; \vec{x}) =$$
$$A_t^{(4)}W_{2t}B_t^{(4)}W_{4L-2t}C_t^{(4)} = A_t^{(4)}U(\theta; -x_j)B_t^{(4)}U(\theta; x_j)C_t^{(4)},$$

where $A_t^{(4)} = P_{0,2t-1}$,
$B_t^{(4)} = P_{2t+1,2L-1}P'(\theta)P_{2L+1,4L-2t-1}$,
$C_t^{(4)} = P_{4L-2t+1,4L}.$ Combining the above facts yields $$\Delta'(\theta; \vec{x}) = C'_j(\theta; \vec{x}_{-j})\cos(2x_j) + S'_j(\theta; \vec{x}_{-j})\sin(2x_j) + B'_j(\theta; \vec{x}_{-j}),$$

where $$C'_j(\theta; \vec{x}_{-j}) = \text{Re}(\langle \bar{0}|A_t^{(1)}(B_t^{(1)} - P(\theta)B_t^{(1)}P(\theta))C_t^{(1)}|\bar{0}\rangle) -$$
$$\text{Re}(\langle \bar{0}|A_t^{(2)}P(\theta)B_t^{(2)}P'(\theta)C_t^{(2)}|\bar{0}\rangle) + \text{Re}(\langle \bar{0}|A_t^{(3)}(B_t^{(3)} - P(\theta)B_t^{(3)}P(\theta))C_t^{(3)}|\bar{0}\rangle) +$$
$$\frac{1}{2}\langle \bar{0}|A_t^{(4)}(B_t^{(4)} - P(\theta)B_t^{(4)}P(\theta))C_t^{(4)}|\bar{0}\rangle,$$
$$S'_j(\theta; \vec{x}_{-j}) = \text{Im}(\langle \bar{0}|A_t^{(1)}(B_t^{(1)}P(\theta) - P(\theta)B_t^{(1)})C_t^{(1)}|\bar{0}\rangle) +$$
$$\text{Im}(\langle \bar{0}|A_t^{(2)}B_t^{(2)}P'(\theta)C_t^{(2)}|\bar{0}\rangle) + \text{Im}(\langle \bar{0}|A_t^{(3)}(B_t^{(3)}P(\theta) - P(\theta)B_t^{(3)})C_t^{(3)}|\bar{0}\rangle) -$$
$$\frac{i}{2}\langle \bar{0}|A_t^{(4)}(B_t^{(4)}P(\theta) - P(\theta)B_t^{(4)})C_t^{(4)}|\bar{0}\rangle$$
$$B'_j(\theta; \vec{x}_{-j}) = \text{Re}(\langle \bar{0}|A_t^{(1)}(B_t^{(1)} + P(\theta)B_t^{(1)}P(\theta))C_t^{(1)}|\bar{0}\rangle) +$$
$$\text{Re}(\langle \bar{0}|A_t^{(2)}P(\theta)B_t^{(2)}P'(\theta)C_t^{(2)}|\bar{0}\rangle) + \text{Re}(\langle \bar{0}|A_t^{(3)}(B_t^{(3)} + P(\theta)B_t^{(3)}P(\theta))C_t^{(3)}|\bar{0}\rangle) +$$
$$\frac{1}{2}\langle \bar{0}|A_t^{(4)}(B_t^{(4)} - P(\theta)B_t^{(3)}P(\theta))C_t^{(4)}|\bar{0}\rangle.$$

Given $\theta$ and $\vec{x}_{-j}$, we first compute the following matrices in a total of O(L) time by standard dynamic programming technique:

$P_{0,2t-1}$, $P_{2t+1,4L-2t-1}$, $P_{4L-2t+1,4L}$, $P_{2t+1,2L-1}$, $P_{2L+1,4L-2t-1}$; $P_{4L-2t+1,4L-2k-1}$ and $P_{4L-2k+1,4L}$ for k=0, 1, ..., t−1; $P_{2t+1,4L-2k-1}$ and $P_{4L-2k+1,4L-2t-1}$ for t+1,t+2, ..., L−1.

Then we compute $A_t^{(i)}$, $B_t^{(i)}$, and $C_t^{(i)}$ for i=1, 2, 3, 4. After that, we calculate $C'_j(\theta; \vec{x}_{egj})$, $S'_j(\theta; \vec{x}_{-j})$ and $B'_j(\theta; \vec{x}_{-j})$. Overall, this procedure takes O(L) time.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Various physical embodiments of a quantum computer are suitable for use according to the present disclosure. In general, the fundamental data storage unit in quantum computing is the quantum bit, or qubit. The qubit is a quantum-computing analog of a classical digital computer system bit. A classical bit is considered to occupy, at any given point in time, one of two possible states corresponding to the binary digits (bits) 0 or 1. By contrast, a qubit is implemented in hardware by a physical medium with quantum-mechanical characteristics. Such a medium, which physically instantiates a qubit, may be referred to herein as a "physical instantiation of a qubit," a "physical embodiment of a qubit," a "medium embodying a qubit," or similar terms, or simply as a "qubit," for ease of explanation. It should be understood, therefore, that references herein to "qubits" within descriptions of embodiments of the present invention refer to physical media which embody qubits.

Each qubit has an infinite number of different potential quantum-mechanical states. When the state of a qubit is physically measured, the measurement produces one of two different basis states resolved from the state of the qubit. Thus, a single qubit can represent a one, a zero, or any quantum superposition of those two qubit states; a pair of qubits can be in any quantum superposition of 4 orthogonal basis states; and three qubits can be in any superposition of 8 orthogonal basis states. The function that defines the quantum-mechanical states of a qubit is known as its wavefunction. The wavefunction also specifies the probability distribution of outcomes for a given measurement. A qubit, which has a quantum state of dimension two (i.e., has two orthogonal basis states), may be generalized to a d-dimensional "qudit," where d may be any integral value, such as 2, 3, 4, or higher. In the general case of a qudit, measurement of the qudit produces one of d different basis states resolved from the state of the qudit. Any reference herein to a qubit should be understood to refer more generally to a d-dimensional qudit with any value of d.

Although certain descriptions of qubits herein may describe such qubits in terms of their mathematical properties, each such qubit may be implemented in a physical medium in any of a variety of different ways. Examples of such physical media include superconducting material, trapped ions, photons, optical cavities, individual electrons trapped within quantum dots, point defects in solids (e.g., phosphorus donors in silicon or nitrogen-vacancy centers in diamond), molecules (e.g., alanine, vanadium complexes), or aggregations of any of the foregoing that exhibit qubit behavior, that is, comprising quantum states and transitions therebetween that can be controllably induced or detected.

For any given medium that implements a qubit, any of a variety of properties of that medium may be chosen to implement the qubit. For example, if electrons are chosen to implement qubits, then the x component of its spin degree of freedom may be chosen as the property of such electrons to represent the states of such qubits. Alternatively, the y component, or the z component of the spin degree of freedom may be chosen as the property of such electrons to represent the state of such qubits. This is merely a specific example of the general feature that for any physical medium that is chosen to implement qubits, there may be multiple physical degrees of freedom (e.g., the x, y, and z components in the electron spin example) that may be chosen to represent 0 and 1. For any particular degree of freedom, the physical medium may controllably be put in a state of superposition, and measurements may then be taken in the chosen degree of freedom to obtain readouts of qubit values.

Certain implementations of quantum computers, referred as gate model quantum computers, comprise quantum gates. In contrast to classical gates, there is an infinite number of possible single-qubit quantum gates that change the state vector of a qubit. Changing the state of a qubit state vector typically is referred to as a single-qubit rotation, and may also be referred to herein as a state change or a single-qubit quantum-gate operation. A rotation, state change, or single-qubit quantum-gate operation may be represented mathematically by a unitary 2×2 matrix with complex elements. A rotation corresponds to a rotation of a qubit state within its Hilbert space, which may be conceptualized as a rotation of the Bloch sphere. (As is well-known to those having ordinary skill in the art, the Bloch sphere is a geometrical representation of the space of pure states of a qubit.) Multi-qubit gates alter the quantum state of a set of qubits. For example, two-qubit gates rotate the state of two qubits as a rotation in the four-dimensional Hilbert space of the two qubits. (As is well-known to those having ordinary skill in the art, a Hilbert space is an abstract vector space possessing the structure of an inner product that allows length and angle to be measured. Furthermore, Hilbert spaces are complete: there are enough limits in the space to allow the techniques of calculus to be used.)

A quantum circuit may be specified as a sequence of quantum gates. As described in more detail below, the term "quantum gate," as used herein, refers to the application of a gate control signal (defined below) to one or more qubits to cause those qubits to undergo certain physical transformations and thereby to implement a logical gate operation. To conceptualize a quantum circuit, the matrices corresponding to the component quantum gates may be multiplied together in the order specified by the gate sequence to produce a $2^n \times 2^n$ complex matrix representing the same overall state change on n qubits. A quantum circuit may thus be expressed as a single resultant operator. However, designing a quantum circuit in terms of constituent gates allows the design to conform to a standard set of gates, and thus enable greater ease of deployment. A quantum circuit thus corresponds to a design for actions taken upon the physical components of a quantum computer.

A given variational quantum circuit may be parameterized in a suitable device-specific manner. More generally, the quantum gates making up a quantum circuit may have an associated plurality of tuning parameters. For example, in embodiments based on optical switching, tuning parameters may correspond to the angles of individual optical elements.

In certain embodiments of quantum circuits, the quantum circuit includes both one or more gates and one or more measurement operations. Quantum computers implemented using such quantum circuits are referred to herein as implementing "measurement feedback." For example, a quantum computer implementing measurement feedback may execute the gates in a quantum circuit and then measure only a subset (i.e., fewer than all) of the qubits in the quantum computer, and then decide which gate(s) to execute next based on the outcome(s) of the measurement(s). In particular, the measurement(s) may indicate a degree of error in the gate operation(s), and the quantum computer may decide which gate(s) to execute next based on the degree of error. The quantum computer may then execute the gate(s) indicated by the decision. This process of executing gates, measuring a subset of the qubits, and then deciding which gate(s) to execute next may be repeated any number of times. Measurement feedback may be useful for performing quantum error correction, but is not limited to use in performing quantum error correction. For every quantum circuit, there is an error-corrected implementation of the circuit with or without measurement feedback.

Some embodiments described herein generate, measure, or utilize quantum states that approximate a target quantum state (e.g., a ground state of a Hamiltonian). As will be appreciated by those trained in the art, there are many ways to quantify how well a first quantum state "approximates" a second quantum state. In the following description, any concept or definition of approximation known in the art may be used without departing from the scope hereof. For example, when the first and second quantum states are represented as first and second vectors, respectively, the first quantum state approximates the second quantum state when an inner product between the first and second vectors (called the "fidelity" between the two quantum states) is greater than a predefined amount (typically labeled c). In this example, the fidelity quantifies how "close" or "similar" the first and second quantum states are to each other. The fidelity represents a probability that a measurement of the first quantum state will give the same result as if the measurement were performed on the second quantum state. Proximity between quantum states can also be quantified with a distance measure, such as a Euclidean norm, a Hamming distance, or another type of norm known in the art. Proximity between quantum states can also be defined in computational terms. For example, the first quantum state approximates the second quantum state when a polynomial time-sampling of the first quantum state gives some desired information or property that it shares with the second quantum state.

Not all quantum computers are gate model quantum computers. Embodiments of the present invention are not limited to being implemented using gate model quantum computers. As an alternative example, embodiments of the present invention may be implemented, in whole or in part, using a quantum computer that is implemented using a quantum annealing architecture, which is an alternative to the gate model quantum computing architecture. More specifically, quantum annealing (QA) is a metaheuristic for finding the global minimum of a given objective function over a given set of candidate solutions (candidate states), by a process using quantum fluctuations.

Figure 2A:
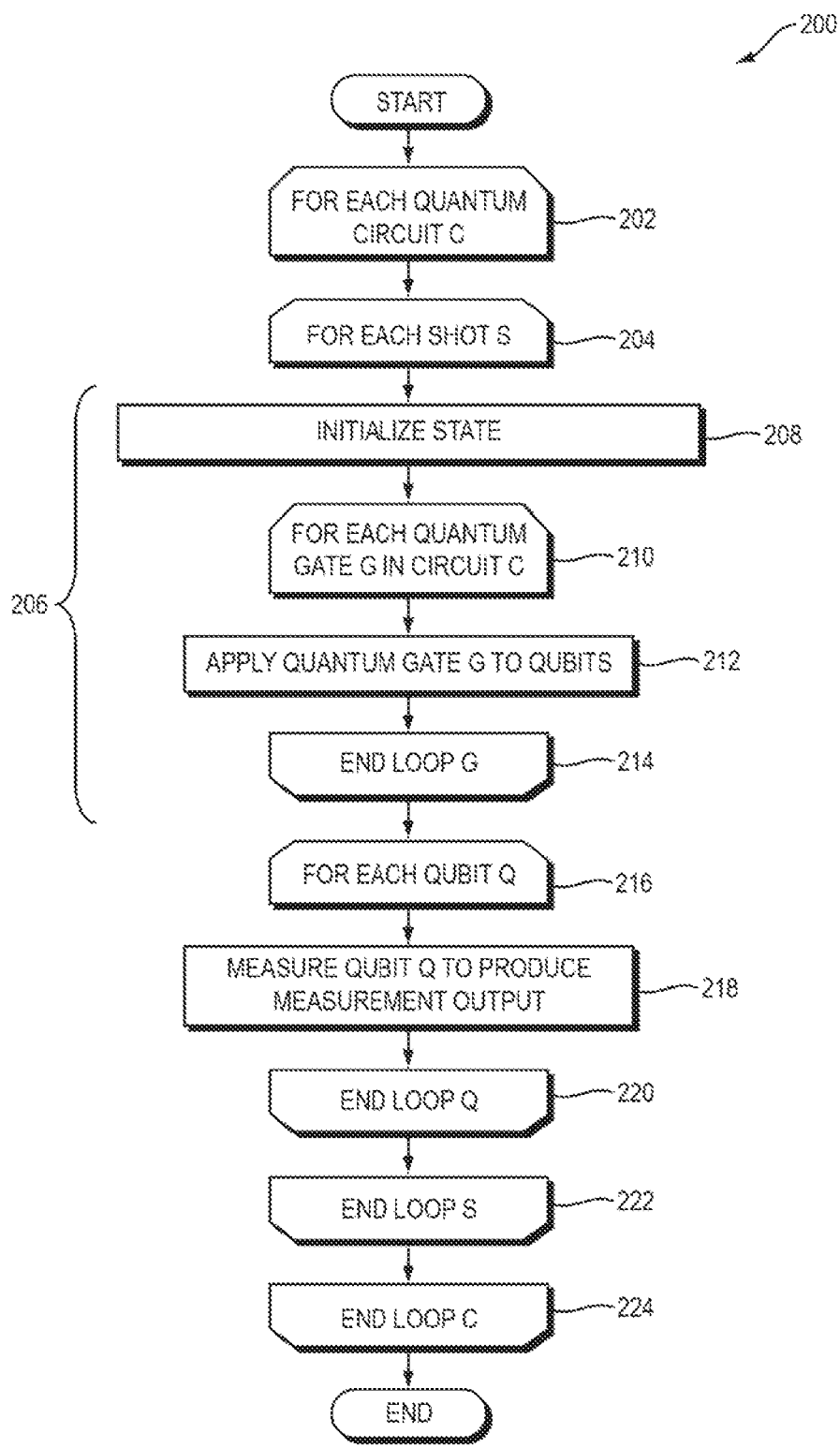
FIG. 2A is a flowchart of a method performed by the quantum computer of FIG. 1 according to one embodiment of the present invention.
Figure 2B:
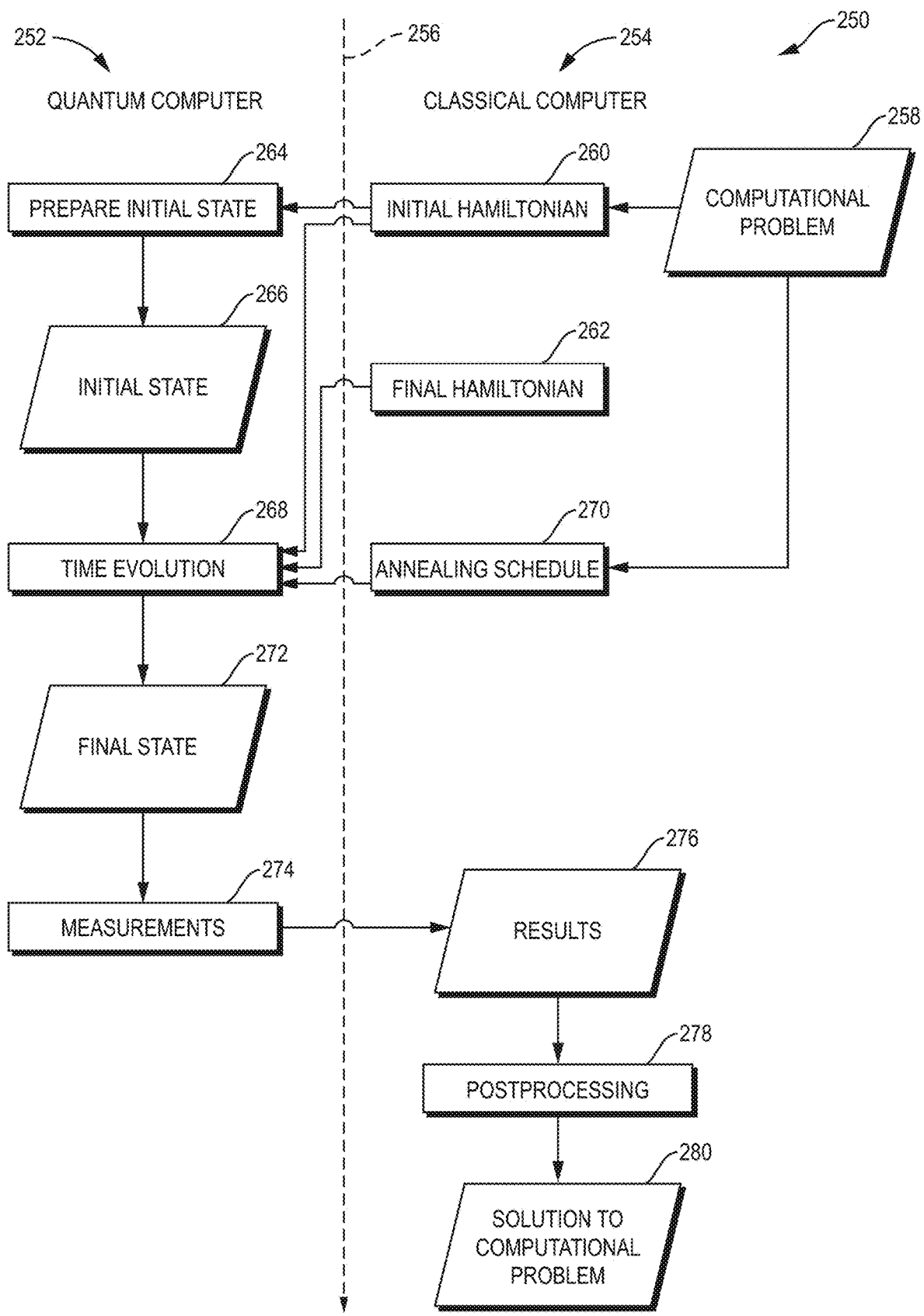
FIG. 2B is a diagram of a hybrid quantum-classical computer which performs quantum annealing according to one embodiment of the present invention.

FIG. 2B shows a diagram illustrating operations typically performed by a computer system 250 which implements quantum annealing. The system 250 includes both a quantum computer 252 and a classical computer 254. Operations shown on the left of the dashed vertical line 256 typically are performed by the quantum computer 252, while operations shown on the right of the dashed vertical line 256 typically are performed by the classical computer 254.

Quantum annealing starts with the classical computer 254 generating an initial Hamiltonian 260 and a final Hamiltonian 262 based on a computational problem 258 to be solved, and providing the initial Hamiltonian 260, the final Hamiltonian 262 and an annealing schedule 270 as input to the quantum computer 252. The quantum computer 252 prepares a well-known initial state 266 (FIG. 2B, operation 264), such as a quantum-mechanical superposition of all possible states (candidate states) with equal weights, based on the initial Hamiltonian 260. The classical computer 254 provides the initial Hamiltonian 260, a final Hamiltonian 262, and an annealing schedule 270 to the quantum computer 252. The quantum computer 252 starts in the initial state 266, and evolves its state according to the annealing schedule 270 following the time-dependent Schrödinger equation, a natural quantum-mechanical evolution of physical systems (FIG. 2B, operation 268). More specifically, the state of the quantum computer 252 undergoes time evolution under a time-dependent Hamiltonian, which starts from the initial Hamiltonian 260 and terminates at the final Hamiltonian 262. If the rate of change of the system Hamiltonian is slow enough, the system stays close to the ground state of the instantaneous Hamiltonian. If the rate of change of the system Hamiltonian is accelerated, the system may leave the ground state temporarily but produce a higher likelihood of concluding in the ground state of the final problem Hamiltonian, i.e., diabatic quantum computation. At the end of the time evolution, the set of qubits on the quantum annealer is in a final state 272, which is expected to be close to the ground state of the classical Ising model that corresponds to the solution to the original computational problem 258. An experimental demonstration of the success of quantum annealing for random magnets was reported immediately after the initial theoretical proposal.

The final state 272 of the quantum computer 252 is measured, thereby producing results 276 (i.e., measurements) (FIG. 2B, operation 274). The measurement operation 274 may be performed, for example, in any of the ways disclosed herein, such as in any of the ways disclosed herein in connection with the measurement unit 110 in FIG. 1. The classical computer 254 performs postprocessing on the measurement results 276 to produce output 280 representing a solution to the original computational problem 258 (FIG. 2B, operation 278).

As yet another alternative example, embodiments of the present invention may be implemented, in whole or in part, using a quantum computer that is implemented using a one-way quantum computing architecture, also referred to as a measurement-based quantum computing architecture, which is another alternative to the gate model quantum computing architecture. More specifically, the one-way or measurement based quantum computer (MBQC) is a method of quantum computing that first prepares an entangled resource state, usually a cluster state or graph state, then performs single qubit measurements on it. It is "one-way" because the resource state is destroyed by the measurements.

The outcome of each individual measurement is random, but they are related in such a way that the computation always succeeds. In general the choices of basis for later measurements need to depend on the results of earlier measurements, and hence the measurements cannot all be performed at the same time.

Any of the functions disclosed herein may be implemented using means for performing those functions. Such means include, but are not limited to, any of the components disclosed herein, such as the computer-related components described below.

Figure 1:
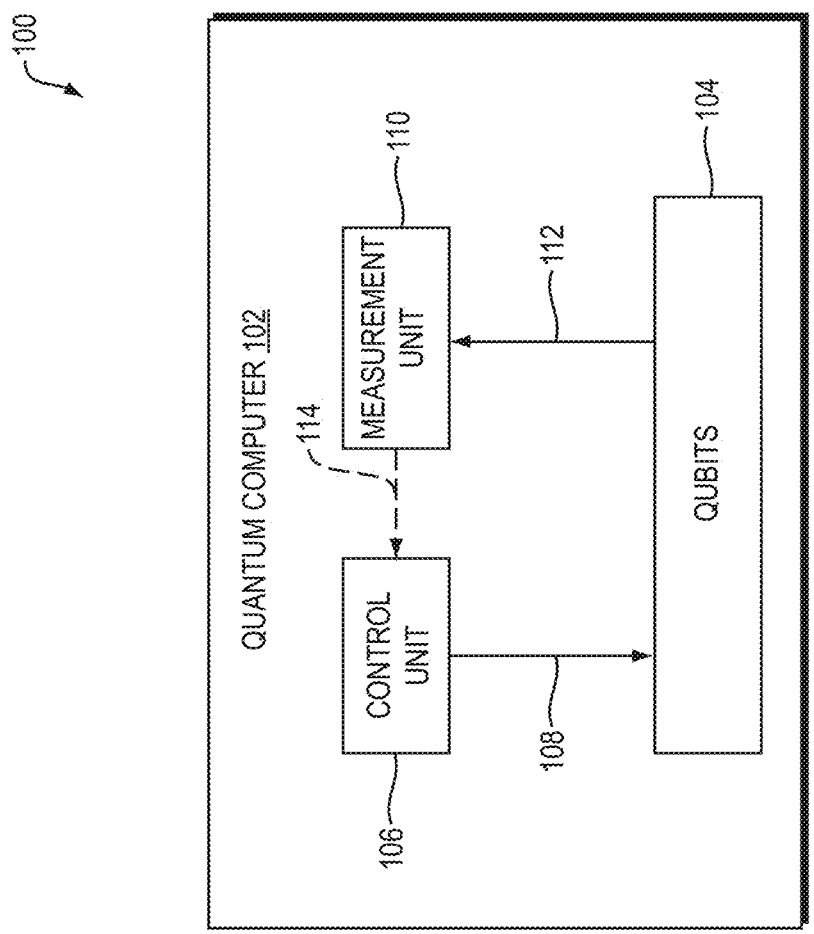
FIG. 1 is a diagram of a quantum computer according to one embodiment of the present invention.

Referring to FIG. 1, a diagram is shown of a system 100 implemented according to one embodiment of the present invention. Referring to FIG. 2A, a flowchart is shown of a method 200 performed by the system 100 of FIG. 1 according to one embodiment of the present invention. The system 100 includes a quantum computer 102. The quantum computer 102 includes a plurality of qubits 104, which may be implemented in any of the ways disclosed herein. There may be any number of qubits 104 in the quantum computer 102. For example, the qubits 104 may include or consist of no more than 2 qubits, no more than 4 qubits, no more than 8 qubits, no more than 16 qubits, no more than 32 qubits, no more than 64 qubits, no more than 128 qubits, no more than 256 qubits, no more than 512 qubits, no more than 1024 qubits, no more than 2048 qubits, no more than 4096 qubits, or no more than 8192 qubits. These are merely examples, in practice there may be any number of qubits 104 in the quantum computer 102.

There may be any number of gates in a quantum circuit. However, in some embodiments the number of gates may be at least proportional to the number of qubits 104 in the quantum computer 102. In some embodiments the gate depth may be no greater than the number of qubits 104 in the quantum computer 102, or no greater than some linear multiple of the number of qubits 104 in the quantum computer 102 (e.g., 2, 3, 4, 5, 6, or 7).

The qubits 104 may be interconnected in any graph pattern. For example, they be connected in a linear chain, a two-dimensional grid, an all-to-all connection, any combination thereof, or any subgraph of any of the preceding.

As will become clear from the description below, although element 102 is referred to herein as a "quantum computer," this does not imply that all components of the quantum computer 102 leverage quantum phenomena. One or more components of the quantum computer 102 may, for example, be classical (i.e., non-quantum components) components which do not leverage quantum phenomena.

The quantum computer 102 includes a control unit 106, which may include any of a variety of circuitry and/or other machinery for performing the functions disclosed herein. The control unit 106 may, for example, consist entirely of classical components. The control unit 106 generates and provides as output one or more control signals 108 to the qubits 104. The control signals 108 may take any of a variety of forms, such as any kind of electromagnetic signals, such as electrical signals, magnetic signals, optical signals (e.g., laser pulses), or any combination thereof.

For example:
In embodiments in which some or all of the qubits 104 are implemented as photons (also referred to as a "quantum optical" implementation) that travel along waveguides, the control unit 106 may be a beam splitter (e.g., a heater or a mirror), the control signals 108 may be signals that control the heater or the rotation of the mirror, the measurement unit 110 may be a photodetector, and the measurement signals 112 may be photons.

In embodiments in which some or all of the qubits 104 are implemented as charge type qubits (e.g., transmon, X-mon, G-mon) or flux-type qubits (e.g., flux qubits, capacitively shunted flux qubits) (also referred to as a "circuit quantum electrodynamic" (circuit QED) implementation), the control unit 106 may be a bus resonator activated by a drive, the control signals 108 may be cavity modes, the measurement unit 110 may be a second resonator (e.g., a low-Q resonator), and the measurement signals 112 may be voltages measured from the second resonator using dispersive readout techniques.

In embodiments in which some or all of the qubits 104 are implemented as superconducting circuits, the control unit 106 may be a circuit QED-assisted control unit or a direct capacitive coupling control unit or an inductive capacitive coupling control unit, the control signals 108 may be cavity modes, the measurement unit 110 may be a second resonator (e.g., a low-Q resonator), and the measurement signals 112 may be voltages measured from the second resonator using dispersive readout techniques.

In embodiments in which some or all of the qubits 104 are implemented as trapped ions (e.g., electronic states of, e.g., magnesium ions), the control unit 106 may be a laser, the control signals 108 may be laser pulses, the measurement unit 110 may be a laser and either a CCD or a photodetector (e.g., a photomultiplier tube), and the measurement signals 112 may be photons.

In embodiments in which some or all of the qubits 104 are implemented using nuclear magnetic resonance (NMR) (in which case the qubits may be molecules, e.g., in liquid or solid form), the control unit 106 may be a radio frequency (RF) antenna, the control signals 108 may be RF fields emitted by the RF antenna, the measurement unit 110 may be another RF antenna, and the measurement signals 112 may be RF fields measured by the second RF antenna.

In embodiments in which some or all of the qubits 104 are implemented as nitrogen-vacancy centers (NV centers), the control unit 106 may, for example, be a laser, a microwave antenna, or a coil, the control signals 108 may be visible light, a microwave signal, or a constant electromagnetic field, the measurement unit 110 may be a photodetector, and the measurement signals 112 may be photons.

In embodiments in which some or all of the qubits 104 are implemented as two-dimensional quasiparticles called "anyons" (also referred to as a "topological quantum computer" implementation), the control unit 106 may be nanowires, the control signals 108 may be local electrical fields or microwave pulses, the measurement unit 110 may be superconducting circuits, and the measurement signals 112 may be voltages.

In embodiments in which some or all of the qubits 104 are implemented as semiconducting material (e.g., nanowires), the control unit 106 may be microfabricated gates, the control signals 108 may be RF or microwave signals, the measurement unit 110 may be microfabricated gates, and the measurement signals 112 may be RF or microwave signals.

Although not shown explicitly in FIG. 1 and not required, the measurement unit 110 may provide one or more feedback signals 114 to the control unit 106 based on the measurement signals 112. For example, quantum computers referred to as "one-way quantum computers" or "measurement-based quantum computers" utilize such feedback signal 114 from the measurement unit 110 to the control unit 106. Such feedback signal 114 is also necessary for the operation of fault-tolerant quantum computing and error correction.

The control signals 108 may, for example, include one or more state preparation signals which, when received by the qubits 104, cause some or all of the qubits 104 to change their states. Such state preparation signals constitute a quantum circuit also referred to as an "ansatz circuit." The resulting state of the qubits 104 is referred to herein as an "initial state" or an "ansatz state." The process of outputting the state preparation signal(s) to cause the qubits 104 to be in their initial state is referred to herein as "state preparation" (FIG. 2A, section 206). A special case of state preparation is "initialization," also referred to as a "reset operation," in which the initial state is one in which some or all of the qubits 104 are in the "zero" state i.e. the default single-qubit state. More generally, state preparation may involve using the state preparation signals to cause some or all of the qubits 104 to be in any distribution of desired states. In some embodiments, the control unit 106 may first perform initialization on the qubits 104 and then perform preparation on the qubits 104, by first outputting a first set of state preparation signals to initialize the qubits 104, and by then outputting a second set of state preparation signals to put the qubits 104 partially or entirely into non-zero states.

Another example of control signals 108 that may be output by the control unit 106 and received by the qubits 104 are gate control signals. The control unit 106 may output such gate control signals, thereby applying one or more gates to the qubits 104. Applying a gate to one or more qubits causes the set of qubits to undergo a physical state change which embodies a corresponding logical gate operation (e.g., single-qubit rotation, two-qubit entangling gate or multi-qubit operation) specified by the received gate control signal. As this implies, in response to receiving the gate control signals, the qubits 104 undergo physical transformations which cause the qubits 104 to change state in such a way that the states of the qubits 104, when measured (see below), represent the results of performing logical gate operations specified by the gate control signals. The term "quantum gate," as used herein, refers to the application of a gate control signal to one or more qubits to cause those qubits to undergo the physical transformations described above and thereby to implement a logical gate operation.

It should be understood that the dividing line between state preparation (and the corresponding state preparation signals) and the application of gates (and the corresponding gate control signals) may be chosen arbitrarily. For example, some or all the components and operations that are illustrated in FIGS. 1 and 2A-2B as elements of "state preparation" may instead be characterized as elements of gate application. Conversely, for example, some or all of the components and operations that are illustrated in FIGS. 1 and 2A-2B as elements of "gate application" may instead be characterized as elements of state preparation. As one particular example, the system and method of FIGS. 1 and 2A-2B may be characterized as solely performing state preparation followed by measurement, without any gate application, where the elements that are described herein as being part of gate application are instead considered to be part of state preparation. Conversely, for example, the system and method of FIGS. 1 and 2A-2B may be characterized as solely performing gate application followed by measurement, without any state preparation, and where the elements that are described herein as being part of state preparation are instead considered to be part of gate application.

The quantum computer 102 also includes a measurement unit 110, which performs one or more measurement operations on the qubits 104 to read out measurement signals 112 (also referred to herein as "measurement results") from the qubits 104, where the measurement results 112 are signals representing the states of some or all of the qubits 104. In practice, the control unit 106 and the measurement unit 110 may be entirely distinct from each other, or contain some components in common with each other, or be implemented using a single unit (i.e., a single unit may implement both the control unit 106 and the measurement unit 110). For example, a laser unit may be used both to generate the control signals 108 and to provide stimulus (e.g., one or more laser beams) to the qubits 104 to cause the measurement signals 112 to be generated.

In general, the quantum computer 102 may perform various operations described above any number of times. For example, the control unit 106 may generate one or more control signals 108, thereby causing the qubits 104 to perform one or more quantum gate operations. The measurement unit 110 may then perform one or more measurement operations on the qubits 104 to read out a set of one or more measurement signals 112. The measurement unit 110 may repeat such measurement operations on the qubits 104 before the control unit 106 generates additional control signals 108, thereby causing the measurement unit 110 to read out additional measurement signals 112 resulting from the same gate operations that were performed before reading out the previous measurement signals 112. The measurement unit 110 may repeat this process any number of times to generate any number of measurement signals 112 corresponding to the same gate operations. The quantum computer 102 may then aggregate such multiple measurements of the same gate operations in any of a variety of ways.

After the measurement unit 110 has performed one or more measurement operations on the qubits 104 after they have performed one set of gate operations, the control unit 106 may generate one or more additional control signals 108, which may differ from the previous control signals 108, thereby causing the qubits 104 to perform one or more additional quantum gate operations, which may differ from the previous set of quantum gate operations. The process described above may then be repeated, with the measurement unit 110 performing one or more measurement operations on the qubits 104 in their new states (resulting from the most recently-performed gate operations).

In general, the system 100 may implement a plurality of quantum circuits as follows. For each quantum circuit C in the plurality of quantum circuits (FIG. 2A, operation 202), the system 100 performs a plurality of "shots" on the qubits 104. The meaning of a shot will become clear from the description that follows. For each shot S in the plurality of shots (FIG. 2A, operation 204), the system 100 prepares the state of the qubits 104 (FIG. 2A, section 206). More specifically, for each quantum gate G in quantum circuit C (FIG. 2A, operation 210), the system 100 applies quantum gate G to the qubits 104 (FIG. 2A, operations 212 and 214).

Then, for each of the qubits Q 104 (FIG. 2A, operation 216), the system 100 measures the qubit Q to produce measurement output representing a current state of qubit Q (FIG. 2A, operations 218 and 220).

The operations described above are repeated for each shot S (FIG. 2A, operation 222), and circuit C (FIG. 2A, operation 224). As the description above implies, a single "shot" involves preparing the state of the qubits 104 and applying all of the quantum gates in a circuit to the qubits 104 and then measuring the states of the qubits 104; and the system 100 may perform multiple shots for one or more circuits.

Figure 3:
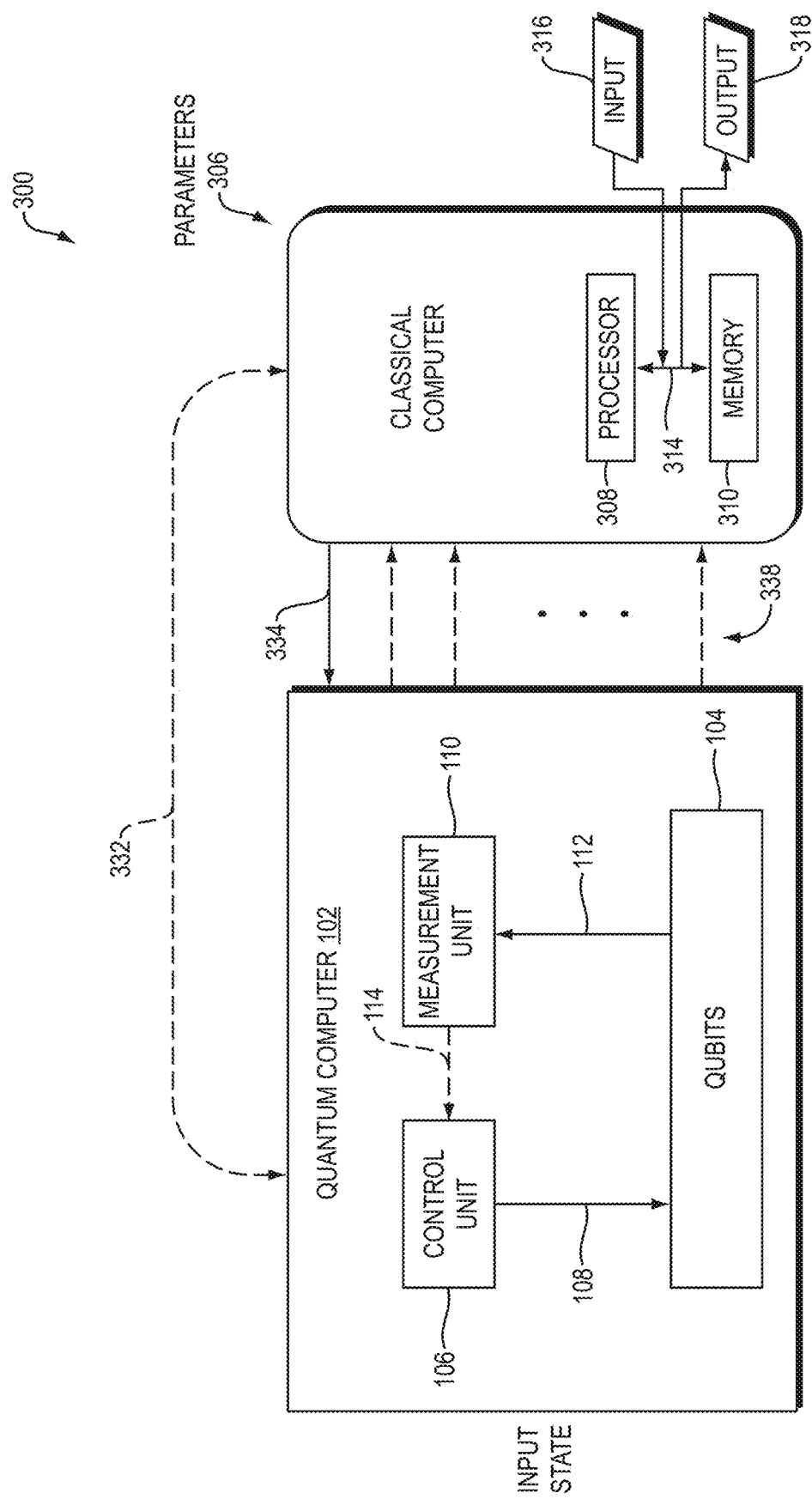
FIG. 3 is a diagram of a hybrid quantum-classical computer according to one embodiment of the present invention.

Referring to FIG. 3, a diagram is shown of a hybrid quantum-classical (HQC) computer 300 implemented according to one embodiment of the present invention. The HQC 300 includes a quantum computer component 102 (which may, for example, be implemented in the manner shown and described in connection with FIG. 1) and a classical computer component 306. The classical computer component may be a machine implemented according to the general computing model established by John Von Neumann, in which programs are written in the form of ordered lists of instructions and stored within a classical (e.g., digital) memory 310 and executed by a classical (e.g., digital) processor 308 of the classical computer. The memory 310 is classical in the sense that it stores data in a storage medium in the form of bits, which have a single definite binary state at any point in time. The bits stored in the memory 310 may, for example, represent a computer program. The classical computer component 304 typically includes a bus 314. The processor 308 may read bits from and write bits to the memory 310 over the bus 314. For example, the processor 308 may read instructions from the computer program in the memory 310, and may optionally receive input data 316 from a source external to the computer 302, such as from a user input device such as a mouse, keyboard, or any other input device. The processor 308 may use instructions that have been read from the memory 310 to perform computations on data read from the memory 310 and/or the input 316, and generate output from those instructions. The processor 308 may store that output back into the memory 310 and/or provide the output externally as output data 318 via an output device, such as a monitor, speaker, or network device.

The quantum computer component 102 may include a plurality of qubits 104, as described above in connection with FIG. 1. A single qubit may represent a one, a zero, or any quantum superposition of those two qubit states. The classical computer component 304 may provide classical state preparation signals Y32 to the quantum computer 102, in response to which the quantum computer 102 may prepare the states of the qubits 104 in any of the ways disclosed herein, such as in any of the ways disclosed in connection with FIGS. 1 and 2A-2B.

Once the qubits 104 have been prepared, the classical processor 308 may provide classical control signals Y34 to the quantum computer 102, in response to which the quantum computer 102 may apply the gate operations specified by the control signals Y32 to the qubits 104, as a result of which the qubits 104 arrive at a final state. The measurement unit 110 in the quantum computer 102 (which may be implemented as described above in connection with FIGS. 1 and 2A-2B) may measure the states of the qubits 104 and produce measurement output Y38 representing the collapse of the states of the qubits 104 into one of their eigenstates. As a result, the measurement output Y38 includes or consists of bits and therefore represents a classical state. The quantum computer 102 provides the measurement output Y38 to the classical processor 308. The classical processor 308 may store data representing the measurement output Y38 and/or data derived therefrom in the classical memory 310.

The steps described above may be repeated any number of times, with what is described above as the final state of the qubits 104 serving as the initial state of the next iteration. In this way, the classical computer 304 and the quantum computer 102 may cooperate as co-processors to perform joint computations as a single computer system.

Although certain functions may be described herein as being performed by a classical computer and other functions may be described herein as being performed by a quantum computer, these are merely examples and do not constitute limitations of the present invention. A subset of the functions which are disclosed herein as being performed by a quantum computer may instead be performed by a classical computer. For example, a classical computer may execute functionality for emulating a quantum computer and provide a subset of the functionality described herein, albeit with functionality limited by the exponential scaling of the simulation. Functions which are disclosed herein as being performed by a classical computer may instead be performed by a quantum computer.

The techniques described above may be implemented, for example, in hardware, in one or more computer programs tangibly stored on one or more computer-readable media, firmware, or any combination thereof, such as solely on a quantum computer, solely on a classical computer, or on a hybrid quantum-classical (HQC) computer. The techniques disclosed herein may, for example, be implemented solely on a classical computer, in which the classical computer emulates the quantum computer functions disclosed herein.

The techniques described above may be implemented in one or more computer programs executing on (or executable by) a programmable computer (such as a classical computer, a quantum computer, or an HQC) including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, it would be impossible to mentally or manually generate random samples from a complex distribution describing a operator P and state |s>.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

In embodiments in which a classical computing component executes a computer program providing any subset of the functionality within the scope of the claims below, the computer program may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor, which may be either a classical processor or a quantum processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A classical computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium (such as a classical computer-readable medium, a quantum computer-readable medium, or an HQC computer-readable medium). Embodiments of the invention may store such data in such data structure(s) and read such data from such data structure(s).

What is claimed is:

1. A method for improved quantum amplitude estimation for reducing a number of measurements to generate a statistic accurately, comprising:
   selecting, with a classical computer, a plurality of quantum-circuit-parameter values to optimize an accuracy-improvement rate of the statistic estimating an expectation value $\langle s|P|s \rangle$ of an observable P with respect to a quantum state $|s\rangle$;
   applying, to one or more qubits of a quantum computer, a sequence of alternating first and second generalized reflection operators to transform the one or more qubits from the quantum state $|s\rangle$ into a reflected quantum state, each of the first and second generalized reflection operators being controlled according to a corresponding one of the plurality of quantum-circuit-parameter values;
   measuring the plurality of qubits in the reflected quantum state with respect to the observable P to obtain a set of measurement outcomes; and
   updating, on the classical computer, the statistic with the set of measurement outcomes.

2. The method of claim 1, further comprising outputting the statistic after said updating.

3. The method of claim 1, the statistic comprising a mean.

4. The method of claim 1, the accuracy-improvement rate comprising a variance-reduction factor.

5. The method of claim 1, the accuracy-improvement rate comprising an information-improvement rate.

6. The method of claim 5, the information-improvement rate comprising one or a Fisher-information-improvement rate and an entropy-reduction rate.

7. The method of claim 1, wherein the sequence of first and second generalized reflection operators and the observable p define a bias of an engineered likelihood function.

8. The method of claim 1, further comprising iterating said selecting, applying, measuring, and updating.

9. The method of claim 1, further comprising:
   updating, on the classical computer and with the set of measurement outcomes, an accuracy estimate of the statistic; and
   iterating said selecting, applying, measuring, and updating while the accuracy estimate is greater than a threshold.

10. The method of claim 1, wherein said updating the statistic comprises:
    updating a prior distribution with the plurality of measurements to obtain a posterior distribution; and
    calculating an updated statistic from the posterior distribution.

11. The method of claim 1, wherein said selecting is based on the statistic and an accuracy estimate of the statistic.

12. The method of claim 11, wherein said selecting is further based on a fidelity representing errors occurring during said applying and measuring.

13. The method of claim 1, wherein said selecting uses one of coordinate ascent and gradient descent.

14. A computing system for improved quantum amplitude estimation for reducing a number of measurements to generate a statistic accurately, the computing system comprising:
    a processor;
    a quantum-classical interface communicably coupling the computing system with a quantum computer; and
    a memory communicably coupled with the processor, the memory storing machine-readable instructions that, when executed by the processor, control the computing system to:
    (i) select a plurality of quantum-circuit-parameter values to optimize an accuracy-improvement rate of the statistic estimating an expectation value $\langle s|P|s \rangle$ of an observable P with respect to a quantum state $|s\rangle$,
    (ii) control the quantum computer, via the quantum-classical interface, to transform one or more qubits of the quantum computer from the quantum state $|s\rangle$ into a reflected quantum state using a sequence of alternating first and second generalized reflection operators, each of the first and second generalized reflection operators being controlled according to a corresponding one of the plurality of quantum-circuit-parameter values,
    (iii) control the quantum computer, via the quantum-classical interface, to measure the plurality of qubits in the reflected quantum state with respect to the observable P to obtain a set of measurement outcomes, and
    (iv) update the statistic with the set of measurement outcomes.

15. The computing system of claim 14, the memory storing additional machine-readable instructions that, when executed by the processor, control the computing system to output the statistic.

16. The computing system of claim 14, further comprising the quantum computer.

\* \* \* \* \*